(12) United States Patent
Miloushev et al.

(10) Patent No.: US 6,226,692 B1
(45) Date of Patent: May 1, 2001

(54) METHOD AND SYSTEM FOR CONSTRUCTING SOFTWARE COMPONENTS AND SYSTEMS AS ASSEMBLIES OF INDEPENDENT PARTS

(75) Inventors: Vladimir I. Miloushev, Laguna Niguel; Peter A. Nickolov, Irvine, both of CA (US)

(73) Assignee: Object Dynamics Corporation, Costa Mesa, CA (US)

( * ) Notice: Subject to any disclaimer, the term of this patent is extended or adjusted under 35 U.S.C. 154(b) by 0 days.

(21) Appl. No.: 09/077,796
(22) PCT Filed: Dec. 13, 1996
(86) PCT No.: PCT/US96/19675
 § 371 Date: Oct. 28, 1998
 § 102(e) Date: Oct. 28, 1998
(87) PCT Pub. No.: WO97/22925
 PCT Pub. Date: Jun. 26, 1997

Related U.S. Application Data

(60) Provisional application No. 60/008,699, filed on Dec. 15, 1995.

(51) Int. Cl.[7] .................................................. G06F 9/00
(52) U.S. Cl. ............................................................. 709/316
(58) Field of Search .................................... 709/103, 223, 709/310–332, 316

(56) References Cited

U.S. PATENT DOCUMENTS

| | | | | |
|---|---|---|---|---|
| 5,295,242 | * | 3/1994 | Mashruwala et al. | 709/223 |
| 5,481,715 | * | 1/1996 | Hamilton et al. | 709/316 |
| 5,692,183 | * | 11/1997 | Hapner et al. | 707/103 |
| 5,751,962 | * | 5/1998 | Fanshier et al. | 709/223 |
| 5,848,419 | * | 12/1998 | Hapner et al. | 707/103 |

* cited by examiner

Primary Examiner—St. John Courtenay, III
(74) Attorney, Agent, or Firm—Malcolm B. Wittenberg; Crosby, Heafey, Roach & May

(57) ABSTRACT

A system and a method for designing and constructing software components and systems by assembling them from independent parts which is compatible with and extends existing object models. A terminal interface and a terminal mechanism for interfacing objects is included. The mechanism is independent from the actual type of interactions established through it and allows objects to invoke directly services of other objects. All objects in a given system implement and expose a terminal interface. A property interface and mechanism with hierarchical property names and ability to execute queries is also included. The mechanism can be used for parameterization and serialization of objects, as well as to provide structured storage. A new and advantageous type of software object, named parts, is defined. Parts are constructed through an abstract factory and implement a property interface and a terminal interface.

7 Claims, 58 Drawing Sheets

PARTS CAN BE CONNECTED FROM OUTSIDE TO AVOID INTERDEPENDENCY
DIFFERENT PARTS EXPOSE ONE AND THE SAME INTERFACE TO MANIPULATE THEIR TERMINALS

| Table A: OPERATIONS |
|---|
| ACQUIRE |
| RELEASE |
| CONNECT |
| DISCONNECT |
| |
| GET INFO |
| |
| GET CONTEXT |
| SET CONTEXT |
| |
| OPEN QUERY |
| GET FIRST |
| GET NEXT |
| GET PREV |
| GET LAST |
| CLOSE QUERY |

| Table B: CONTROL BLOCK (Used with all Operations) | |
|---|---|
| NAME | STRING |
| ID | NUMBER |
| CONNECTION_ID | NUMBER |
| TYPE | ENUM: FUNCTION, MESSAGE, INTERFACE... |
| DATA | BINARY WITH SIZE |
| CONTEXT | NUMBER |

| Table C: COMMON TERMINAL INFORMATION FIELDS | |
|---|---|
| NEGOTIATION | ENUM: FIXED, NEGOTIABLE |
| DIRECTION | ENUM: IN, OUT, BI-DIR, OTHER |
| SYNCHRONOSITY | ENUM: SYNC, ANBIENT, ASYNC |
| CARDINALITY | NUMBER |
| CONTRACT NAME | STRING |
| CONTRACT ID | BINARY WITH SIZE |

*(Other Fields can be defined)*

All fields on the terminal info descriptor are returned together in the data field of the control block by GET INFO operation

FIG. 2

PARTS CAN BE CONNECTED FROM OUTSIDE TO AVOID INTERDEPENDENCY
DIFFERENT PARTS EXPOSE ONE AND THE SAME INTERFACE TO MANIPULATE THEIR TERMINALS

Table A: TERMINAL NAMES ARE:
- UNIQUE WITHIN THE PART
- CAN BE CONSTRUCTED HIERARCHICALLY
- INTERPRETED BY THE PART
- CAN REPRESENT COMPLEX STRUCTURES OF TERMINALS

Table B: EXAMPLES OF VALID NAMES

ARM_CONTROL
SENSOR [1].CONTROL
SENSOR [1].OUTPUT
SENSOR [2].OUTPUT
MOTOR.MAIN
MOTOR.AVX
OUTPUT [3]

Table C: EXAMPLES OF INVALID NAMES

[4]
TEST]
SENSOR.]
MEMORY..ALLOC
MEMORY [ALLOC]

Table D: SIMPLE SET OF TERMINALS

CONTROL
STATUS
DATA
NOTIFICATIONS_IN
NOTIFICATIONS_OUT

Table E: ARRAY OF TERMINALS

ARM_CONTROL [0]
ARM_CONTROL [1]
ARM_CONTROL [2]

Table F: STRUCTURE OF TERMINALS

ARM_CONTROL.STATUS
ARM_CONTROL.POSITION
ARM_CONTROL.GRIP

FIG. 4

| TYPE | DATA PROVIDED IN THE DATA FIELD OF CONTROL BLOCK |
|---|---|
| FUNCTION | POINTER TO FUNCTION, CONTEXT, CONTRACT ID |
| MESSAGE | OBJECT ID, MESSAGE ID, CONTRACT ID |
| MESSAGE INTERFACE | OBJECT ID, CONTRACT ID |
| VTBL INTERFACE | POINTER TO INTERFACE, CONTRACT ID |
| OLE INTERFACE | POINTER TO INTERFACE, OLE ID |
| VTBL PLUG | POINTER TO INTERFACE, CONTRACT ID |
| PIPE | FILE HANDLE, CONTRACT ID |

THE DATA ABOVE IS EXCHANGED BETWEEN TERMINALS IN THE PROCESS OF ESTABLISHING OF CONNECTION USING OPERATIONS ACQUIRE AND CONNECT OF THE TERMINAL INTERFACE

FIG. 5

| OPERATIONS |
|---|
| GET |
| SET |
| CHECK |
| |
| OPEN QUERY |
| GET FIRST |
| GET NEXT |
| GET PREV |
| GET LAST |
| CLOSE QUERY |
| |
| GET INFO |

| CONTROL BLOCK | |
|---|---|
| NAME | STRING |
| ID | NUMBER |
| TYPE | ENUM |
| DATA | BINARY, LENGTH, SIZE |
| CONTEXT | NUMBER |

| EXAMPLES OF PROPERTY TYPES |
|---|
| BYTE |
| FLOAT |
| DOUBLE |
| CURRENCY |
| GUID |
| BINARY |
| UINT16 |

| CAN BE USED FOR: |
|---|
| • PARAMETRIZATION |
| • SERIALIZATION |
| • STRUCTURED STORAGE |

ANY PROPERTY VALUE CAN BE CONVERTED TO AND FROM COMMON DENOMINATOR TYPES, SUCH AS STRING AND BINARY.

FIG. 8

Table A: PROPERTY NAMES ARE:

- UNIQUE WITH THE PART
- CAN BE CONSTRUCTED HIERARCHICALLY
- INTERPRETED BY THE PART
- CAN REPRESENT COMPLEX DATA STRUCTURES
- QUERIES CAN BE OPEN BY PARTIAL NAMES USING WILDCARDS
- OTHER OPERATIONS ON PARTIAL NAMES MEAN OPERATION IS PERFORMED ON A SET OF PROPERTIES THE NAMES OF WHICH SATISFY THE WILDCARD TEMPLATE

Table B: EXAMPLES: VALID AND INVALID NAMES

VALID: WEIGHT
DATA [1]
SENSOR.PRESSURE

INVALID: READOUT]
SENSOR.]

Table C: EXAMPLES: PARTIAL NAMES

A.TRAIN [*].CODUCTOR.NAME
B.TRAIN [3].CONDUCTOR.*
C.TRAIN [3].*.NAME

Table D: EXAMPLES: SIMPLE NAMES

BUFFER_SIZE
MAX_BUFFERS
PRIORITY
STORAGE_LOCATION

Table E: EXAMPLES: ARRAYS AND STRUCTURES

READOUT [0]   SENSOR.PRESSURE
READOUT [1]   SENSOR.TEMPERATURE
READOUT [2]   SENSOR.STATE

FIG. 9

Table A:

| CONTROL | |
|---|---|
| ENABLED | |

| HIGH | |
|---|---|
| | THRESHOLD |
| | IOADDR |
| | IRQ |
| | SENSITIVITY |

| M1 | |
|---|---|
| | STATE |
| | IOADDRESS |
| | IRQ |

| LOW | |
|---|---|
| | THRESHOLD |
| | IOADDR |
| | IRQ |
| | SENSITIVITY |

⇧ JOIN

CONTROL.ENABLED
M1.STATE
M1.IOADDRESS
M1.IRQ
HIGH.THRESHOLD
HIGH.IOADDR
HIGH.IRQ
LOW.THRESHOLD
LOW.IOADDR
LOW.IRQ
HIGH.SENSITIVITY
LOW.SENSITIVITY

Table B: HARD PARAMETRIZATION TABLE

| PATH | VALUE |
|---|---|
| M1.IOADDRESS | 0x300 |
| M1.IRQ | -1 |
| HIGH.IOADDR | 0x100 |
| HIGH.IRQ | 10 |
| LOW.IOADDR | 0x120 |
| LOW.IRQ | 11 |

Table C: ALIAS TABLE

| BASE PATH | G | S | TARGET PATH |
|---|---|---|---|
| MIN_RPM | Y | Y | LOW.THRESHOLD |
| MAX_RPM | Y | Y | HIGH.THRESHOLD |
| STATE | Y | N | M1.STATE |
| ENABLED | Y | Y | CONTROL.ENABLED |
| HIGH.IOADDR | N | N | N/A |
| HIGH.IRQ | N | N | N/A |
| LOW.IOADDR | N | N | N/A |
| LOW.IRQ | N | N | N/A |
| M1.IOADDRESS | N | N | N/A |
| M1.IRQ | N | N | N/A |

Table D: GROUP PROPERTY

| SENSITIVITY | HIGH.SENSITIVITY |
|---|---|
| | LOW.SENSITIVITY |

FIG. 13

```
1   /* ------------------------------------------------------------------------ */
2   /*                    ETC: Global system definitions                        */
3   /*                                                                          */
4   /*              TYPES.H - Portable type definitions                         */
5   /* ------------------------------------------------------------------------ */
6
7   #ifndef _TYPES_DEFINED
8   #define _TYPES_DEFINED
9
10  #if (!defined(BIT32) && !defined(BIT16))
11      #error BIT16 or BIT32 must be defined
12  #endif
13
14  /* --- Common types ------------------------------------------------------- */
15
16  typedef int  bool;
17
18  #ifndef TRUE
19     #define FALSE    ((bool) 0)
20     #define TRUE     ((bool) (!FALSE))
21  #endif
22
23  typedef signed   char   schar;
24  typedef unsigned char   uchar;
25
26  #ifndef _WINNT_
27     #define MINCHAR   ((char) 0x00)          // 0x80 in WINNT.H!!
28     #define MAXCHAR   ((char) 0x7F)
29  #endif
30
31  #define MINSCHAR ((char) 0x80)
32  #define MAXSCHAR ((char) 0x7F)
33
34  #define MINUCHAR ((char) 0x00)
35  #define MAXUCHAR ((char) 0xFF)
36
37  typedef void    *_datap;
38  typedef void    *_codep;   //$$ "void *_codep (void);" would not work
39
40  #ifdef __cplusplus
41     #define NULLD    0
42     #define NULLC    0
43  #else
44     #define NULLD ((_datap) 0)
45     #define NULLC ((_codep) 0)
46  #endif
47
48  #ifndef NULL
49  #define NULL ((void *) 0)
50  #endif
51
52  /*
53    Notes:
54
55    1.  Types _datap and _codep are provided for systems/models in which
56        data pointers are of different size than code pointers.  See also
57        type _pointer in the compatibility types section of this header file.
58  */
59
```

FIG. 17A

```
1   /* --- Machine types -------------------------------------------------- */
2
3   typedef unsigned      char byte;
4   typedef unsigned short int  word;
5   typedef unsigned long  int  dword;
6
7   #define MINBYTE  ((byte)  0x00)
8   #ifndef _WINNT_
9      #define MAXBYTE  ((byte)  0xFF)
10  #endif
11
12  #define MINWORD  ((word)  0x0000U)
13  #ifndef _WINNT_
14     #define MAXWORD  ((word)  0xFFFFU)
15  #endif
16
17  #define MINDWORD ((dword) 0x00000000UL)
18  #ifndef _WINNT_
19     #define MAXDWORD ((dword) 0xFFFFFFFFUL)
20  #endif
21
22  /* --- Tolerance types (hardware-dependent) --------------------------- */
23
24  typedef unsigned int  uint;     //guaranteed to be at least 16 bits wide.
25  typedef signed   int  sint;     //guaranteed to be at least 16 bits wide.
26
27  #define MININT  (( int) 0x0000)
28  #define MAXINT  (( int) 0x7FFF)
29
30  #define MINSINT ((sint) -32767-1)
31  #define MAXSINT ((sint) 0x7FFF)
32
33  #define MINUINT ((uint) 0x0000U)
34  #define MAXUINT ((uint) 0xFFFFU)
35
36  /*
37    Notes:
38
39    1.  Use tolerance types for variables that are expected to only take
40        small values which will never exceed the minimum number of guaranteed
41        bit width, so that the compiler can choose the actual type which the
42        underlying hardware feels most comfortable in dealing with.
43
44    2.  Use of tolerance types is only allowed for variables of a local scope;
45        it is prohibited for public/external variables.  Writing the binary
46        contents of a tolerance variable to a disk file is punishable by death.
47
48    3.  Negative values are not allowed for type int. (thus it is 15 bits wide
49        instead of 16 bits wide.)  Use type sint if you are planning to assign
50        negative values to a variable.
51
52    4.  Alternatively, type int can be prohibited by #defining it as "$@$#$"
53        (in the end of this header file) and the use of uint or sint can be
54        promoted instead.
55
56    5.  Operations that result in overflow/underflow beyond the minimum
57        number of guaranteed bits yield undefined results and should be
58        avoided for all tolerance types.
59  */
```

FIG. 17B

```
 1
 2   /* --- Portable types ------------------------------------------------------ */
 3
 4   typedef              char    int8  ;
 5   typedef signed       char    sint8 ;
 6   typedef unsigned     char    uint8 ;
 7   typedef        short int     int16;
 8   typedef signed short int     sint16;
 9   typedef unsigned short int   uint16;
10   typedef         long int     int32;
11   typedef signed  long int     sint32;
12   typedef unsigned long int    uint32;
13
14   typedef unsigned      char   flg8  ;
15   typedef unsigned short int   flg16;
16   typedef unsigned long  int   flg32;
17
18   typedef uint32              _ctx;           // max. size between _datap & uint32
19   #define NO_CTX  ((_ctx)0)
20
21
22   typedef uint32              _id32;          // 32-bit id
23   #define NO_ID32 ((_id32)0)
24
25   typedef uint16              _id16;          // 16-bit id
26   #define NO_ID16 ((_id16)0)
27
28   typedef _id32               _id;            // default id (32-bit)
29   #define NO_ID   ((_id)0)
30
31
32   typedef int8                bool8;          // the shortest stand-alone boolean
33
34   #define MININT8    (( int8)  0x00)
35   #define MAXINT8    (( int8)  0x7F)
36
37   #define MINSINT8   ((sint8)  0x80)
38   #define MAXSINT8   ((sint8)  0x7F)
39
40   #define MINUINT8   ((uint8)  0x00)
41   #define MAXUINT8   ((uint8)  0xFF)
42
43   #define MININT16   (( int16) 0x0000)
44   #define MAXINT16   (( int16) 0x7FFF)
45
46   #define MINSINT16  ((sint16) 0x8000)
47   #define MAXSINT16  ((sint16) 0x7FFF)
48
49   #define MINUINT16  ((uint16) 0x0000U)
50   #define MAXUINT16  ((uint16) 0xFFFFU)
51
52   #define MININT32   (( int32) 0x00000000L)
53   #define MAXINT32   (( int32) 0x7FFFFFFFL)
54
55   #define MINSINT32  ((sint32) 0x80000000L)
56   #define MAXSINT32  ((sint32) 0x7FFFFFFFL)
57
58   #define MINUINT32  ((uint32) 0x00000000UL)
59   #define MAXUINT32  ((uint32) 0xFFFFFFFFUL)
```

FIG. 17C

```
/*
   Notes:

1.  Use int16 and int32 when you know the exact bit width that you want
       for your variable, but you do not care about the interpretation of
       the sign of the variable.  This way, the compiler will choose an
       actual signed or unsigned type, depending on what the underlying
       hardware feels most comfortable in dealing with.

2.  As an example, variables that are ideal candidates to be declared as
       int16 or int32 are sets of bitflags: although the bit capacity of such
       a variable is crucial, the variable will never be interpreted as a
       signed or unsigned value.

3.  All integer operations defined by the C language are valid on all of
       the portable types, and overflow/underflow operations beyond
       the specified bit widths have predictable behaviour.
*/ endif // defined _TYPES_DEFINED
```

FIG. 17D

```
1  /* ---------------------------------------------------------------------- */
2  /*                                                                        */
3  /*                    ETC: Global system definitions                      */
4  /*                                                                        */
5  /*                    STATUS.H - global system statae                     */
6  /* ---------------------------------------------------------------------- */

7  #ifndef _STATUS_DEFINED
8  #define _STATUS_DEFINED

10 /* --- define status type ------------------------------------------------ */
11
12 #define _stat uint
13
14 /* --- define if_xxx macros ---------------------------------------------- */
15
16 #define if_ret(s,e)      if (((s) = (e)) != ST_OK) return ((s))
17 #define if_cleanup(s,e,c) if (((s) = (e)) != ST_OK) return (((c), (s)))
18
19 /* --- define general status values -------------------------------------- */
20
21 #define ST_OK            0  // successful operation
22
23 /* structures/tables manipulation */
24 #define ST_ALLOC         20 // can't alloc (for variable size alloc/pool)
25 #define ST_NO_ROOM       21 // can't alloc fixed sz entry in fixed sz pool
26 #define ST_OVERFLOW      22 // value, buffer, whatever may overflow
27 #define ST_UNDERFLOW     23 // value, buffer, counter, whatever may underflow
28 #define ST_EMPTY         24 // QUEUE/smth is empty - no elements
29 #define ST_FULL          25 // queue/smth is full
30 #define ST_EOF           26 // end of file
31
32 /* valchk */
33 #define ST_INVALID       30 // value not valid in operation context
34 #define ST_BAD_VALUE     31 // value not valid in module's context
35 #define ST_OUT_OF_RANGE  32 // value out of range
36 #define ST_NULL_PTR      33 // NULL ptr is not valid in operation context
37 #define ST_BAD_SYNTAX    34 // text/formatted data syntax error
38 #define ST_BAD_NAME      35 // name invalid in module's context
39
40 /* BAD errors */
41 #define ST_UNEXPECTED    40 // unexpected condition of parm or external object
42 #define ST_PANIC         41 // unexpected condition of self or internal object
43 #define ST_DEADLOCK      42 // deadlock detected
44
45 /* failures */
46 #define ST_REFUSE        45 // oper rejected voluntarily (inappropriate state)
47 #define ST_NO_ACTION     46 // oper requires no action (eg close closed file)
48 #define ST_FAILED        47 // operation failed / not successful
49
50 /* state check */
51 #define ST_NOT_INITED    50 // object is not initialized
52 #define ST_NOT_ACTIVE    51 // oper allowed only when object is active
53 #define ST_NOT_OPEN      52 // oper allowed only when object is open
54
55 /* i/o system */
56 #define ST_IOERR         60 // I/O error - file system / peripherals error
57 #define ST_BAD_CHKSUM    61 // wrong chksum
58
59 /* set-related */
```

FIG. 18A

```
1    #define ST_NOT_FOUND          62 // requested item not found
2    #define ST_DUPLICATE          63 // duplicated item is not allowed
3
4    /* critical section / privileges */
5    #define ST_BUSY               70 // in critical section (dynamic, short period)
6    #define ST_ACCESS_DENIED      71 // temporary lack of access (dynamic, long period)
7    #define ST_PRIVILEGE          72 // privilege violation (static)
8    #define ST_SCOPE_VIOLATION    73 // (no comment)
9    #define ST_BAD_ACCESS         74 // access type not appropriate / not possible
10
11   /* operation status */
12   #define ST_PENDING            80 // operation is pending
13   #define ST_TIMEOUT            81 // timeout has expired
14   #define ST_CANCELLED          82 // operation cancelled on user's request
15   #define ST_ABORTED            83 // op. aborted on system/module's request
16   #define ST_RESET              84 // object has been orderly reset
17   #define ST_CLEANUP            85 // object is about to be destroyed, now in cleanup
18   #define ST_OVERRIDE           86 // operation/entity was overriden
19
20   /* API */
21   #define ST_CANT_BIND          90 // can't bind / resolve name, handle, etc.
22   #define ST_FPI_ERROR          91 // invalid function request, etc.
23   #define ST_WRONG_VERSION      92 // incompatible version of data/code detected
24   #define ST_NOT_IMPLEMENTED    93 // feature not implemented
25   #define ST_NOT_SUPPORTED      94 // partial implementation; feature not supported
26
27   /* environment-specific */
28   #define ST_BAD_UID           100 // OBJ:invalid uid
29   #define ST_BAD_MSG           101 // OBJ:invalid msg or object doesn't handle it
30   #define ST_OK_CUT            102 // OBJ:don't call more virt. objs; return ST_OK
31   #define ST_NOT_INHERITED     103 // OBJ:method was abstract; needs to be inherited
32   #define ST_BAD_PID           104 // OBJ:invalid pid
33   #define ST_WIN_DFLT          210 // WIN:WindowProc: call DefWinProc, use its result
34   #define ST_BLOCK_OVERRIDE    300 // KER:attempt to block a thread that is already
35   blocked
36
37   /* --- String table ---------------------------------------------------------- */
38
39   #ifdef _ERR_STAT
40
41   struct STAT_TXT_S
42       {
43       _stat s;
44       char *p;
45       } ;
46
47   #define DEF_STATUS(s)         { (s), #s }
48
49   static struct STAT_TXT_S _err_sts_tbl[] =
50       {
51       DEF_STATUS ( ST_OK           ),
52       DEF_STATUS ( ST_ALLOC        ),
53       DEF_STATUS ( ST_NO_ROOM      ),
54       DEF_STATUS ( ST_OVERFLOW     ),
55       DEF_STATUS ( ST_UNDERFLOW    ),
56       DEF_STATUS ( ST_EMPTY        ),
57       DEF_STATUS ( ST_FULL         ),
58       DEF_STATUS ( ST_EOF          ),
59       DEF_STATUS ( ST_INVALID      ),
```

FIG. 18B

```
1       DEF_STATUS ( ST_BAD_VALUE          ),
2       DEF_STATUS ( ST_OUT_OF_RANGE       ),
3       DEF_STATUS ( ST_NULL_PTR           ),
4       DEF_STATUS ( ST_BAD_SYNTAX         ),
5       DEF_STATUS ( ST_BAD_NAME           ),
6       DEF_STATUS ( ST_UNEXPECTED         ),
7       DEF_STATUS ( ST_PANIC              ),
8       DEF_STATUS ( ST_DEADLOCK           ),
9       DEF_STATUS ( ST_REFUSE             ),
10      DEF_STATUS ( ST_NO_ACTION          ),
11      DEF_STATUS ( ST_FAILED             ),
12      DEF_STATUS ( ST_NOT_INITED         ),
13      DEF_STATUS ( ST_NOT_ACTIVE         ),
14      DEF_STATUS ( ST_NOT_OPEN           ),
15      DEF_STATUS ( ST_IOERR              ),
16      DEF_STATUS ( ST_BAD_CHKSUM         ),
17      DEF_STATUS ( ST_NOT_FOUND          ),
18      DEF_STATUS ( ST_DUPLICATE          ),
19      DEF_STATUS ( ST_BUSY               ),
20      DEF_STATUS ( ST_ACCESS_DENIED      ),
21      DEF_STATUS ( ST_PRIVILEGE          ),
22      DEF_STATUS ( ST_SCOPE_VIOLATION    ),
23      DEF_STATUS ( ST_BAD_ACCESS         ),
24      DEF_STATUS ( ST_PENDING            ),
25      DEF_STATUS ( ST_TIMEOUT            ),
26      DEF_STATUS ( ST_CANCELLED          ),
27      DEF_STATUS ( ST_ABORTED            ),
28      DEF_STATUS ( ST_RESET              ),
29      DEF_STATUS ( ST_CLEANUP            ),
30      DEF_STATUS ( ST_OVERRIDE           ),
31      DEF_STATUS ( ST_CANT_BIND          ),
32      DEF_STATUS ( ST_FPI_ERROR          ),
33      DEF_STATUS ( ST_WRONG_VERSION      ),
34      DEF_STATUS ( ST_NOT_IMPLEMENTED    ),
35      DEF_STATUS ( ST_NOT_SUPPORTED      ),
36      DEF_STATUS ( ST_BAD_UID            ),
37      DEF_STATUS ( ST_BAD_MSG            ),
38      DEF_STATUS ( ST_OK_CUT             ),
39      DEF_STATUS ( ST_NOT_INHERITED      ),
40      DEF_STATUS ( ST_BAD_PID            ),
41      DEF_STATUS ( ST_WIN_DFLT           ),
42      DEF_STATUS ( ST_BLOCK_OVERRIDE     )
43    };
44
45   #endif  // _ERR_STAT
46
47
48   /* --- status codes 1000 and up are system- or module- specific ------------- */
49
50   #endif  // _STATUS_DEFINED
51
```

FIG. 18C

```
1   /* ------------------------------------------------------------------ */
2   /*                 ETC: Global system definitions                     */
3   /*                                                                    */
4   /*              IFACE.H - Interface support                           */
5   /*                                                                    */
6   /*      Copyright (c) 1994-95 Object Dynamics Corp. All Rights Reserved. */
7   /* ------------------------------------------------------------------ */
8
9   #ifndef _IFACE_DEFINED
10  #define _IFACE_DEFINED
11
12  /* --- type definitions -------------------------------------------- */
13
14  typedef uint _iid;
15
16  #define NO_IID 0
17
18  #define IID_COMPAT(i1,i2)   \
19      ((i1) == (i2)       || \
20       (i1) == IID_I_POLY ||  \
21       (i2) == IID_I_POLY )
22
23  /* --- support macro definitions ----------------------------------- */
24
25  class _COMPONENT; // forward
26
27  class _INTERFACE
28      {
29      public:
30          const _iid          iid;
31          const _COMPONENT   *const objp;
32
33      public:
34          _INTERFACE (_iid id, _COMPONENT *op) : iid (id), objp (op) { }
35
36      protected:
37          virtual ~_INTERFACE (void) { } // (hack) - adds vtbl - simplifies ptr casts
38  #define __IFACE_OFFSET_OP0 1           // 1st operation starts at index 1 in vtbl
39      } ;                                // Keep in sync!
40
41  #define INTERFACE(i)            \
42      class i : public _INTERFACE \
43          {                       \
44          public:                 \
45              i (_COMPONENT *op) : _INTERFACE (IID_##i, op) { } \
46          protected:              \
47              i (void)  : _INTERFACE (0, NULL) { } \
48              i (i& ir) : _INTERFACE (0, NULL) { } \
49              virtual ~i (void) { }
50
51  #define END_INTERFACE           \
52          } ;
53
54  #define CONSTANTS    public:
55  #define BUSES        public:
56  #define OPERATIONS   public:
57  #define METHODS      public:
58
59  #define DEFINE_BUS   \
```

FIG. 19A

```
1      struct BUS          \
2          {
3
4   #define BUS(x)          \
5       struct x            \
6           {
7
8   #define END_BUS         \
9           } ;
10
11  #define INTERFACE_BUS(x) \
12      typedef x BUS
13
14  #define DEFAULTS(x) \
15      BUS (void) { x; }
16
17  #define BUS_DEFAULTS(b,x) \
18      b (void) { x; }
19
20  #define FACTORY_DEFAULTS(x) \
21      FACTORY_BUS (void) { x; }
22
23  #define OP(o)   \
24      virtual _stat o (BUS *bp) = 0
25
26  #endif // _IFACE_DEFINED
```

FIG. 19B

```
1   /* ---------------------------------------------------------------------- */
2   /*                      IFC: Project Interfaces                           */
3   /*                                                                        */
4   /*              I_TERMINAL.H - Terminal control                           */
5   /*                                                                        */
6   /*      Copyright (c) 1994-95 Object Dynamics Corp. All Rights Reserved.  */
7   /* ---------------------------------------------------------------------- */
8
9   #ifndef _I_TERMINAL_DEFINED
10  #define _I_TERMINAL_DEFINED
11
12
13  BUS ( B_TERMINAL )
14      // terminal identification
15      char            *namep    ;   // terminal name
16      uint            name_sz;      // size of name buffer
17
18      // terminal information
19      uint            type      ;   // terminal type (physical mechanism + direction)
20      uint32          card      ;   // terminal cardinality
21      flg16           attr      ;   // terminal attributes
22
23      // connection data
24      _iid            iid       ;   // terminal interface id (contract id)
25      _INTERFACE      *ip       ;   // v-table interface
26
27      // connection identification
28      _id32           conn_id;      // connection id (as defined by the terminal)
29      _COMPONENT      *comp     ;   // pointer to component ($$EV_EVB, see notes)
30      _id             link_id;      // link id ($$EV_EVB, see notes)
31
32  END_BUS
33
34  #define IID_I_TERMINAL    0x03
35
36  INTERFACE (I_TERMINAL)
37
38      /* ------------------------------------------------------------------ */
39      CONSTANTS
40          enum TYPE
41          {
42            T_INPUT  = 0,
43            T_OUTPUT = 1,
44          } ;
45
46          enum ATTR
47          {
48            A_STDSIG    = (1UL << 14),  // terminal for standard signal
49            A_FLOATING  = (1UL << 15),  // terminal is ok to be unconnected
50          } ;
51
52      /* ------------------------------------------------------------------ */
53      BUSES
54          INTERFACE_BUS ( B_TERMINAL );
55
56      /* ------------------------------------------------------------------ */
57      OPERATIONS
58          OP ( acquire       );
59          OP ( release       );
```

FIG 20A

```
1           OP ( connect        );
2           OP ( disconnect     );
3           OP ( get_info       );
4           OP ( get_context    );
5           OP ( set_context    );
6           OP ( qry_open       );
7           OP ( qry_get_first  );
8           OP ( qry_get_last   );
9           OP ( qry_get_next   );
10          OP ( qry_get_prev   );
11          OP ( qry_get_curr   );
12          OP ( qry_close      );
13
14   END_INTERFACE
15
16   /* declaration macro */
17
18   #define DECLARE_I_TERMINAL(c,1) \
19       IDEF (c, 1, I_TERMINAL)              \
20          OPDECL ( acquire        ); \
21          OPDECL ( release        ); \
22          OPDECL ( connect        ); \
23          OPDECL ( disconnect     ); \
24          OPDECL ( get_info       ); \
25          OPDECL ( get_context    ); \
26          OPDECL ( set_context    ); \
27          OPDECL ( qry_open       ); \
28          OPDECL ( qry_get_first  ); \
29          OPDECL ( qry_get_last   ); \
30          OPDECL ( qry_get_next   ); \
31          OPDECL ( qry_get_prev   ); \
32          OPDECL ( qry_get_curr   ); \
33          OPDECL ( qry_close      ); \
34       END_IDEF                              \
35       /* allow for semicolon */    \
36       typedef int c##_1_##_DECLARE_I_TERMINAL_DUMMY
37
38   // Descriptions:
39
40   // on    acquire
41   // in :  namep   - terminal name
42   //       comp    - component on the other side
43   //       link_id - link id
44   // out:  (ip)    - if type is T_INPUT - pointer to the terminal interface
45   //       type    - terminal type (I_TERMINAL::T_xxx)
46   //       iid     - expected interface id
47   //       conn_id - connection id assigned for this connection
48   // act:  acquire connection context
49   // s  :  ST_NOT_FOUND   - terminal not found
50   //       ST_NO_ROOM     - terminal cardinality exhausted
51
52   // on    release
53   // in :  namep   - terminal name
54   //       ip      - if type is T_OUTPUT - interface to which the output was
55   connected
56   //               if type is T_INPUT  - interface to release
57   //               ($$ may not be needed and in most cases can not be provided)
58   //       comp    - component on the other side
59   //       link_id - link id
```

```
1   //          conn_id - connection id assigned by this terminal on acquire
2   // out:     void
3   // act:     release terminal
4   // s  :     ST_NO_ACTION   - terminal was not connected
5   //                           (to/via specified interface or component)
6   //         ST_NOT_FOUND   - terminal not found
7
8   // on       connect
9   // in  :    namep    - terminal name
10  //         type     - terminal type (I_TERMINAL::T_xxx)
11  //         iid      - expected interface id
12  //         (ip)     - if type is T_OUTPUT - interface to connect to
13  //         comp     - component to connect to
14  //         link_id  - link id
15  //         conn_id  - connection id assigned by this terminal on acquire
16  // out:    void
17  // act:    connect terminal
18  // s  :    ST_REFUSE     - interface mismatch (e.g., unacceptable IID)
19  //         ST_NOT_FOUND  - terminal not found
20
21  // on      disconnect
22  // in  :   namep    - terminal name
23  //         ip       - if type is T_OUTPUT - interface to which the output is
24  connected
25  //                    if type is T_INPUT  - interface to disconnect
26  //                    ($$ may not be needed and in most cases can not be provided)
27  //         comp     - component to disconnect from
28  //         link_id  - link id
29  //         conn_id  - connection id assigned by this terminal on acquire
30  // out:    void
31  // act:    disconnect terminal
32  // s  :    ST_NO_ACTION  - terminal was not connected
33  //                           (to/via specified interface or component)
34
35  // on      get_info
36  // in  :   namep - terminal name
37  // out:    type  - terminal type (I_TERMINAL::T_xxx)
38  //         iid   - interface id of terminal
39  //         card  - terminal cardinality (static, not current)
40  //         attr  - terminal attributes
41  // act:    return information about specified terminal
42  // s  :    ST_NOT_FOUND  - terminal not found
43  // nb :    the information returned by this operation is not affected by
44  //         the current state of the terminal
45
46  // on      get_context
47  // not implemented
48
49  // on      set_context
50  // not implemented
51
52  // on      qry_open
53  // in  :   namep    - query string
54  // out:    ctx      - query context for subsequent qry_xxx operations
55  // act:    open query on terminal namespace
56  // s  :    ST_NO_ROOM    - too many open queries
57  //         ST_BAD_SYNTAX - bad query syntax
58
59  // on      qry_get_first
```

FIG 20C

```
1   // in  :  namep       - buffer for name or NULL
2   //        (name_sz)   - size of buffer, [bytes]
3   //        ctx         - query context from previous qry_xxx operation
4   // out:(*namep)       - terminal name
5   //        ctx         - query context for subsequent qry_xxx operation
6   // act:  get first matching terminal name
7   // s   :  ST_NOT_FOUND  - no matching terminals
8
9   // on    qry_get_last
10  // in  :  namep       - buffer for name or NULL
11  //        (name_sz)   - size of buffer, [bytes]
12  //        ctx         - query context from previous qry_xxx operation
13  // out:(*namep)       - terminal name
14  //        ctx         - query context for subsequent qry_xxx operation
15  // act:  get last matching terminal name
16  // s   :  ST_NOT_FOUND  - no matching terminals
17
18  // on    qry_get_next
19  // in  :  namep       - buffer for name or NULL
20  //        (name_sz)   - size of buffer, [bytes]
21  //        ctx         - query context from previous qry_xxx operation
22  // out:(*namep)       - terminal name
23  //        ctx         - query context for subsequent qry_xxx operation
24  // act:  get next matching terminal name
25  // s   :  ST_NOT_FOUND  - no more matching terminals
26
27  // on    qry_get_prev
28  // in  :  namep       - buffer for name or NULL
29  //        (name_sz)   - size of buffer, [bytes]
30  //        ctx         - query context from previous qry_xxx operation
31  // out:(*namep)       - terminal name
32  //        ctx         - query context for subsequent qry_xxx operation
33  // act:  get previous matching terminal name
34  // s   :  ST_NOT_FOUND  - no more matching terminals
35
36  // on    qry_get_curr
37  // in  :  namep       - buffer for name or NULL
38  //        (name_sz)   - size of buffer, [bytes]
39  //        ctx         - query context from previous qry_xxx operation
40  // out:(*namep)       - terminal name
41  // act:  get current terminal name in query
42  // nb  :  ctx is unchanged
43
44  // on    qry_close
45  // in  :  ctx         - query context from qry_open or another qry_xxx operation
46  // out:  void
47  // act:  close query on terminal name space
48
49  // $$EV_EVB -- fields used by the event bus terminal interface
50  // Note: comp in the bus is provided for use by connectivity components only.
51  //        It should not be used by regular components & assemblies.
52  //        comp contains pointer identifying the component at the other side
53  //        of the link.
54  //        Both link_id and comp may be used for identification of the particular
55  //        connection on a terminal. They should not be interpreted in any way
56  //        nor the comp should be dereferenced. Sometimes the ip field on
57  //        disconnect and release may be used for connection identification, too.
58
59  // Note: the assembly manager (dflt assembly implementation) does not store
```

FIG 20D

```
1   //         the connection id -- so it may not be provided on disconnect/release
2
3   // Note: $$ on disconnect ip may not be provided in many cases:
4   //         a) when output array is connected to input array
5   //         b) when assy output is connected to input array
6   //         In both examples above the input ptr cannot be obtained from the output
7   //         and therefore cannot be passed on input's disconnect.
8   //         (Generally, none of the existing parts uses ip for identification)
9
10  #endif // _I_TERMINAL_DEFINED
```

FIG 20E

```
 1  /* ---------------------------------------------------------------------- */
 2  /*                     IFC: Project Interfaces                            */
 3  /*                                                                        */
 4  /*                     I_PROP.H - Property                                */
 5  /*                                                                        */
 6  /*       Copyright (c) 1994-95 Object Dynamics Corp. All Rights Reserved. */
 7  /* ---------------------------------------------------------------------- */
 8
 9  #ifndef _I_PROP_DEFINED
10  #define _I_PROP_DEFINED
11
12  /* --- .type values */
13
14  #define PT_USER      0          // user defined
15  #define PT_INT       1          // signed int
16  #define PT_UINT      2          // unsigned int
17  #define PT_CHAR      3          // uchar
18  #define PT_UPCHAR    4          // upcaseduchar
19  #define PT_STRING    5          // asciiz, no multiple spaces
20  #define PT_NAME      6          // upcased STRING
21  #define PT_DATA      7          // data string (0x1b,'-0', etc.)
22  #define PT_NONE      8          // 1st invalid value of .type
23
24
25  BUS ( B_PROP )
26
27      char    *namep   ;
28      size_t  name_sz;
29      uint32  type     ;
30      void    *p       ;
31      size_t  sz       ;
32      size_t  len      ;
33      _ctx    ctx      ;
34
35  END_BUS
36
37  #define IID_I_PROP    0x02
38
39  INTERFACE (I_PROP)
40
41      /* ---------------------------------------------------------------- */
42      CONSTANTS
43
44      /* ---------------------------------------------------------------- */
45      BUSES
46          INTERFACE_BUS ( B_PROP );
47
48      /* ---------------------------------------------------------------- */
49      OPERATIONS
50          OP ( get            );
51          OP ( set            );
52          OP ( chk            );
53          OP ( get_info       );
54          OP ( qry_open       );
55          OP ( qry_get_first  );
56          OP ( qry_get_last   );
57          OP ( qry_get_next   );
58          OP ( qry_get_prev   );
59          OP ( qry_get_curr   );
```

FIG. 21A

```
            OP ( qry_close    );

END_INTERFACE

/* declaration macro */ define DECLARE_I_PROP(c,1)     \
    IDEF (c, 1, I_PROP)         \
       OPDECL ( get          ); \
       OPDECL ( set          ); \
       OPDECL ( chk          ); \
       OPDECL ( get_info     ); \
       OPDECL ( qry_open     ); \
       OPDECL ( qry_get_first); \
       OPDECL ( qry_get_last ); \
       OPDECL ( qry_get_next ); \
       OPDECL ( qry_get_prev ); \
       OPDECL ( qry_get_curr ); \
       OPDECL ( qry_close    ); \
    END_IDEF                    \
    /* allow for semicolon */   \
    typedef int c##_1_##_DECLARE_I_PROP_DUMMY // --- Descriptions // note: on get, set and chk - if value type is specified and it doesn't match the
//          internal type of the property, the component may (implementation-defined)
//          convert the value to the appropriate type;

// on     get
// in :   namep      - property name
//        p          - buffer for value or NULL
//        (sz)       - size of buffer (if p not NULL), [bytes]
//        type       - requested type or IP_NONE for any
// out:(*p)          - value
//        len        - value length (for both fixed & var size types), [bytes]
//        type       - property type
// act:   get property value
// s  :   ST_BAD_NAME    - property name not found
//        ST_OVERFLOW    - buffer too small
//        ST_REFUSE      - incorrect type
//        ST_BAD_ACCESS  - property is write-only // on     set
// in :   namep      - property name
//        p          - buffer for value or NULL to clear
//        (len)      - size of value (for var size values), [bytes]
//        type       - type or IP_NONE if not known
// out:   void
// act:   set property value
// s  :   ST_BAD_NAME    - property name not found
//        ST_BAD_VALUE   - bad property value
//        ST_OVERFLOW    - value too long
//        ST_REFUSE      - incorrect type
//        ST_BAD_ACCESS  - property is read-only // on     chk
```

FIG. 21B

```
1   // in :   namep      - property name
2   //        p          - buffer for value or NULL to clear
3   //        (len)      - size of value (for var size values), [bytes]
4   //        type       - value type or IP_NONE if not known
5   // out:   void
6   // act:   check if property may be set to value (valchk)
7   // s  :   ST_BAD_NAME    - property name not found
8   //        ST_BAD_VALUE   - bad property value
9   //        ST_OVERFLOW    - value too long
10  //        ST_REFUSE      - incorrect type
11  //        ST_BAD_ACCESS  - property is read-only
12
13
14  // on     get_info
15  // in :   namep      - property name
16  // out:   type       - property type
17  // act:   get information about specified property
18  // s  :   ST_BAD_NAME    - property name not found
19  // nb :   the information returned by this operation is not affected by
20  //        the current value of the property
21
22  // on     qry_open
23  // in :   namep      - query string
24  // out:   ctx        - query context for subsequent qry_xxx operations
25  // act:   open query on property space
26  // s  :   ST_NO_ROOM     - too many open queries
27  //        ST_BAD_SYNTAX  - bad query syntax
28
29  // on     qry_get_first
30  // in :   namep      - buffer for name or NULL
31  //        (name_sz)  - size of buffer, [bytes]
32  //        ctx        - query context from previous qry_xxx operation
33  // out:(*namep)      - property name
34  //        ctx        - query context for subsequent qry_xxx operation
35  // act:   get first matching property name
36  // s  :   ST_NOT_FOUND   - no matching properties
37
38  // on     qry_get_last
39  // in :   namep      - buffer for name or NULL
40  //        (name_sz)  - size of buffer, [bytes]
41  //        ctx        - query context from previous qry_xxx operation
42  // out:(*namep)      - property name
43  //        ctx        - query context for subsequent qry_xxx operation
44  // act:   get last matching property name
45  // s  :   ST_NOT_FOUND   - no matching properties
46
47  // on     qry_get_next
48  // in :   namep      - buffer for name or NULL
49  //        (name_sz)  - size of buffer, [bytes]
50  //        ctx        - query context from previous qry_xxx operation
51  // out:(*namep)      - property name
52  //        ctx        - query context for subsequent qry_xxx operation
53  // act:   get next matching property name
54  // s  :   ST_NOT_FOUND   - no more matching properties
55
56  // on     qry_get_prev
57  // in :   namep      - buffer for name or NULL
58  //        (name_sz)  - size of buffer, [bytes]
59  //        ctx        - query context from previous qry_xxx operation
```

FIG. 21C

```
1   // out:(*namep)   - property name
2   //      ctx       - query context for subsequent qry_xxx operation
3   // act: get previous matching property name
4   // s  : ST_NOT_FOUND  - no more matching properties
5
6   // on   qry_get_curr
7   // in : namep     - buffer for name or NULL
8   //      (name_sz) - size of buffer, [bytes]
9   //      ctx       - query context from previous qry_xxx operation
10  // out:(*namep)   - property name
11  // act: get current property name in query
12  // nb : ctx is unchanged
13
14  // on   qry_close
15  // in : ctx       - query context from qry_open or another qry_xxx operation
16  // out: void
17  // act: close query on property space
18
19  #endif // _I_PROP_DEFINED
20
```

FIG. 21D

```
 1   /* ------------------------------------------------------------------- */
 2   /*                    IFC: Project Interfaces                          */
 3   /*                                                                     */
 4   /*         I_FACTORY.H - Component creation / destruction              */
 5   /*                                                                     */
 6   /*     Copyright (c) 1994-95 Object Dynamics Corp. All Rights Reserved. */
 7   /* ------------------------------------------------------------------- */
 8
 9   #ifndef _I_FACTORY_DEFINED
10   #define _I_FACTORY_DEFINED
11
12
13   #define IID_I_FACTORY      0x01
14
15   INTERFACE (I_FACTORY)
16
17       /* ------------------------------------------------------------- */
18       CONSTANTS
19          enum
20             {
21             A_PRIMARY   = (1UL << 14),      // create primary object (factory)
22             A_NO_ALLOC  = (1UL << 13),      // don't call new to alloc memory
23             A_GENERIC   = (1UL << 12),      // generic factory bus (no ext. data)
24             } ;
25
26       /* ------------------------------------------------------------- */
27       BUSES
28          DEFINE_BUS
29             flg32              attr;        // factory attributes
30             _COMPONENT         *objp;       // ptr to component or memory
31             _INTERFACE         *termp;      // terminal interface
32             _INTERFACE         *propp;      // property interface
33             _ctx               ctx ;        // creation context or NO_CTX
34          END_BUS
35
36       /* ------------------------------------------------------------- */
37       OPERATIONS
38          OP ( create_dflts  );
39          OP ( create        );
40          OP ( destroy       );
41          OP ( get_part_ifc  );
42
43   END_INTERFACE
44
45   /* declaration macro */
46
47   #define DECLARE_I_FACTORY(c,l)           \
48       IDEF (c, l, I_FACTORY)               \
49          OPDECL (create       );           \
50          OPDECL (create_dflts );           \
51          OPDECL (destroy      );           \
52          OPDECL (get_part_ifc );           \
53       END_IDEF                             \
54       /* allow for semicolon */            \
55       typedef int c##_l_##_DECLARE_I_FACTORY_DUMMY
56
57   /* --- Descriptions ------------------------------------------------- */
58
59   // on   create_dflts    (struct BUS or derived)
```

FIG. 22A

```
1   // in :   void
2   // out:   attr  - default attributes
3   //       objp  - NULL
4   // act:   fill FACTORY_BUS with defaults
5
6   // on    create          (struct BUS or derived)
7   // in :   attr  - object attributes (A_xxx)
8   //       (objp) - ptr to allocated memory for object instance (if A_NO_ALLOC)
9   //        ctx   - additional context or NO_CTX
10  // out:   objp  - ptr to new object
11  //        termp - pointer to the terminal interface of the part
12  //        propp - pointer to the property interface of the part
13  // act:   create new object
14  // nb :   if A_GENERIC is set, then the bus passed is strictly I_FACTORY::BUS and
15  //        not a derived one.
16  // nb :   ctx==NO_CTX is always accepted; some components may allow additional
17  //        parameters in/through this field
18
19  // on    destroy         (struct BUS or derived)
20  // in :   void
21  // out:   void
22  // act:   destroy object
23
24  // on    get_part_ifc    (struct BUS or derived)
25  // in :   void
26  // out:   termp - pointer to the terminal interface of the part
27  //        propp - pointer to the property interface of the part
28  // act:   return part interfaces
29
30  #endif // _I_FACTORY_DEFINED
```

FIG. 22B

```
 1   /* --------------------------------------------------------------------- */
 2   /*                     CLP: Collections Parts                            */
 3   /*                                                                       */
 4   /*              CP_BBA.CPP - Bag on Byte Array                           */
 5   /*                                                                       */
 6   /* Copyright (c) 1993-1994 Object Dynamics Corp. All Rights Reserved.    */
 7   /* --------------------------------------------------------------------- */
 8
 9   #include <rtx_pre.h>
10   #include <stddef.h>
11   #include <stdlib.h>
12   #include <memory.h>
13   #include <rtx_post.h>
14
15   #include <rtx.h>
16   #include <asm.h>
17   #include <thp.h>
18
19   #include <iface.h>
20   #include <part.h>
21
22   #include <i_factor.h>
23   #include <i_prop.h>
24   #include <i_drain.h>
25   #include <i_bag.h>
26   #include <i_agm.h>
27   #include <i_bytear.h>
28
29   /* --- Definitions ----------------------------------------------------- */
30
31   struct CP_BBA_ENTRY_HDR
32       {
33       enum ATTR
34           {
35           A_VALID     = VALID,
36           A_FREE      = FREE,
37           A_KILLED    = KILLED,
38           };
39
40       flg32       attr;           // attributes [A_VALID, A_FREE, A_KILLED]
41       uint32      card;           // cardinality
42       };
43
44   /** --- Component Definition ------------------------------------------- */
45
46
47   #define CP_BBA_NAME   "CP_BBA"
48
49   PART ( CP_BBA )
50
51       /* ----------------------------------------------------------------- */
52       BUSES
53           DEFAULT_FACTORY_BUS ( CP_BBA );
54
55       /* ----------------------------------------------------------------- */
56       INPUTS
57           IDECL ( CP_BBA , factory    , I_FACTORY   );
58           IDECL ( CP_BBA , term       , I_TERMINAL  );
59           IDECL ( CP_BBA , prop       , I_PROP      );
```

FIG. 23A

```
1              IDECL   ( CP_BBA  , bag          , I_BAG        );
2
3              IDECL_RST (CP_BBA);
4
5       OUTPUTS
6          ODECL  ( CP_BBS  , arr          , I_BYTEARR    );
7
8
9   END_PART   // CP_BBA
10
11  #ifdef BIT32
12     #define hmemcpy memcpy
13     #define HUGE
14  #else
15     #define HUGE  __huge
16  #endif
17
18  /* --- Definitions ------------------------------------------------------ */
19
20  #define AGM_CHUNK     1024
21
22  BEGIN_SELF ( CP_BBA )
23     // data
24     uint32        n_entries;     // number of entries
25     void          *buffp;        // buffer for one entry
26     uint32        buff_sz;       // buffer size (dep. on data_sz)
27
28     // properties
29     uint32        data_sz;       // data size
30     uint32        key_sz;        // key size
31     uint32        key_off;       // key offset
32     char          name [64];
33  END_SELF
34
35  BEGIN_CLASS_DATA ( CP_BBA )
36      uint16    instance_counter;        // ...
37  END_CLASS_DATA
38
39  /* --- Interface declarations ------------------------------------------- */
40
41  DECLARE_I_FACTORY   ( CP_BBA, factory );
42  DECLARE_I_TERMINAL  ( CP_BBA, term    );
43  DECLARE_I_PROP      ( CP_BBA, prop    );
44  DECLARE_I_BAG       ( CP_BBA, bag     );
45
46  DECLARE_RST         (CP_BBA);
47
48  /* --- I/O tables ------------------------------------------------------- */
49
50  INPUT_TABLE
51     INPUT     (CP_BBA, prop    , I_PROP     )
52     INPUT     (CP_BBA, bag     , I_BAG      )
53
54     INPUT_RST (CP_BBA)
55  END_INPUT_TABLE
56
57  OUTPUT_TABLE
58     OUTPUT    (CP_BBA, arr     , I_BYTEARR )
59
```

FIG. 23B

```
1    END_OUTPUT_TABLE
2
3    /* --- Constants & tables ---------------------------------------------------- */
4
5    PROPERTIES
6        /* type       name           base    field       min       max       */
7
8        PROP_UINT   ("DATA_SIZE"            , SELF, data_sz    , 1      , 1024      ),
9        PROP_UINT   ("KEY_SIZE"             , SELF, key_sz     , 1      , 1024      ),
10       PROP_UINT   ("KEY_OFFSET"           , SELF, key_off    , 0      , 1023      ),
11
12       PROP_STRING ("name"                 , SELF, name       , 0      , 64        ),
13   END_PROPERTIES
14
15   /* --- Init / Cleanup -------------------------------------------------------- */
16
17   INIT (CP_BBA)
18       {
19       /** init class data */
20       cp->instance_counter = 0;
21
22       REGISTER (CP_BBA);
23
24       return (ST_OK);
25       } /* INIT (CP_BBA) */
26
27   CLEANUP (CP_BBA)
28       {
29       DEREGISTER (CP_BBA);
30
31       return (ST_OK);
32       } /* CLEANUP (CP_BBA) */
33
34   /* --- Constructors ---------------------------------------------------------- */
35
36   DEFAULT_PART_CONSTRUCTORS (CP_BBA);
37
38
39   /* --- Operations: factory --------------------------------------------------- */
40
41   DEFAULT_PART_FACTORY   (CP_BBA, factory);
42   DEFAULT_PART_TERMINAL  (CP_BBA, term   );
43   DEFAULT_PART_PROP      (CP_BBA, prop   );
44
45   /* --- Operations ------------------------------------------------------------ */
46
47   METHOD (CP_BBA, create_dflts , FACTORY_BUS)
48       {
49
50       // ...
51
52       return (ST_OK);
53       } END_METHOD /* CP_BBA, create_dflts    */
54
55   METHOD (CP_BBA, create , FACTORY_BUS)
56       {
57       _stat   s;
58
59       /** valchk */
```

FIG. 23C

```
1       if (bp == NULL) return (ST_NULL_PTR);
2
3       /** open interfaces */
4       OPEN_INTERFACE (CP_BBA, factory    );
5       if (bp->attr & I_FACTORY::A_PRIMARY) return (ST_OK);   // valid primary obj
6       OPEN_INTERFACE (CP_BBA, term       );
7       OPEN_INTERFACE (CP_BBA, prop       );
8       OPEN_INTERFACE (CP_BBA, bag        );
9       OPEN_RST       (CP_BBA);
10
11      /** init self */
12      sp->n_entries = 0;
13      sp->buffp     = NULL;
14      sp->buff_sz   = 0;
15      sp->data_sz   = 2;
16      sp->key_sz    = 2;
17      sp->key_off   = 0;
18
19      /** internal reset */
20      (void)call (sp->thisp->iRST, raise, NULL);
21
22      /** special processing for default name */
23      os_con_sprintf (sp->name, "%.50s%d", CP_BBA_NAME, ++(cp->instance_counter));
24
25      return (ST_OK);
26      } END_METHOD /* CP_BBA, create */
27
28  METHOD (CP_BBA, destroy, FACTORY_BUS)
29      {
30      /** close interfaces */
31      CLOSE_INTERFACE (CP_BBA, factory   );
32      CLOSE_INTERFACE (CP_BBA, term      );
33      CLOSE_INTERFACE (CP_BBA, prop      );
34      CLOSE_INTERFACE (CP_BBA, bag       );
35      CLOSE_RST       (CP_BBA);
36
37      /** free entry buffer */
38      if (sp->buffp != NULL) (void)os_smp_free (sp->buffp);
39
40      /** init self */
41      sp->n_entries = 0;
42      sp->buffp     = NULL;
43      sp->buff_sz   = 0;
44      sp->data_sz   = 2;
45
46      return (ST_OK);
47      } END_METHOD /* CP_BBA, destroy */
48
49  /* --- Operations: bag ------------------------------------------------------ */
50
51  OPERATION ( CP_BBA, bag, add    )
52      {
53      I_BYTEARR::BUS      ab;
54      uint32              i;
55      CP_BBA_ENTRY_HDR    *hdrp;
56      byte                *datap;
57      _stat               s;
58
59      /** valchk */
```

FIG. 23D

```
1    if (bp == NULL) return (ST_NULL_PTR);
2    if (bp->datap == NULL) return (ST_INVALID);
3
4    /** internal init */
5    hdrp  = (CP_BBA_ENTRY_HDR *)sp->buffp;
6    datap = (byte *)sp->buffp + sizeof (*hdrp);
7
8    /** --- lookup */
9    for (i = 0; i < sp->n_entries; i++)
10   {
11     /** read entry */
12     ab.p    = sp->buffp;
13     ab.sz   = sp->buff_sz;
14     ab.pos  = i * sp->buff_sz;
15     ab.len  = sp->buff_sz;
16     ab.attr = I_BYTEARR::A_EXACT;
17     s = out (arr, read, &ab);
18     if (s == ST_EOF) return (ST_UNEXPECTED);
19     if_ret (s, s);
20
21     /** skip if empty */
22     if ((hdrp->attr == CP_BBA_ENTRY_HDR::A_FREE)   ||
23         (hdrp->attr == CP_BBA_ENTRY_HDR::A_KILLED)) continue;
24
25     /** skip if different */
26     if (memcmp ((void *)(datap + sp->key_off),
27                 (void *)((byte *)bp->datap + sp->key_off),
28                 sp->key_sz) != 0) continue;
29
30     /** sanity chk */
31     if (hdrp->card == 0) return (ST_UNEXPECTED);
32
33     /** increment cardinality */
34     if (hdrp->card < MAXUINT32 - 1) (hdrp->card)++;
35     else return (ST_OVERFLOW);
36
37     /** write back header only */
38     ab.p    = hdrp;
39     ab.len  = sizeof (*hdrp);
40     ab.pos  = i * sp->buff_sz;
41     ab.attr = 0;
42     s = out (arr, write, &ab);
43     if (s == ST_OVERFLOW) return (ST_UNEXPECTED);
44     if_ret (s, s);
45
46     /** pass cardinality */
47     bp->card = hdrp->card;
48
49     /** return */
50     return (ST_OK);
51   } // for
52
53   /** --- add */
54   for (i = 0; i < sp->n_entries; i++)
55     {
56     /** read entry */
57     ab.p    = sp->buffp;
58     ab.sz   = sp->buff_sz;
59     ab.pos  = i * sp->buff_sz;
```

FIG. 23E

```
1       ab.len  = sp->buff_sz;
2       ab.attr = I_BYTEARR::A_EXACT;
3       s = out (arr, read, &ab);
4       if (s == ST_EOF) return (ST_UNEXPECTED);
5       if_ret (s, s);
6
7       /** write if empty */
8       if ((hdrp->attr == CP_BBA_ENTRY_HDR::A_FREE) != 0)
9         {
10          /** init header */
11          hdrp->card = 1;
12          hdrp->attr = CP_BBA_ENTRY_HDR::A_VALID;
13
14          /** init data */
15          memcpy ((void *)datap, bp->datap, sp->data_sz);
16
17          /** write header and data */
18          ab.p    = sp->buffp;
19          ab.len  = sp->buff_sz;
20          ab.pos  = i * sp->buff_sz;
21          ab.attr = 0;
22          s = out (arr, write, &ab);
23          if (s == ST_OVERFLOW) return (ST_UNEXPECTED);
24          if_ret (s, s);
25
26          /** pass cardinality */
27          bp->card = hdrp->card;
28
29          /** return */
30          return (ST_OK);
31         }
32      } // for
33
34      /** chk for overflow */
35      if (sp->n_entries >= MAXUINT32 - 1) return (ST_NO_ROOM);
36
37      /** init header */
38      hdrp->card = 1;
39      hdrp->attr = CP_BBA_ENTRY_HDR::A_VALID;
40
41      /** init data */
42      memcpy ((void *)datap, bp->datap, sp->data_sz);
43
44      /** append */
45      ab.p    = sp->buffp;
46      ab.len  = sp->buff_sz;
47      ab.pos  = sp->n_entries * sp->buff_sz;
48      ab.attr = I_BYTEARR::A_GROW;
49      s = out (arr, write, &ab);
50      if (s == ST_OVERFLOW) return (ST_UNEXPECTED);
51      if_ret (s, s);
52
53      /** increment number of entries */
54      (sp->n_entries)++;
55
56      /** pass cardinality */
57      bp->card = hdrp->card;
58
59      return (ST_OK);
```

FIG. 23F

```
1      } END_OPERATION /* bag, add       */
2
3   // TO DO: other operation of I_BAG to be implemented here...
4
5   /* --- Signals ------------------------------------------------------------ */
6
7   SIGNAL_RST ( CP_BBA )
8       {
9       I_AGM::BUS          ab;
10      _stat               s;
11
12      /** free entry buffer */
13      if (sp->buffp != NULL) (void)os_smp_free (sp->buffp);
14
15      /** init self */
16      sp->n_entries = 0;
17      sp->buffp     = NULL;
18      sp->buff_sz   = sizeof (CP_BBA_ENTRY_HDR) + max (sp->data_sz, 1);
19
20      /** alloc entry buffer */
21      if_ret (s, os_smp_alloc (sp->buff_sz, &(sp->buffp)));
22
23      return (ST_OK);
24      } END_SIGNAL /* RST */
25
26
```

FIG. 23G

```
 1   /* ---------------------------------------------------------------------- */
 2   /*                                                                        */
 3   /*                         EVP: Event Flow Parts                          */
 4   /*                                                                        */
 5   /*                   EV_PCN.CPP - POLY T-Connector                        */
 6   /*                                                                        */
 7   /*        Copyright (c) 1994-95 Object Dynamics Corp. All Rights Reserved. */
 8   /* ---------------------------------------------------------------------- */
 9   /* Version 1.10                                                           */
10   /* ---------------------------------------------------------------------- */
11   #include <rtx_pre.h>
12   #include <stddef.h>
13   #include <stdlib.h>
14   #include <rtx_post.h>
15
16   #include <rtx.h>
17   #include <asm.h>
18
19   #include <iface.h>
20   #include <part.h>
21   #include <assembly.h>
22
23   #include <i_factor.h>
24   #include <i_prop.h>
25   #include <i_term.h>
26   #include <i_drain.h>
27   #include <i_poly.h>
28
29   #define EV_PCN_NAME  "EV_PCN"
30
31   ASSEMBLY (EV_PCN)
32
33       /* ------------------------------------------------------------------ */
34       BUSES
35           DEFAULT_FACTORY_BUS (EV_PCN);
36
37       /* ------------------------------------------------------------------ */
38       INPUTS
39           IDECL ( EV_PCN , factory    , I_FACTORY  );
40           IDECL ( EV_PCN , term       , I_TERMINAL );
41           IDECL ( EV_PCN , termi      , I_TERMINAL );
42           IDECL ( EV_PCN , prop       , I_PROP     );
43           IDECL ( EV_PCN , propi      , I_PROP     );
44           IDECL ( EV_PCN , in         , I_POLY     );
45
46       OUTPUTS
47           ODECL ( EV_PCN , out        , I_POLY     );
48           ODECL ( EV_PCN , aux        , I_DRAIN    );
49
50
51   END_ASSEMBLY
52
53
54   /* --- Definitions ------------------------------------------------------ */
55
56   BEGIN_SELF (EV_PCN)
57
58       DEFAULT_ASM_SELF;
59
```

FIG. 24A

```
1      /* group properties */
2      uint32    ev_id_min;
3      uint32    ev_id_max;
4
5  END_SELF
6
7  BEGIN_CLASS_DATA (EV_PCN)
8      // none
9  END_CLASS_DATA
10
11 DECLARE_ASM (EV_PCN);
12
13 /* --- I/O tables ------------------------------------------------------- */
14
15 INPUT_TABLE
16     INPUT      (EV_PCN, prop    , I_PROP    )
17     INPUT      (EV_PCN, in      , I_POLY    )
18 END_INPUT_TABLE
19
20 OUTPUT_TABLE
21     OUTPUT_I   (EV_PCN, out     , I_POLY    )
22     OUTPUT_I   (EV_PCN, aux     , I_DRAIN   )
23 END_OUTPUT_TABLE
24
25 /* --- Constants & tables ----------------------------------------------- */
26
27 ASM_PARTS
28     NEW_PART ( p2d, EV_P2D )
29     NEW_PART ( tcn, EV_TCN )
30     NEW_PART ( d2p, EV_D2P )
31 END_ASM_PARTS
32
33 ASM_PARAMETRIZATION
34     // none
35 END_ASM_PARAMETRIZATION
36
37 ASM_LINKS
38     //        from output              to input
39
40     LINK     ( *   , in            , p2d, in   )
41     LINK     ( p2d, out            , tcn, in   )
42     LINK     ( tcn, out            , d2p, in   )
43     LINK     ( d2p, out            , *  , out  )
44     LINK     ( tcn, aux            , *  , aux  )
45
46 END_ASM_LINKS
47
48 ASM_PROPERTY_GROUP ( ev_id_min_group )
49     ASM_PROP_MEMBER ( tcn  , OUT.EV_ID_MIN )
50     ASM_PROP_MEMBER ( tcn  , AUX.EV_ID_MIN )
51 END_ASM_PROPERTY_GROUP
52
53 ASM_PROPERTY_GROUP ( ev_id_max_group )
54     ASM_PROP_MEMBER ( tcn  , OUT.EV_ID_MAX )
55     ASM_PROP_MEMBER ( tcn  , AUX.EV_ID_MAX )
56 END_ASM_PROPERTY_GROUP
57
58 ASM_PROPERTIES
59     ASM_PROP_ALIAS ( OUT.INVERT   , tcn , OUT.INVERT   )
```

FIG. 24B

```
1       ASM_PROP_ALIAS   ( AUX.INVERT    , tcn , AUX.INVERT    )
2
3       ASM_PROP_GROUP   ( EV_ID_MIN     , ev_id_min_group     )
4       ASM_PROP_GROUP   ( EV_ID_MAX     , ev_id_max_group     )
5   END_ASM_PROPERTIES
6
7   ASM_GROUP_PROPERTY_DESC
8
9     /* type      name         base   field       min         max      */
10
11      PROP_UINT ("EV_ID_MIN", SELF, ev_id_min , MINUINT32 , MAXUINT32 ),
12      PROP_UINT ("EV_ID_MAX", SELF, ev_id_max , MINUINT32 , MAXUINT32 ),
13
14  END_ASM_GROUP_PROPERTY_DESC
15
16  DEFAULT_ASM (EV_PCN);
17
```

FIG. 24C

```
1   /* ------------------------------------------------------------------ */
2   /*                    IFC: Project Interfaces                         */
3   /*                                                                    */
4   /*              I_POLY.H - Polymorphic                                */
5   /*                                                                    */
6   /*     Copyright (c) 1994-95 Object Dynamics Corp. All Rights Reserved. */
7   /* ------------------------------------------------------------------ */
8
9   #ifndef _I_POLY_DEFINED
10  #define _I_POLY_DEFINED
11
12  #define IID_I_POLY    0x04
13
14  INTERFACE (I_POLY)
15
16      /* ------------------------------------------------------------------ */
17      CONSTANTS
18
19      /* ------------------------------------------------------------------ */
20      BUSES
21          DEFINE_BUS
22              // none
23          END_BUS
24
25      /* ------------------------------------------------------------------ */
26      OPERATIONS
27          OP ( op0      );
28          OP ( op1      );
29          OP ( op2      );
30          OP ( op3      );
31          OP ( op4      );
32          OP ( op5      );
33          OP ( op6      );
34          OP ( op7      );
35          OP ( op8      );
36          OP ( op9      );
37          OP ( op10     );
38          OP ( op11     );
39          OP ( op12     );
40          OP ( op13     );
41          OP ( op14     );
42          OP ( op15     );
43          OP ( op16     );
44          OP ( op17     );
45          OP ( op18     );
46          OP ( op19     );
47          OP ( op20     );
48          OP ( op21     );
49          OP ( op22     );
50          OP ( op23     );
51          OP ( op24     );
52          OP ( op25     );
53          OP ( op26     );
54          OP ( op27     );
55          OP ( op28     );
56          OP ( op29     );
57          OP ( op30     );
58          OP ( op31     );
59          OP ( op32     );
```

FIG. 25A

```
 1            OP ( op33         );
 2            OP ( op34         );
 3            OP ( op35         );
 4            OP ( op36         );
 5            OP ( op37         );
 6            OP ( op38         );
 7            OP ( op39         );
 8            OP ( op40         );
 9            OP ( op41         );
10            OP ( op42         );
11            OP ( op43         );
12            OP ( op44         );
13            OP ( op45         );
14            OP ( op46         );
15            OP ( op47         );
16            OP ( op48         );
17            OP ( op49         );
18            OP ( op50         );
19            OP ( op51         );
20            OP ( op52         );
21            OP ( op53         );
22            OP ( op54         );
23            OP ( op55         );
24            OP ( op56         );
25            OP ( op57         );
26            OP ( op58         );
27            OP ( op59         );
28            OP ( op60         );
29            OP ( op61         );
30            OP ( op62         );
31            OP ( op63         );
32
33     END_INTERFACE
34
35     /* declaration macro */
36
37     #define DECLARE_I_POLY(c,l)                  \
38          IDEF (c, l, I_POLY)                     \
39             OPDECL ( op0          );             \
40             OPDECL ( op1          );             \
41             OPDECL ( op2          );             \
42             OPDECL ( op3          );             \
43             OPDECL ( op4          );             \
44             OPDECL ( op5          );             \
45             OPDECL ( op6          );             \
46             OPDECL ( op7          );             \
47             OPDECL ( op8          );             \
48             OPDECL ( op9          );             \
49             OPDECL ( op10         );             \
50             OPDECL ( op11         );             \
51             OPDECL ( op12         );             \
52             OPDECL ( op13         );             \
53             OPDECL ( op14         );             \
54             OPDECL ( op15         );             \
55             OPDECL ( op16         );             \
56             OPDECL ( op17         );             \
57             OPDECL ( op18         );             \
58             OPDECL ( op19         );             \
59             OPDECL ( op20         );             \
```

FIG. 25B

```
1           OPDECL ( op21         );       \
2           OPDECL ( op22         );       \
3           OPDECL ( op23         );       \
4           OPDECL ( op24         );       \
5           OPDECL ( op25         );       \
6           OPDECL ( op26         );       \
7           OPDECL ( op27         );       \
8           OPDECL ( op28         );       \
9           OPDECL ( op29         );       \
10          OPDECL ( op30         );       \
11          OPDECL ( op31         );       \
12          OPDECL ( op32         );       \
13          OPDECL ( op33         );       \
14          OPDECL ( op34         );       \
15          OPDECL ( op35         );       \
16          OPDECL ( op36         );       \
17          OPDECL ( op37         );       \
18          OPDECL ( op38         );       \
19          OPDECL ( op39         );       \
20          OPDECL ( op40         );       \
21          OPDECL ( op41         );       \
22          OPDECL ( op42         );       \
23          OPDECL ( op43         );       \
24          OPDECL ( op44         );       \
25          OPDECL ( op45         );       \
26          OPDECL ( op46         );       \
27          OPDECL ( op47         );       \
28          OPDECL ( op48         );       \
29          OPDECL ( op49         );       \
30          OPDECL ( op50         );       \
31          OPDECL ( op51         );       \
32          OPDECL ( op52         );       \
33          OPDECL ( op53         );       \
34          OPDECL ( op54         );       \
35          OPDECL ( op55         );       \
36          OPDECL ( op56         );       \
37          OPDECL ( op57         );       \
38          OPDECL ( op58         );       \
39          OPDECL ( op59         );       \
40          OPDECL ( op60         );       \
41          OPDECL ( op61         );       \
42          OPDECL ( op62         );       \
43          OPDECL ( op63         );       \
44       END_IDEF                           \
45       /* allow for semicolon */          \
46       typedef int c##_1_##_DECLARE_I_POLY_DUMMY
47
48
49   #endif // _I_POLY_DEFINED
50
```

FIG. 25C

METHOD AND SYSTEM FOR CONSTRUCTING SOFTWARE COMPONENTS AND SYSTEMS AS ASSEMBLIES OF INDEPENDENT PARTS

This application depends for priority upon U.S. Provisional Patent Application Ser. No. 60/008,699, filed Dec. 15, 1995, which is incorportated herein in its entirety by reference thereto.

BACKGROUND

1. Field of the Invention

The present invention is related to the field of object-oriented software engineering, and, more specifically, to a method and a system for constructing software components and entire systems using object composition.

2. Discussion of the Background Art

Over the last fifteen years, the object paradigm, including object-oriented analysis, design, programming and testing, has become the predominant paradigm for building software systems. A wide variety of methods, tools and techniques have been developed to support various aspects of object-oriented software construction, from formal methods for analysis and design, through a number of object-oriented languages, component object models and object-oriented databases, to a number of CASE systems and other tools that aim to automate one or more aspects of the development process.

With the maturing of the object paradigm, the focus has shifted from methods for programming objects as abstract data types to methods for designing and building systems of interacting objects. As a result, methods and means for expressing and building structures of objects have become increasingly important. Object composition has emerged and is rapidly gaining acceptance as a general and efficient way to express structural relationships between objects. New analysis and design methods based on object composition have developed and most older methods have been extended to accommodate composition.

Beyond analysis and design, however, the progress in object composition has been slow. While CASE tools that take advantage of composition methods have now been available for several years, the use of such systems in development of real-world commercial software has been very limited, their main impact being to provide inspiration to software architects and designers, rather than being used as development tools. CASE systems, which tend to enforce their development method to the detriment of other approaches, often impose proprietary object models that are not supported by other vendors or modify significantly existing object models, produce code that is difficult to interface with third-party components and the environment and are typically limited to coarse-granularity systems.

For object composition to become widely used in the development of commercially viable software components and systems, there is a need for methods and tools that ease the burden of composition within existing, widely accepted and supported object models. Such methods should work well for objects of typical granularity (100 to 1,000 lines of code), not impose any additional call-time overhead, be easy to use in combination with other methods and third-party components, and not require significant investment in tools and learning curve in order to practice them. As of the time of this writing, no publicly known method, teaching or product provides solutions to the above needs.

Object-oriented Software

Early methods and tools, including most currently accepted object-oriented programming languages, have been focused on defining and building objects, which were predominantly viewed as abstract data types. As the field became more mature, attracted more practitioners and accumulated experience in building real-world products, the main focus has shifted to using objects in defining and building increasingly complex applications, components and software systems. Predictably, the way of thinking has changed, with objects now increasingly being viewed as building blocks from which such applications, components and systems are constructed.

The major principles, methods and technological aspects of the object paradigm are described in many publications. Particularly good introduction into the area is provided by Bertrand Meyer in his book Object-Oriented Software Construction", published by Prentice-Hall, Englewood Cliffs, N.J., in 1988. Another excellent source of fundamental information is "Object-Oriented Design with Applications" by Grady Booch, published by The Benjamin/Cummings Publishing, Redmond City, Calif., in 1991.

An important source of information on formal methods for object-oriented analysis and design is the book "Object-Oriented Modeling and Design" by James Rumbaugh et al., published by Prentice-Hall, Inc., Englewood Cliffs, N.J., in 1991.

Object-oriented software development is based on the the object-model concept, which defines the structure of objects, their attributes and interactions. While many and different object models are in use, they have many commonalties and are well understood and described in the software engineering community. Most of the known object models fall into one of the two broad categories: object-oriented languages and component object models.

Many high-quality publications are available on various object-oriented languages, including C++ which is widely used today. An excellent description of the language and its intended uses can be found in the book of its author, Bjame Stroustrup, "The C++ Programming Language", published by Addison-Wesley Publishing, Menlo Park, Calif., in 1986. Another good source of information about C++ is Microsoft's "C++ Language Reference", available from Microsoft Corporation, One Microsoft Way, Redmond, Wash., 98052, Document No. LN24772-91, 1991.

Component object models advance further the concepts of modularity in object-oriented technologies by defining language-neutral standards for implementation and management of objects as well as for interactions between them. Detailed specifications and architecture definitions for the two most widely accepted component object models as well as many examples and guidelines for building software systems based on them are provided in the following two documents: (1) Microsoft's "The Component Object Model Specification", dated Mar. 6, 1995 and available from Microsoft Corporation; (2) "The Common Object Request Broker Architecture" available from Object Management Group, Inc., Framingham Corporate Center, 492 Old Connecticut Path, Framingham, Mass. 01701.

Most object-oriented systems and applications utilize a number of commonly recognized mechanisms, such as separating interfaces from implementations, abstract factories, parameterization, serialization, and structured storage. Abstract interfaces, along with multiple interfaces per object and abstract factories are well explained in the Component Object Model (COM) specification cited above. The abstract factory pattern is also described very well in the book "Design Patterns: Elements of Reusable Object-Oriented Software" by Erich Gamma et al., published by Addison-Wesley Publishing, Reading, Mass., in 1994.

Parameterization is a way of modifying the behavior of a given instance of an object class by supplying some of the data, or parameters, that the instance needs to operate during or after construction. Diverse property mechanisms are commonly used to parameterize component objects, usually during design time, since they provide a uniform mechanism to access data of a component in a manner independent of the particular component class. An example of a property mechanism and guidelines for using it for the purposes of parameterization can be found in the "Microsoft OLE Control Developer's Kit. User's Guide and Reference", published in 1994 and available from Microsoft Corporation.

Component object models normally define object properties as a linear, flat table of named attributes To represent more sophisticated structures through this model a sequence of operations on properties is needed, such as when setting a value on a given property will modify the mapping of some other properties to a new set of attributes, as it is widely done in Visual Basic. When using such a model for parameterization, the need for sequencing requires either specific coding or setting the properties during parameterization in a specific order, both of which require custom work for each component.

Serialization is a mechanism for providing persistency in object systems by requiring objects to save and restore their state in sequence in a file or other persistent storage. An example of a serialization mechanism is described in the "Microsoft Visual C++ Class Library Users Guide for the Microsoft Foundation Classes Library", published in 1993 and available from Microsoft Corporation, document No. DB35802-0193. Structured storage is a mechanism to provide fine-grain persistent storage in an object system where separate objects can access the persistent storage at any time and in any order. A structured storage architecture and guidelines for using it are defined in detail in Chapter 8: Persistent Storage for Objects of the "OLE 2.0 Design Specification" dated Apr. 15, 1993, available from Microsoft Corporation.

2.2 Object Composition

As the focus of the object-oriented technology moves from programming objects as abstract data types to building systems of objects, several important trends emerge: first, there is an increasing need for methods and tools that help to express, capture and validate the structural aspects of such systems; second, it is necessary to formalize the structural relationships between objects in a generic way that is independent of the particular application field; finally, there is a need for methods and tools that make it possible to implement structures of objects without being forced to translate the structural relationships that are established during the design of the system into lower-level mechanisms.

Object composition, and its complement, object decomposition, are rapidly gaining acceptance in combination as a general and efficient way of expressing structural relationships between objects. Object composition is a method of representing structures of objects based on two types of structural relationships—object containment and object interaction, or communication. The object interactions are usually represented as client server relationships: objects are viewed as black boxes that are engaged in communication where an object provides services to one or more other objects according to predefined rules of interaction, or a predefined contract; most objects are clients and servers simultaneously, using services of other objects to implement services that they, in turn, provide to their clients.

Containment relationships are used to define and build objects that contain structures of other interacting objects. Typically, a containing object also encapsulates the objects that it contains, along with their interactions, thereby hiding from the outside world the complexity within it and allowing the whole encapsulated structure to be viewed and used as a single object. The containment relationship is recursive: an object that contains a structure of interacting objects can be used as an element in another such structure, which in turn can be encapsulated in another such object, and so on. Recursive containment allows the use of object composition to build increasingly complex structures of objects, organized in a hierarchy of containment. Typically, the topmost object in such hierarchy represents the whole component, or system, that is being constructed.

An excellent background explanation of analysis and design methodology based on object composition is contained in "Real-time Object-Oriented Modeling" by Bran Selic et al., published by John Wiley & Sons, New York. Selic describes a method for object-oriented analysis and design named ROOM which is specialized for real-time systems.

The ROOM method relies entirely on object composition for modeling structures of real-time systems designed using the ROOM method. As a result, the ROOM method includes a number of important fundamental concepts that are applicable to most object systems built using composition, including: an opaque boundary, or shell as it is defined in ROOM; the ability of an object to expose multiple communication ports; and explicit connections between ports of different objects as a primary means of object interactions.

The ROOM method also incorporates a number of fundamental assumptions regarding the object model on which systems designed with ROOM are implemented. In particular, all objects that participate in composition relationships, named actors in ROOM terminology, are assumed to own an independent thread of execution and reside in a separate address space. Also, the basic mechanism for interaction between actors is assumed to be asynchronous message passing. And finally, all data exchanged between actors is assumed to be self-contained and thus transferable between different address spaces.

These assumptions lead to a de facto specialized object model with a number of characteristics that make ROOM impractical for use outside of the narrow area of real-time communication and similar systems. In particular, significant limitations follow from the fundamental assumptions described above. For example, the assumption of actors having separate threads of execution and address spaces inevitably leads to a complex mechanism for synchronous communication between them, as described in detail by Selic. Since synchronous calls are the most basic and efficient way of invoking code on today's sequential processors, the call-time overhead imposed by the ROOM object model on this type of interactions has a wide-spread detrimental effect on the performance of any system built using the method.

The assumption that data exchanged between actors is transferable between address spaces and is being communicated asynchronously between concurrent threads of execution limits to a significant degree the applicability of the ROOM object model in any system where data are being processed in large blocks rather than streams, such as any system whose primary functionality includes image processing, document processing, video data processing, multimedia, and similar fields.

Additionally, associating each actor with a thread of execution and one or more message queues results in systems having coarse granularity, where objects are relatively large and heavy-weight, which is recognized as a material factor limiting the potential for creating reusable components. And finally, the assumption of a proprietary and specific mechanism for communication between actors makes it difficult to organize efficient interactions between ROOM actors and software components and applications built without using ROOM. In particular, while actors in ROOM can call third party libraries and services, any calls directed into a ROOM-based system have to be translated explicitly into one or more ROOM messages before they can be passed to an actor. Typically, a ROOM virtual machine is responsible for this translation as well as for communication, actor creation and interconnection services, and most other run-time aspects of the ROOM object model.

The above limitations of the ROOM model do not necessarily pose serious obstacles in those cases where most or all of the software in the given computer system is built using ROOM, as in the case of an embedded system. However, the majority of commercial object-oriented software products consist of components, operating system extensions, add-on services and applications that run on a general-purpose operating system, make considerable use of third party components and libraries, and provide services for other third-party software. As a result, such products have a high degree of interaction with software developed by a variety of vendors using different tools. The applicability of ROOM to most typical products is therefore seriously limited.

A few other known methods and systems for object composition having limitations similar to those described above are described in "HOOD: Hierarchical Object-Oriented Design" by Peter J. Robinson, published by Prentice-Hall, Hertfordshire, UK, 1992, and "Creating Architectures with Building Blocks" by Frank J. van der Linden and Jürgen K. Müller, IEEE Software, 12:6, November 1995, pp. 51–60.

2.3 Methods for Connecting Objects

An important aspect of any system based on object composition is the ability to arrange explicit interactions between objects being composed. Typically, such interactions must be arranged between object instances either at the time those instances are created or later during their lifetimes. The paragraphs below discuss some significant examples of mechanisms for arranging connections between objects known in the background art.

Microsoft Component Object Model (COM) defines a mechanism known as connectable objects as described in the OLE Control Developer's Kit listed above and U.S. Pat. No. 5,485,617, Stutz et al., Jan. 16, 1996, "Method and System for Dynamically-Generating Object Connections", which is incorporated here in its entirety by reference.

The described mechanism provides for generating dynamic connections between instances of COM components. It supports establishing outgoing connections for notification purposes and provides the ability to define multiple outgoing connection points on an object with each connection point capable of supporting multiple connections. This method supports only synchronous, unidirectional connections implemented through v-table interfaces as defined by Microsoft COM. In many cases different connection types are needed: for example, asynchronous connections are much more suitable for outgoing notifications since they define the response time of the object that raises the notification in a manner independent of the response times of the one or more objects that receive the notification. Similarly, bidirectional connections are highly desirable in cases where two objects engage in a predefined protocol during which each of the objects send requests to the other. The ability of an object to have multiple interfaces, the number of which may change at runtime, as well as V-table interfaces and their identifiers, are specific to the Microsoft COM object model and have no analogues in most other object models. Moreover, the method is quite complex, requiring a total of four specific interfaces and two additional objects in order to create a single connection using a fifth interface between two objects.

Another mechanism for making connections between COM objects is described in U.S. Pat. No. 5,517,645, Stutz et al., May 14, 1996, "Method and System for Interfacing Components Via Aggregate Components Formed by Aggregating the Components each with an Instance of a Component Manager", which is incorporated here in its entirety by reference. The described method also applies to instances of COM components that communicate through v-table interfaces as defined in COM. The method provides support for multiple individually identifiable connectors per object, with the ability to generate multiple connections per connector. It also provides for bidirectional connections, includes limited support for composition allowing, in particular, for presenting connectors of subordinate objects as connectors of the composite object.

The primary limitation of the COM method described in patent is in its crushing complexity: in order to establish a connection between two objects this method requires no less than four additional objects, multiple dynamic data structures, and multiple specific interfaces The resulting overhead in complexity of managing connections, as well as memory fragmentation and total consumption are hardly applicable to fine granularity objects. The method is also specific to the COM object model and supports only synchronous connections implemented only using COM v-table interfaces. Finally, the method requires significant increase in the complexity of the object being connected by making the assumption that individual connections can be created and dissolved at any time during the lifetime of the object being connected, thereby forcing the design of such objects to accommodate complex combinations of object states and to anticipate myriad possible scenarios.

Two other examples of background art in the area of connecting objects include: "Plug and Play Programming: an Object-Oriented Construction Kit", by William Wong, M&T Books, New York, 1993; U.S. Pat. No. 5,386,568, Wold et al. Jan. 15, 1995, "Apparatus and Method for Linking Software Modules".

2.4 CASE Systems

One way to provide support for object composition is through the use of automated computer-assisted software engineering (CASE) systems. Such systems typically support a specific method, based on or utilizing composition, by allowing visual manipulation of diagrams representing objects, their relationships and, in some cases, connections. From these diagrams CASE systems automatically generate source code in one or more general-purpose object-oriented programming languages.

Examples of CASE systems with various degrees of support for composition include ObjecTime, by ObjecTime, Ltd., which supports the ROOM method mentioned above; the PARTS Workbench; by Digitalk, Inc., based on Smalltalk; VisualAge, by IBM, which support code generation in Smalltalk and C++; and Rational ROSE, by Rational Software Corp., which supports code generation in C++ and Java (support for other languages has been claimed by the vendor).

Despite the fact that the above-mentioned CASE systems, as well as the design methods on which they are based and the object-oriented languages that they support, have been available for a number of years, none of these systems has any significant impact on the work of a vast majority of practitioners of the object-oriented technology. Explanation for the failure of CASE technology to spread can be found in the following factors: first, most CASE systems tend to enforce the primary method for which they were developed at the expense of other software techniques. Second, in order to produce usable code automatically, CASE systems invariably tend to impose a number of assumptions on the environment and the computer systems in which such code is to operate, as well as on the type of applications that the system can produce; the result is, predictably, software that can only be used in the assumed environment and is therefore difficult to interface with third party components and libraries, as well as hard to maintain in today's world of ever-changing operating systems and user requirements.

Finally, most CASE systems require significant investments in tools, typically ranging from several thousand to several tens of thousands of dollars per developer seat, as well as complete commitment to a particular analysis, design and development method, with slight variations for each development process. All this creates a significant entry barrier to CASE systems which, when combined with the natural imperfections of tools so complex, is enough to explain the reluctance of the software development community to adopt them.

2.5 Conclusion of Background Discussion

The sections above provide a brief summary of the current state of the object paradigm and the teachings, methods and tools that are used to practice it.

As object-oriented technology becomes the established way of building software applications, components and whole systems, objects are increasingly viewed as building blocks for such systems; accordingly, methods and tools for representing structural relationships between objects become increasingly important. Object composition is a general way of representing hierarchical structures of interacting objects. It is rapidly gaining acceptance as an important fundamental mechanism for analysis, design and development of object-oriented systems.

To gain wide acceptance and become truly usable in development of commercially viable software products, object composition requires methods and tools that make it easy to use within the established and generally accepted object models, including object-oriented languages and component object models. Such methods and tools should work within the typical small scale, or fine granularity, of objects in such models, should not impose additional call-time overhead, should be easy to use in combination with other methods and third-party components, and should not require excessively large investments in tools and education through steep learning curves to practice them.

While a number of existing teachings, and development tools based on them, support various aspects of object composition, none of these provides a satisfactory solution to the above-listed problems.

3. ADVANTAGES OF THE INVENTION

1. It is therefore a first advantage of the present invention to provide a method and system to simplify and promote the use of object composition in object-oriented software development as a basic mechanism for building software objects, components and entire systems.
2. A second advantage of the present invention is the provision of a method and system for using composition by extending existing object models rather than defining a new object model, so that the existing wealth of development tools, technology and libraries will be easy to utilize in building systems based on composition.
3. Still another advantage of the present invention is the provision of both a method and a system for object composition, neither of which impose any call-time overhead, allowing objects that are constructed using the present invention to interact directly and as fast as the mechanisms provided by the language in which they are written allow.
4. Yet another advantage of the present invention is the provision of a method and system for object composition in component-based environments in which different objects can be developed in different programming languages and by different developers, allowing such objects to interact and participate in composition-based relationships.
5. One other advantage of the present invention is the provision of a method and system for object composition applicable in conjunction with a variety of different mechanisms for creating object instances, binding to instances and invoking operations on objects, thereby being able to utilize the native facilities provided by the chosen underlying object model for these purposes.
6. Another advantage of the present invention is the provision of a method and system for using object composition in developing fine-granularity objects, so that composition can be used in day-to-day software development rather than only as an integration technology for large projects.
7. One other advantage of the present invention is the provision of a method and system for object composition which can be applied and practiced in a commercial software development environment without requiring CASE tools and other expensive and complex technologies, while also supporting and making it easier to develop such productivity tools.
8. Yet another advantage of the present invention is the provision of a method and system for object composition that can be applied successfully on a small scale, so that individual software components and libraries built using the present invention will be suitable for integration into both existing and newly developed systems, without imposing requirements on these systems.
9. Another advantage of the present invention is the provision of a method and system for object composition which is easy to apply in building open systems of objects, where every object can use all third-party services that would otherwise be available to it, and every object can provide services to other objects that can be used without requiring from the clients of such service to be aware of, or to adhere to the methods and means of the present invention.

4. SUMMARY OF THE INVENTION

The invention provides a set of mechanisms, methods of their use, a system and a method for designing and constructing software components and complete systems as assemblies of independent parts. It extends existing object models and includes the following:

1. A mechanism for connecting software objects by explicitly establishing connections from outside of the connected objects. Connections are established between connection points defined by the objects (terminals), using a terminal interface. All objects in a given system implement and expose the same definition of the terminal interface. The terminal mechanism is independent from the actual type of connections established through it.
2. A property interface and mechanism with hierarchical property names, encapsulation of the property set and ability to execute queries on full or partial property names. The mechanism can be used for parameterization and serialization of software objects and to provide structured storage.

3. A new specialized type of software objects, named parts. Parts are constructed through an abstract factory, define a property interface and a terminal interface. Parts interact with other parts exclusively through connections established using parts' terminal interfaces. They can be constructed, connected and parameterized by descriptor without any specific knowledge of the particular implementations.

4. A method for guaranteeing the availability of all required connections on an object during its normal operations by defining two distinct states, active and inactive, applicable to all parts and an interface to activate and deactivate a part. The normal operations of the part are carried while it is in the active state, while the required connections are established in the inactive state.

5. A mechanism for describing structures of interconnected objects using a data descriptor. A mechanism and method for constructing instances of such structures by descriptor at runtime using an abstract factory.

6. A variation of the property mechanism that can be used for parameterization and serialization of structures of interconnected objects. The mechanism provides an efficient way to join the property name spaces of individual objects into a common name space, utilizing the structure of the objects, as well as a way to make all or part of the resulting name space independent of the structure by defining aliases and group properties.

7. A mechanism for creation of and a new, specialized type of composite software objects (assemblies) from sets of interconnected objects. The mechanism allows new objects to be created by descriptor. The resulting objects may or may not have any specific code. Assemblies are parts, most of the functionality of which is provided by a contained structure of interconnected parts. As parts, assemblies can be used in the construction of other assemblies. Assemblies completely encapsulate their subordinate parts, their connections and structure; they can be implemented with little or no code.

8. A system for programming parts and constructing components and systems by assembling them from parts. The system includes runtime support modules and libraries and defines data types and interfaces. It can be used from the C++ language and is easily portable to most operating systems.

Additionally, the invention provides a computer-implemented method in a computer system for interfacing a plurality of software objects, each one of the objects providing at least a first service for at least one other object, each one of the objects requiring at least one service provided by at least one other object, each one of the objects being able to directly invoke code in other objects, and each one of the objects belonging to an object class, the method comprising the steps of:

defining on a first object a plurality of terminals for establishing a connection with another object, the connection providing means for both requesting services of the first object and providing to the first object the service provided by a second object;

assigning to a first terminal on the first object a first persistent identifier that distinguishes the first terminal from all other terminals of the first object, the first persistent identifier identifying the same terminal on all objects of the plurality of objects belonging to a same class as the first object;

assigning a second identifier to a first, yet to be established, connection;

preparing the first object for establishing the first connection on the first terminal in response to provision of the first persistent identifier of the first terminal and the second identifier and preparing a first connection data set sufficient to determine whether the second object can participate in the first connection and sufficient for the second object to invoke code in the first object;

establishing the first connection on the first terminal, in response to provision of the first identifier, the second identifier, and a second connection data set, the second connection data set sufficient to determine whether the first object can participate in the first connection and sufficient for the first object to invoke code in the second object.

This method may also be practiced wherein the second identifier is not provided to the object until the last step listed immediately above.

This method may alternatively be practiced in a manner wherein the steps of preparing the first object for the first connection on the first terminal, determining whether the first object can participate in the first connection and establishing the first connection on the first terminal are performed by general-purpose code, or are performed by automatically generated code, or are performed by a compiler for a programming language.

This method may alternatively be practiced in a manner wherein the step of determining whether the first object will participate in the first connection is based on an indicator of the direction of the first connection, the indicator included with the second connection data set.

This method may alternatively be practiced in a manner wherein the step of determining whether the first object will participate in the first connection is based on an identifier of the physical mechanism for using the first connection, the identifier included with the second connection data set, or based on an identifier of the logical contract provided by the second object, the identifier included with the second connection data set.

This method may alternatively be practiced in a manner wherein the first connection data set indicates that code in the first object cannot be invoked through the first connection, or wherein the second connection data set indicates that the first object cannot invoke code in the second object through the first connection, or wherein the first connection data set includes a reference to a function, or wherein the first connection data set includes a reference to a function member of the first object, or wherein the first connection data set includes a reference to an instance of a virtual table interface of the first object, or wherein the first connection data set includes an identifier of the first object, the identifier uniquely identifying the first object within the plurality of objects, or wherein the first connection data set includes a reference to the first object, or wherein the first connection data set is sufficient for addressing the first object using a message passing mechanism, or wherein the first connection data set is sufficient for addressing the first object using a remote procedure call mechanism, or wherein the first connection data set is sufficient for addressing the first object using an interprocess communication mechanism, or wherein the first connection data set is sufficient for addressing the first object using a dedicated communication line, or wherein the first connection data set is sufficient for addressing the first object using a computer network, or wherein the first persistent identifier is a name.

Additionally, the invention provides a computer-implemented method in a computer software system for establishing connections between objects, the system having a plurality of objects, each the object having a plurality of terminals, each the object being able to directly invoke code in other objects, each the terminal and each the connection having an identifier, the method comprising the steps of:

preparing a first object for establishing a first connection on a first terminal by providing the identifier of the first terminal and the identifier of the first connection, and preparing a first connection data set sufficient to determine whether a third object can participate in the first connection, and sufficient for the third object to invoke code in the first object;

preparing a second object for establishing the first connection on a second terminal by providing the identifier of the second terminal and the identifier of the first connection, and preparing a second connection data set sufficient to determine whether a fourth object can participate in the first connection and sufficient for the fourth object to invoke code in the second object;

initiating the first connection on the first terminal of the first object by providing the identifier of the first terminal, the identifier of the first connection and the second connection data set;

determining whether the first object will participate in the first connection based on the second connection data set;

storing in the first object a first portion of the second connection data, the first portion sufficient for the first object to invoke code in the second object;

initiating the first connection on the second terminal of the second object by providing the identifier of the second terminal, the identifier of the first connection and the first connection data set;

determining whether the second object will participate in the first connection based on the first connection data set;

storing in the second object a second portion of the first connection data set, the second portion sufficient for the second object to invoke code in the first object.

This method may alternatively be practiced in a manner wherein all steps are performed without interaction between the first object and the second object, or wherein all steps are performed by general-purpose code, or wherein all steps are performed by automatically generated code, or wherein all steps are performed by general-purpose code that is provided with a reference to the first object, the identifier of the first terminal, a reference to the second object and the identifier of the second terminal, or wherein all steps are performed under the control of the code of a fifth object, or wherein all steps are performed under the control of the code of the first object, or wherein the first object and the second object are the same object, or wherein the first terminal and the second terminal are the same terminal, or wherein the first connection data set indicates that the first object cannot be invoked through the first connection, or wherein the first terminal of the first object participates in a second connection distinct from the first connection, or wherein the first terminal of the first object already participates in a second connection with the second terminal of the second object.

This invention may alternatively be practiced as a method in a computer software system for constructing an assembly object, the assembly object containing a plurality of subordinate objects, each of the objects having a plurality of terminals, each of the objects being able to directly invoke code in other objects, and each of the objects belonging to an object class, the method comprising the steps of:

creating a first subordinate object using a first data set identifying the class of the first subordinate object;

establishing a first connection between a first terminal of the first subordinate object and a second terminal of a second subordinate object using a second data set that identifies the first subordinate object, the first terminal, the second subordinate object and the second terminal;

presenting a third terminal of the first subordinate object as a fourth terminal of the assembly object using a data set that identifies the fourth terminal, the first subordinate object and the third terminal.

This method may alternatively be practiced wherein all steps are performed by general purpose code, or wherein all steps are performed by automatically generated code, or wherein the step of presenting the third terminal of the first subordinate object as the fourth terminal of the assembly object is performed by a compiler for a programming language, or wherein the first subordinate object and the second subordinate object are the same object, or wherein one of the subordinate objects is created in response to the assembly object receiving a call after the assembly object has been created, or wherein the second subordinate object has been created before the assembly object, or wherein a persistent identifier of the first object is a name, or wherein a persistent reference to the class of the first subordinate object is a name, or further comprising the step of connecting a fifth terminal of the first subordinate object to a sixth terminal of the assembly object.

The present invention may alternatively be practiced as a method in a computer software system for presenting a terminal of a subordinate object as a terminal of an assembly object, each object belonging to a class, the system having an assembly object, the assembly object having a plurality of subordinate objects, each of the subordinate objects having a plurality of terminals, each of the subordinate objects having an assigned persistent identifier that distinguishes the subordinate object from all other subordinate objects of the assembly object, the method comprising the steps of:

defining on the assembly object a plurality of terminals to establish a plurality of connections with other objects, each connection providing both means for requesting services of the assembly object and providing to the assembly object services of other objects;

assigning to a first terminal on the assembly object a persistent identifier that distinguishes the first terminal from all other terminals of the assembly object, and where the same identifier identifies the first terminal on all objects of the same class as the assembly object;

preparing the assembly object for establishing a first connection on the first terminal by providing the identifier of the first terminal and an identifier for the first connection and preparing a first connection data set sufficient to determine whether a second object can participate in the first connection and sufficient for the second object to invoke code in a first subordinate object of the assembly object;

initiating the establishment of the first connection on the first terminal of the assembly object by providing the identifier of the first terminal, the identifier of the first connection and a second connection data set sufficient to determine whether the assembly object can participate in the first connection and sufficient for the assembly object to invoke code in the second object;

obtaining a reference to the first subordinate object and an identifier of a second terminal of the first subordinate object using the identifier of the first terminal and a first identifying data set that identifies the first terminal, the first subordinate object and the second terminal;

delegating an issued first request to the first subordinate object, the first request identifying the first terminal and addressed to the assembly object, by reissuing the first request to the first subordinate object and substituting the identifier of the first terminal with the identifier of the second terminal.

This method may alternatively practiced wherein the step of delegating the first request to the first subordinate object is performed by general purpose code, or wherein the step of delegating the first request to the first subordinate object is performed by automatically generated code, or wherein the step of obtaining a reference to the first subordinate object and an identifier of the second terminal of the first subordinate object is performed by a compiler for a programming language, or wherein the assigned persistent identifier of the first terminal is a name, or wherein the first connection data set indicates that the second object cannot invoke code through the first connection, or wherein the second connection data set indicates that the assembly object cannot invoke code in the second object through the first connection.

The present invention may alternatively be practiced as a computer-implemented method in a computer software system for presenting a data property of a subordinate object as a data property of an assembly object in the system, the assembly object having a plurality of subordinate objects, each of the subordinate objects having a plurality of data properties, each of the data properties identified by a persistent identifier that distinguishes the property from all other properties of the object on which the property is defined, each of the subordinate objects being assigned a persistent identifier that distinguishes the subordinate object from all other subordinate objects of the assembly object, the method comprising the steps of:

providing means to obtain the current value of a first data property of the assembly object and providing the identifier of the first property, and obtaining the current value of the first property;

providing means to modify the current value of the first data property and providing the identifier of the first property and a data value;

obtaining a reference to a first subordinate object and an identifier of a second data property of the first subordinate object using the identifier of the first data property and data that identifies the first data property, the first subordinate object and the second property;

delegating to the first subordinate object an issued first request identifying the first data property and addressed to the assembly object, by re-issuing the first request to the first subordinate object, substituting the identifier of the first data property with the identifier of the second data property.

This method may alternatively be practiced in a manner wherein wherein the persistent identifier of the data property is a name, or wherein the step of delegating the first request to the first subordinate object is performed by general purpose code, or wherein the step of delegating the first request to he first subordinate object is performed by automatically generated code, or wherein the step of obtaining a reference to a first subordinate object and an identifier of the second data property of the first subordinate object is performed by a compiler for a programming language.

The invention may be alternatively practiced as a method in a computer software system for guaranteeing availability of a connection during normal operation of an object, the system having a plurality of objects, each object having a plurality of terminals, a first object requiring that a first connection on a first terminal of the first object be available in order for the first object to conduct its normal operations, the method comprising the steps of:

providing in the first object an inactive state in which the first object does not carry its normal operations and does accept establishing of connections on the first terminal;

providing in the first object an active state in which the first object does conduct its normal operations and does not accept dissolving of connections on the first terminal;

establishing the first connection between the first terminal of the first object and a second terminal of a second object, at a time when the first object is in the inactive state;

requesting that the first object be placed in the active state, where the request will fail if the first connection does not exist at the time of the request, wherein whenever the first object carries its normal operations, the first connection is guaranteed to exist.

This invention may alternatively be practiced as a method implemented method in a computer software system for establishing a connection between objects with incompatible terminals, the system having a plurality of objects, each the object having a plurality of terminals, where a direct connection between a first terminal of a first object and a second terminal of a second object cannot be established, the method comprising the steps of:

identifying a class of adapter objects, such that:
the adapter objects have a third terminal that can be successfully connected to the first terminal and have a fourth terminal that can be successfully connected to the second terminal,
the adapter objects translate requests that the adapter objects receive through connections on the third terminal into requests that the adapter objects issue through connections on the fourth terminal, and
the adapter objects translate requests that the adapter objects receive through connections on the fourth terminal into requests that the adapter objects issue through connections on the third terminal;

creating an adapter object of the identified class;

establishing a first connection between the first terminal of the first object and the third terminal of the adapter object;

establishing a second connection between the second terminal of the second object and the fourth terminal of the adapter object.

This method may alternatively be practiced in a manner wherein all steps are performed by general purpose code, or wherein all steps are performed by automatically generated code, or wherein the step of identifying the class of adapter objects is performed by a compiler for a programming language, or wherein all steps are performed under the control of the code of a third object.

The present invention may alternatively be practiced as a computer-implemented method in a computer software system for presenting a plurality of outgoing terminals of subordinate objects as a single terminal of an assembly object containing the subordinate objects, the system having an assembly object and a third object, the assembly object having a first subordinate object and a second subordinate object, the first subordinate object having a first terminal through which the first subordinate object requests services, the second subordinate object having a second terminal through which the second subordinate object requests services, the third object having a third terminal through which the third object provides services, the assembly object having a fourth terminal, the first terminal of the first subordinate object accepting connections with the third terminal of the third object, the second terminal of the second subordinate object accepting connections with the third terminal of the third object, the method comprising the steps of:

preparing for the establishment of a first connection on the fourth terminal of the assembly object by providing the identifier of the fourth terminal and preparing a first connection data set sufficient to determine whether the third object can participate in the first connection;

obtaining a reference to the first subordinate object and the identifier of the first terminal using the identifier of the fourth terminal and a first data that identifies the fourth terminal, the first subordinate object and the first terminal;

obtaining a reference to the second subordinate object and the identifier of the second terminal, using the identifier of the fourth terminal and a second data that identifies the fourth terminal, the second subordinate object and the second terminal;

preparing the first subordinate object for a second connection and providing the identifier of the first terminal;

preparing the second subordinate object for a third connection and providing the identifier of the second terminal;

initiating the establishment of the first connection on the fourth terminal of the assembly object by providing the identifier of the fourth terminal and a second connection data set sufficient to determine whether the first subordinate object can participate in the first connection and sufficient for the first subordinate object to invoke code in the third object;

establishing the second connection on the first subordinate object by providing the identifier of the first terminal and the second connection data set;

establishing the third connection on the second subordinate object by providing the identifier of the second terminal and the second connection data set.

This method may alternatively be practiced in a manner wherein the step of obtaining a reference to the first subordinate object and an identifier of the first terminal of the first subordinate object is performed by general purpose code, or wherein the step of obtaining a reference to the first subordinate object and an identifier of the first terminal of the first subordinate object is performed by generated code, or wherein the step of obtaining a reference to the first subordinate object and an identifier of the first terminal of the first subordinate object is performed by a compiler for a programming language.

Additionally, each of these methods may be practiced using means described hereinbelow and above. Moreover, each of these method may be practiced to create programs and related articles of manufacture which are intended to fall within the scope of the present inventive development system.

5. BRIEF DESCRIPTION OF THE DRAWINGS

The aforementioned features and advantages of the invention as well as additional features and advantages thereof will be more clearly understood hereinafter as a result of a detailed description of a preferred embodiment of the invention when taken in conjunction with the following drawings in which:

FIG. 2 illustrates the elements of a terminal interface.

FIG. 4 illustrates the naming of part terminals.

FIG. 5 provides examples of different terminal types and the connection data context for each of them.

Figure 6:
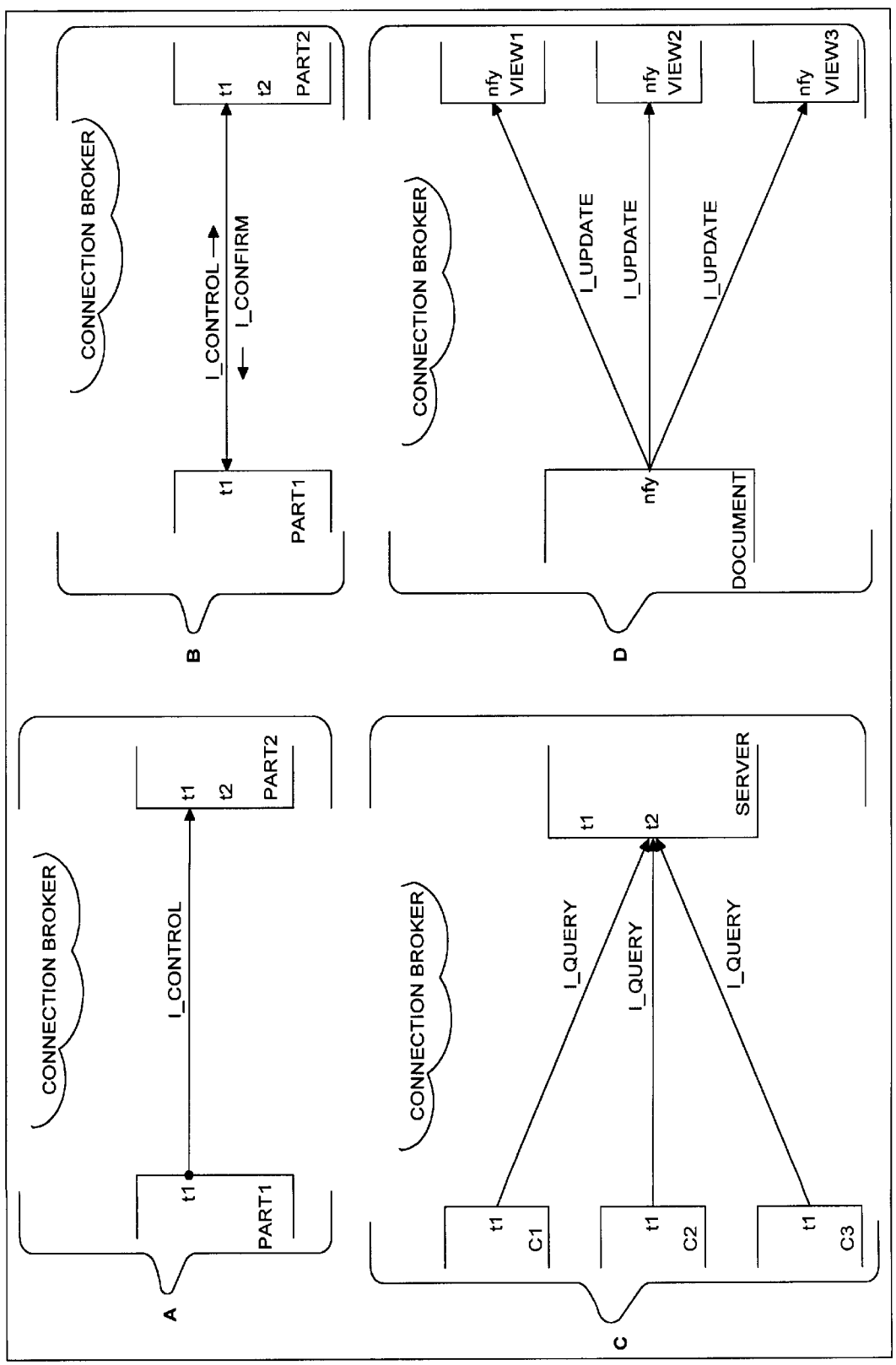

FIG. 6 illustrates four basic connection scenarios using terminals.

Figure 7:
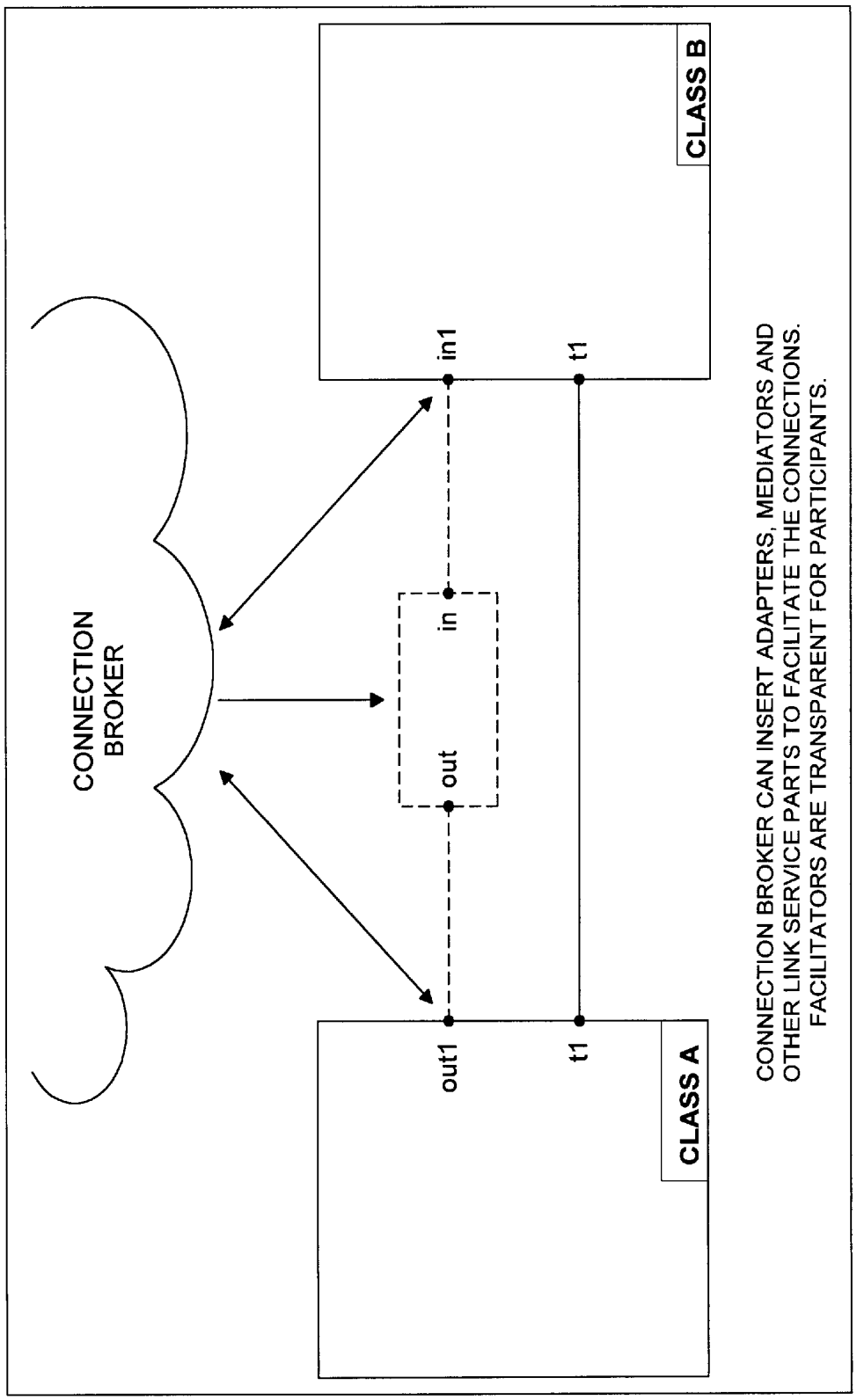

FIG. 7 illustrates a connection broker building a facilitated connection.

FIG. 8 illustrates the elements of a property interface.

FIG. 9 illustrates the naming of properties, structures of properties and queries.

Figure 10:
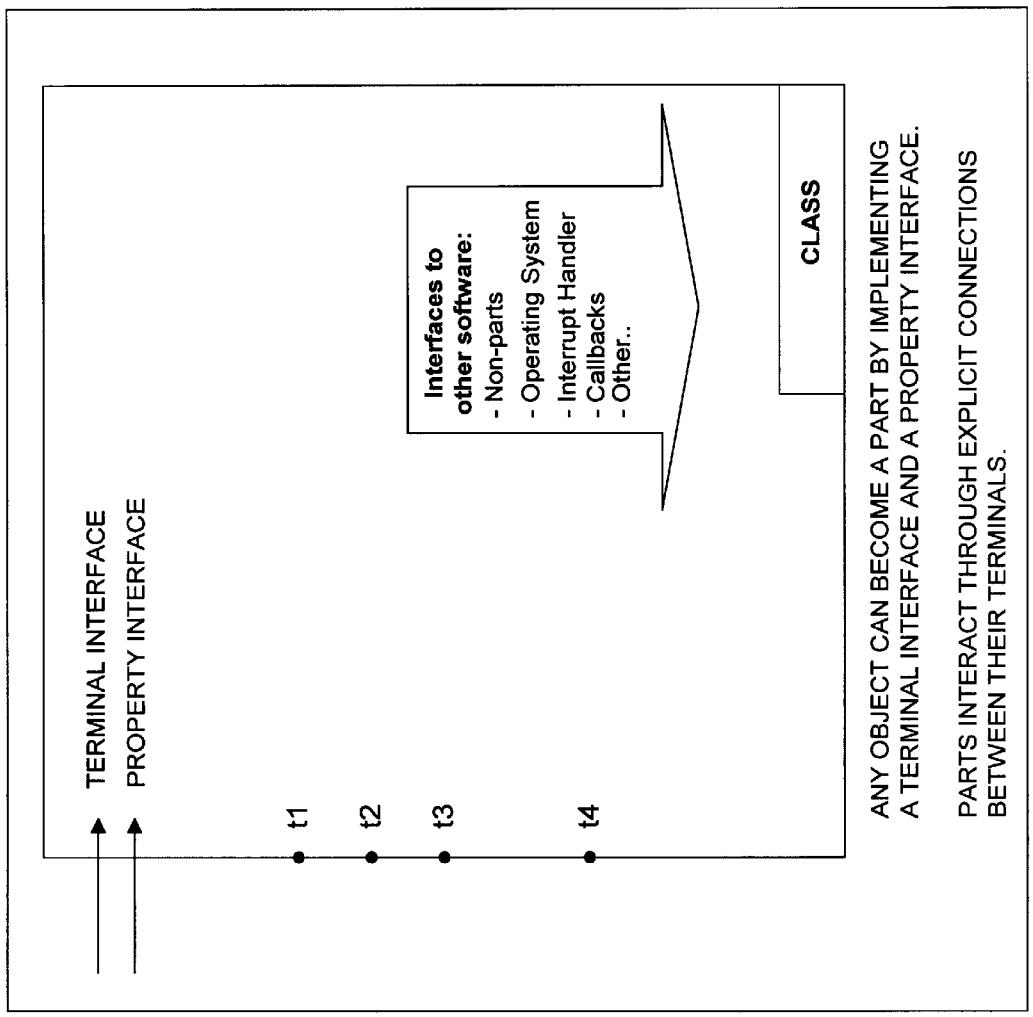

FIG. 10 illustrates the structure of parts as objects.

Figure 11:
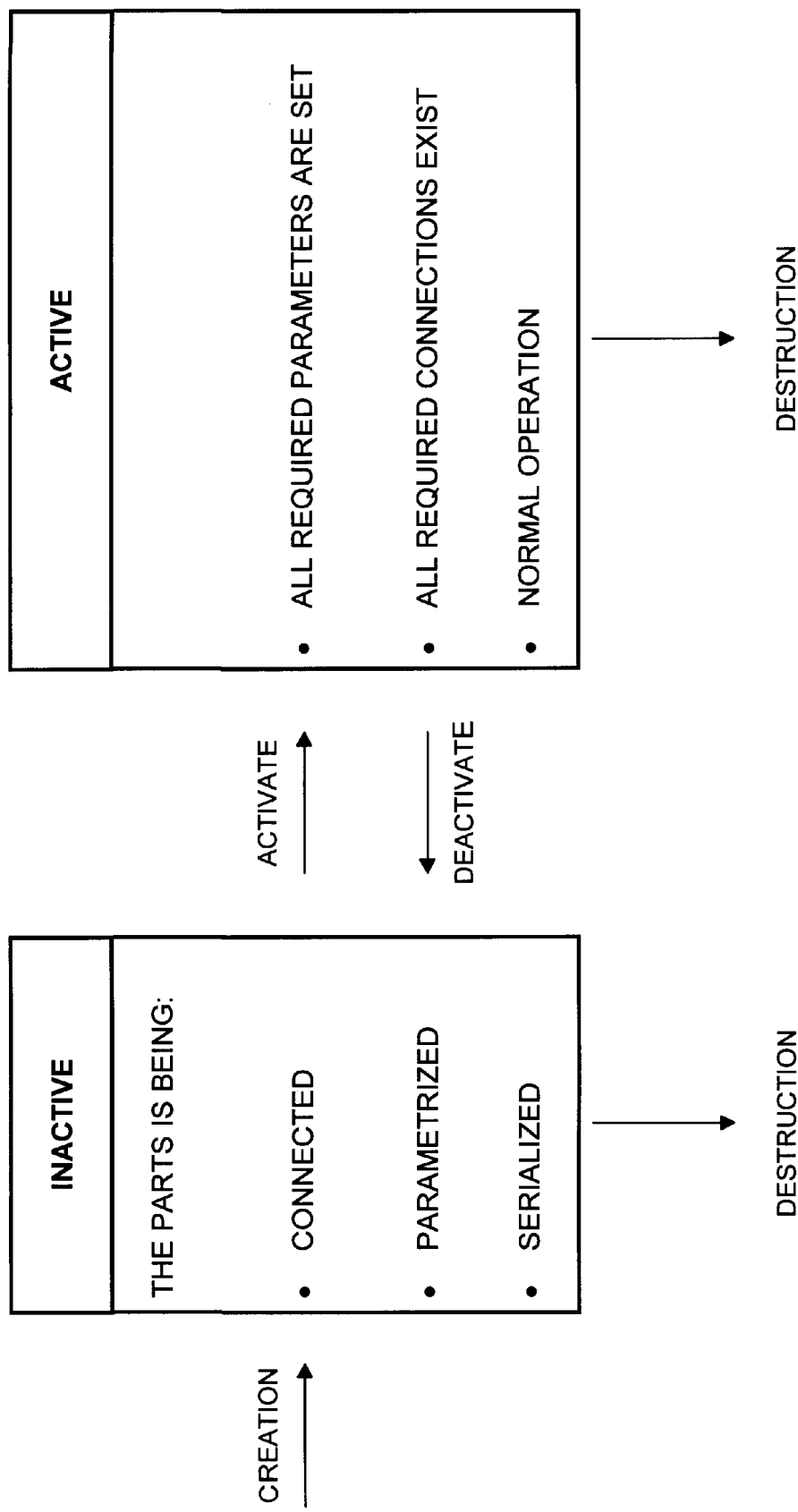

FIG. 11 illustrates the life cycle of a part, including the active and inactive states.

Figure 12:
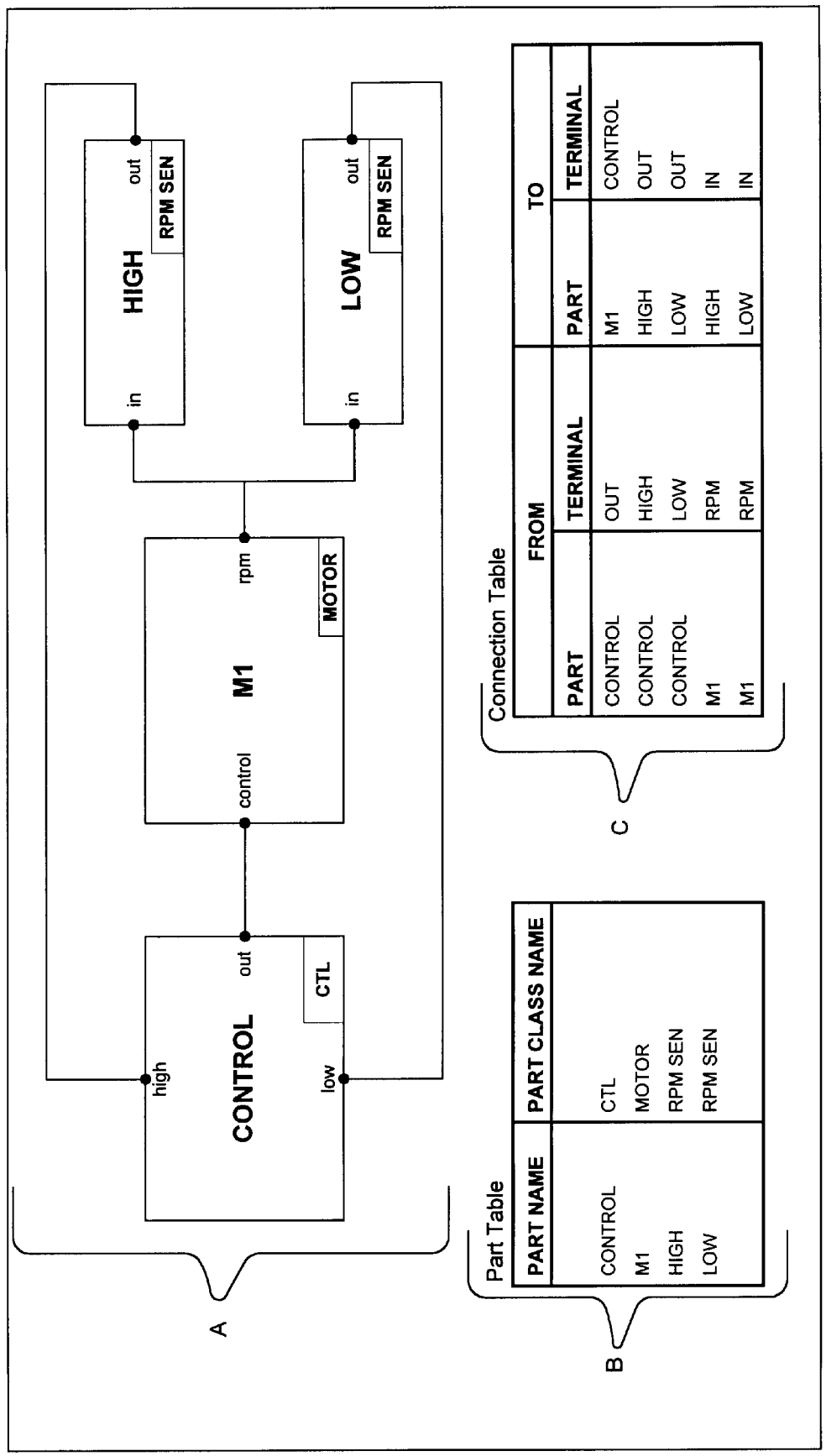

FIG. 12 illustrates a structure of interconnected parts and its descriptors.

FIG. 13 illustrates mechanisms for parameterization of structures of parts.

Figure 14:
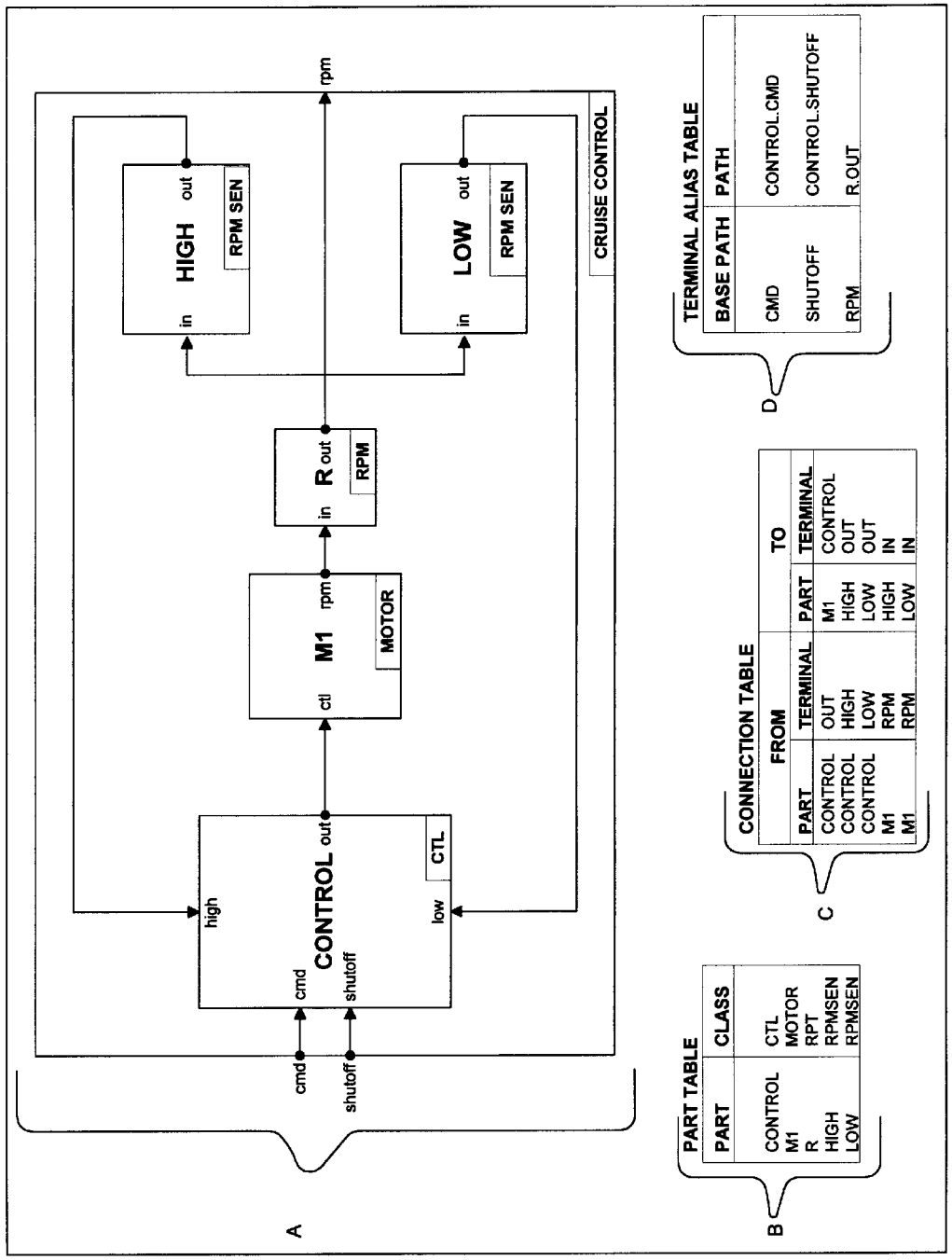

FIG. 14 illustrates an assembly.

Figure 15:
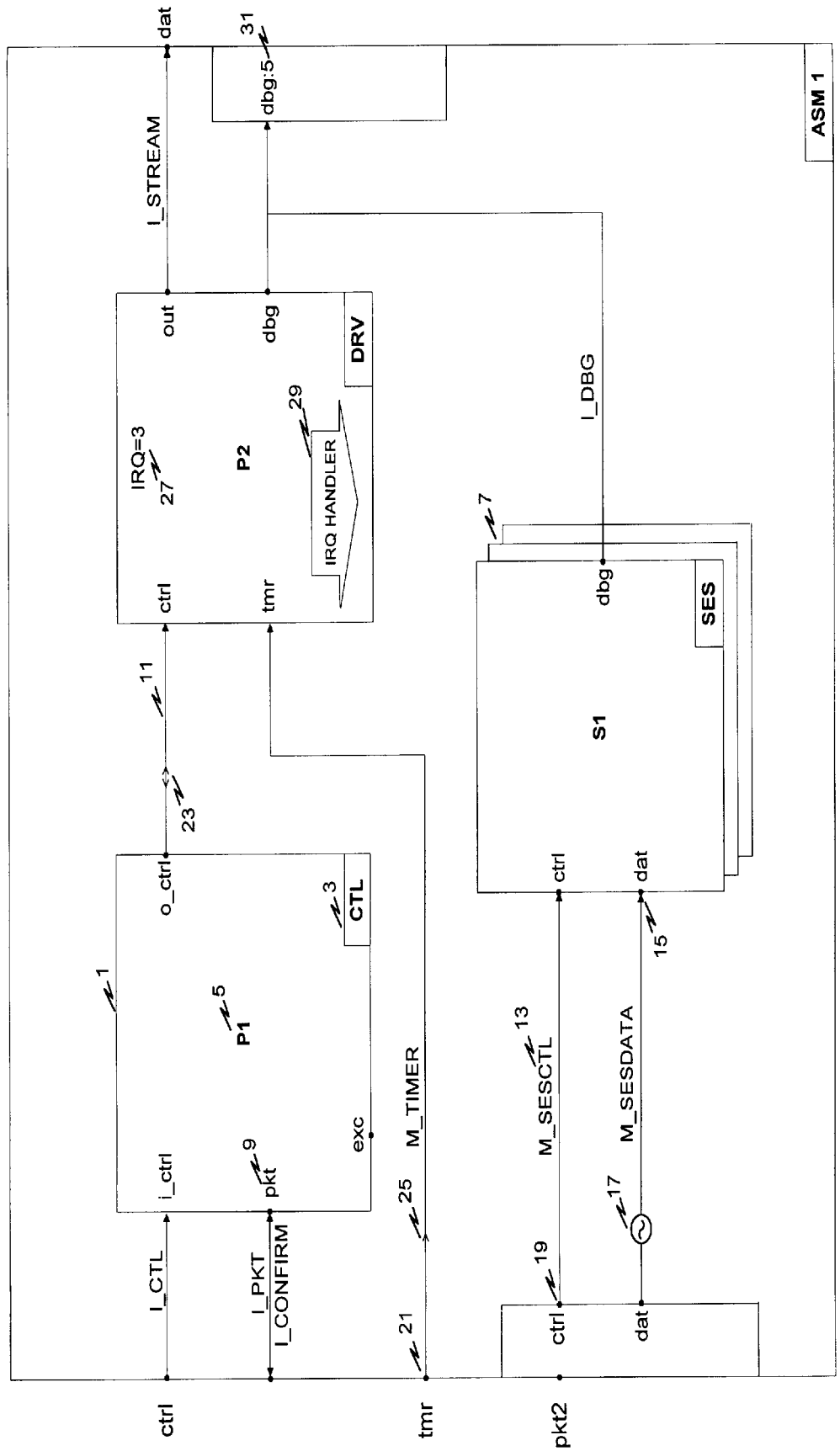

FIG. 15 illustrates an assembly with dynamically created parts and the elements of the graphical notation.

Figure 16:
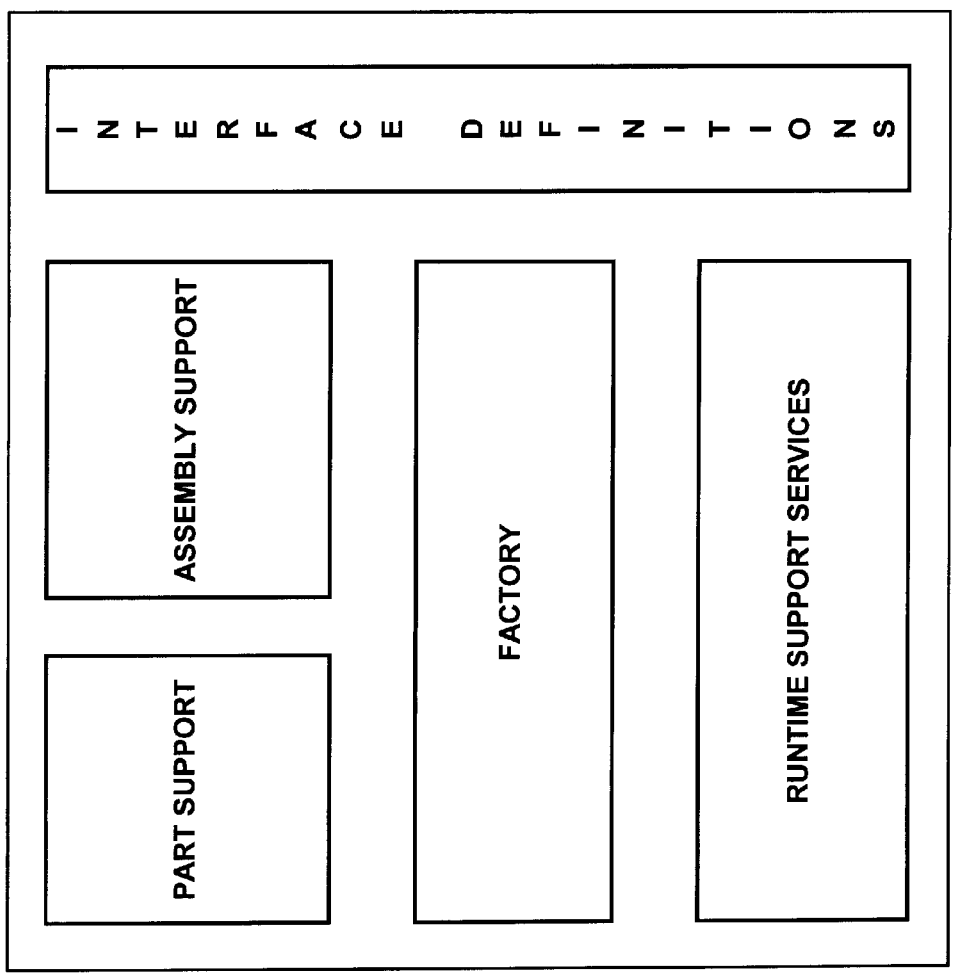

FIG. 16 illustrates the major components of the preferred system of the present invention.

FIG. 17 illustrates portable type definitions used in the system.

FIG. 18 illustrates common return statuses defined in the system.

FIG. 19 illustrates the definition of the v-table interface used by the system.

FIG. 20 illustrates the terminal interface defined for the system.

FIG. 21 illustrates the property interface defined for the system.

FIG. 22 illustrates the factory interface defined for the system.

FIG. 23 illustrates a part implementation under the system.

FIG. 24 illustrates an assembly implementation under the system.

FIG. 25 illustrates the definition of a polymorphic v-table interface.

Figure 26:
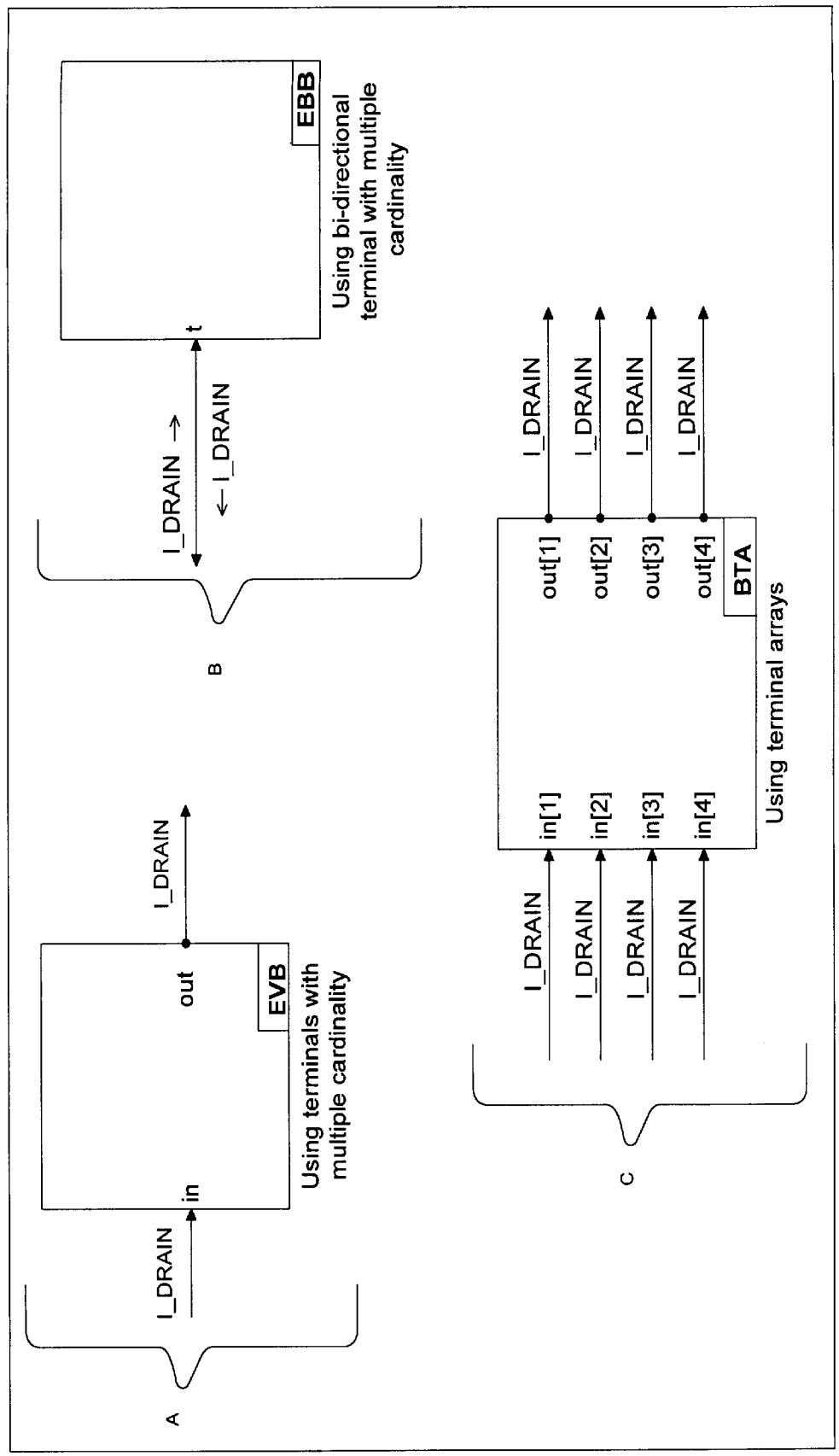

FIG. 26 illustrates the event bus parts.

Figure 27:
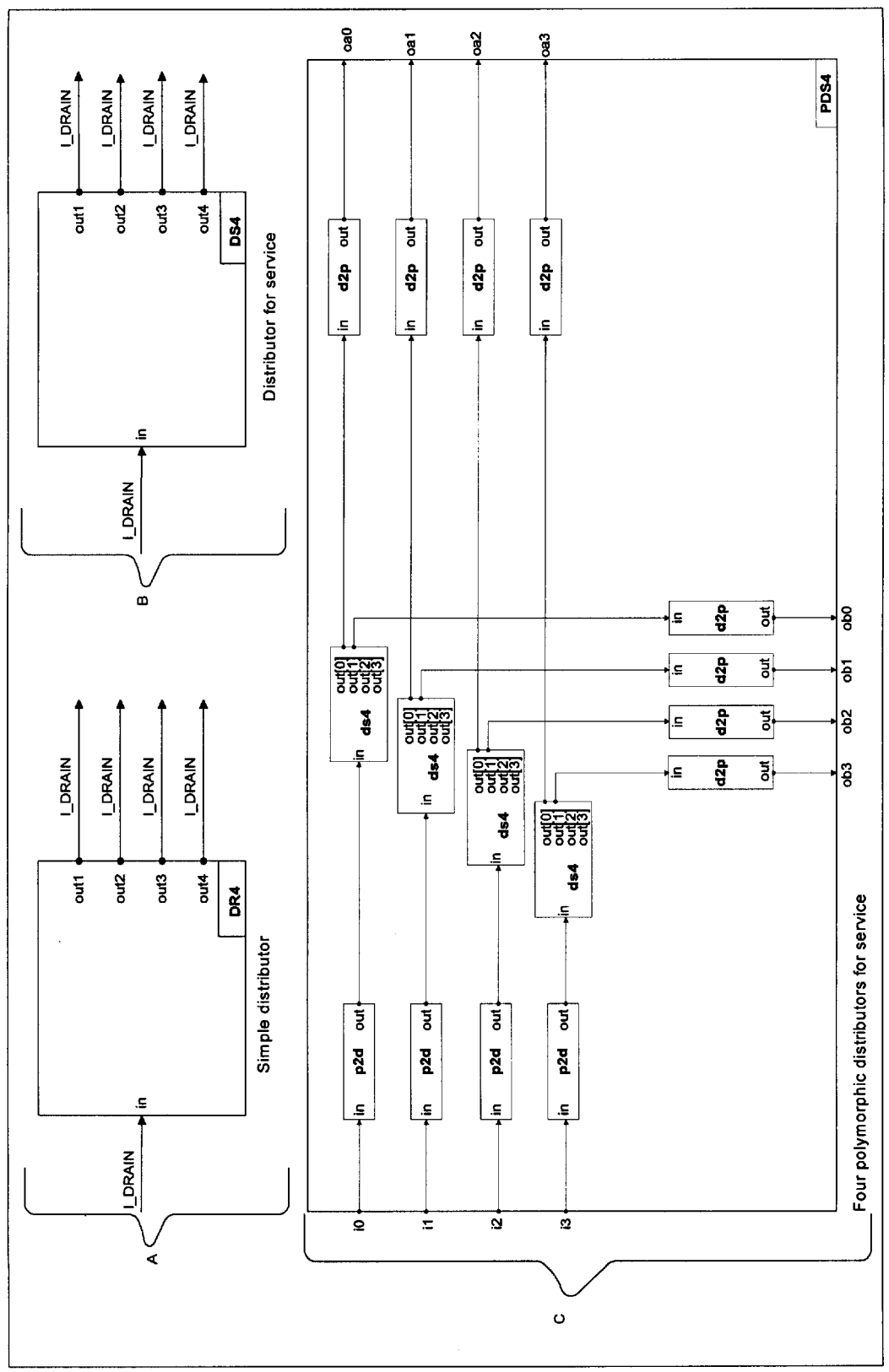

FIG. 27 illustrates the repeater parts.

Figure 28:
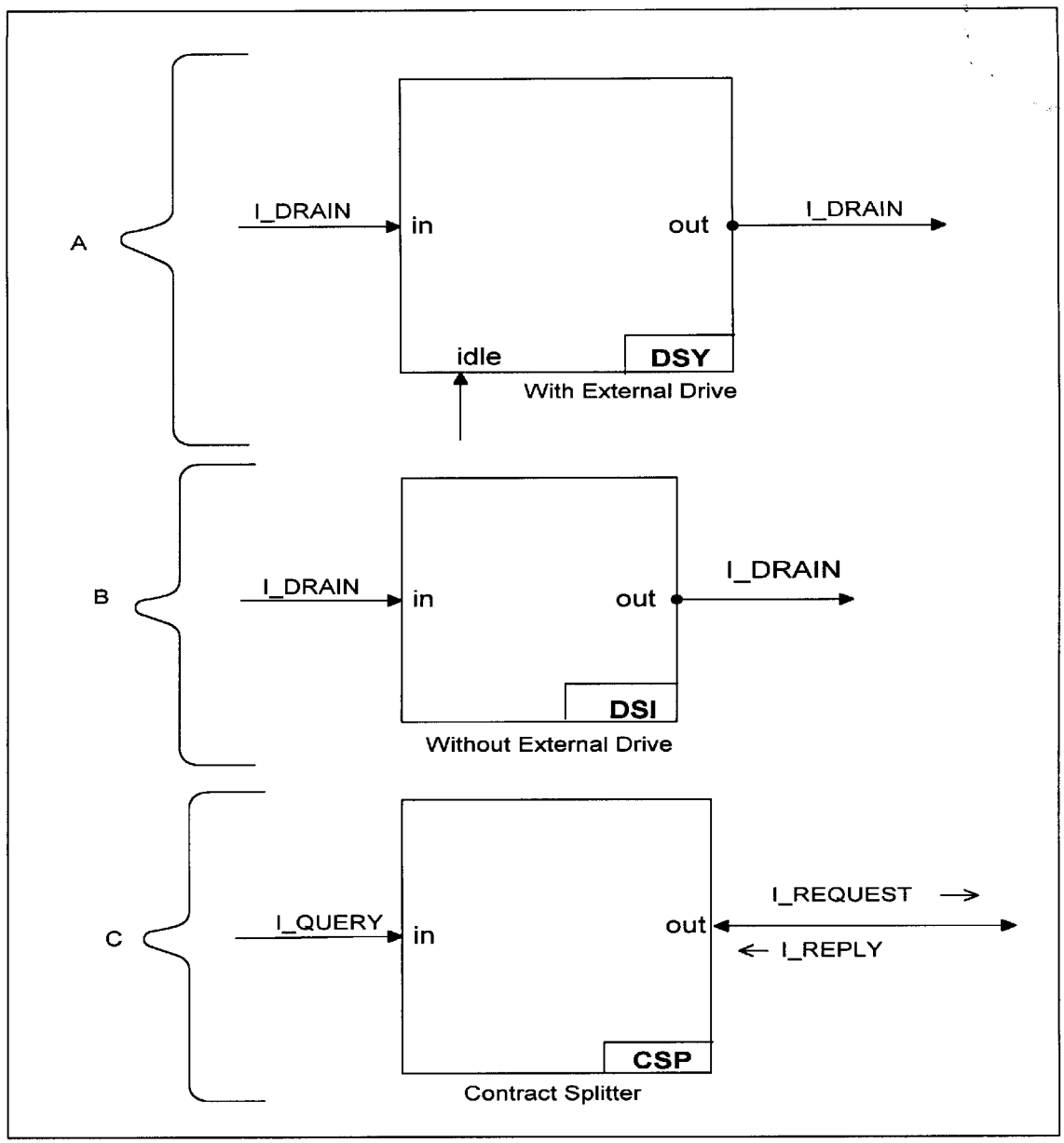

FIG. 28 illustrates the de-synchronizer parts.

Figure 29:
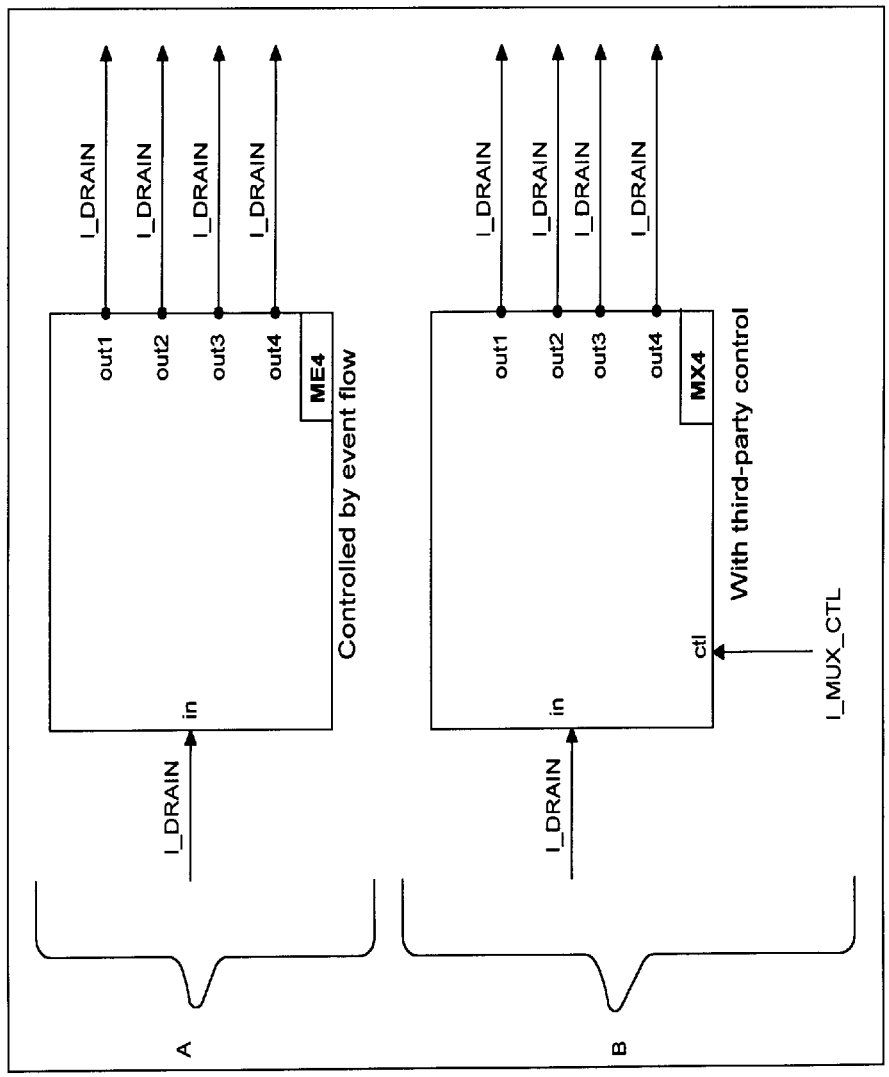

FIG. 29 illustrates the multiplexor parts.

Figure 30:
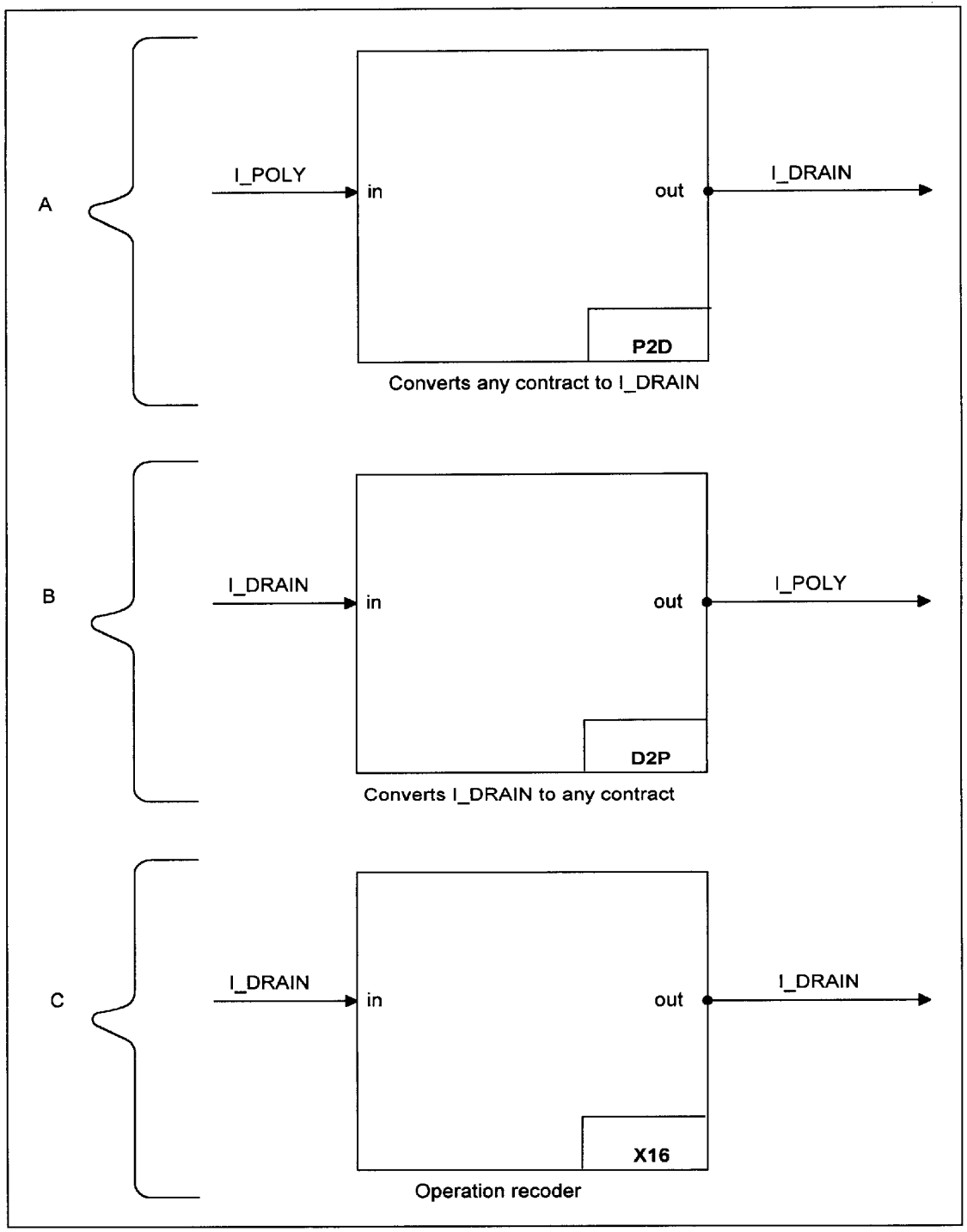

FIG. 30 illustrates the adapter parts.

Figure 31:
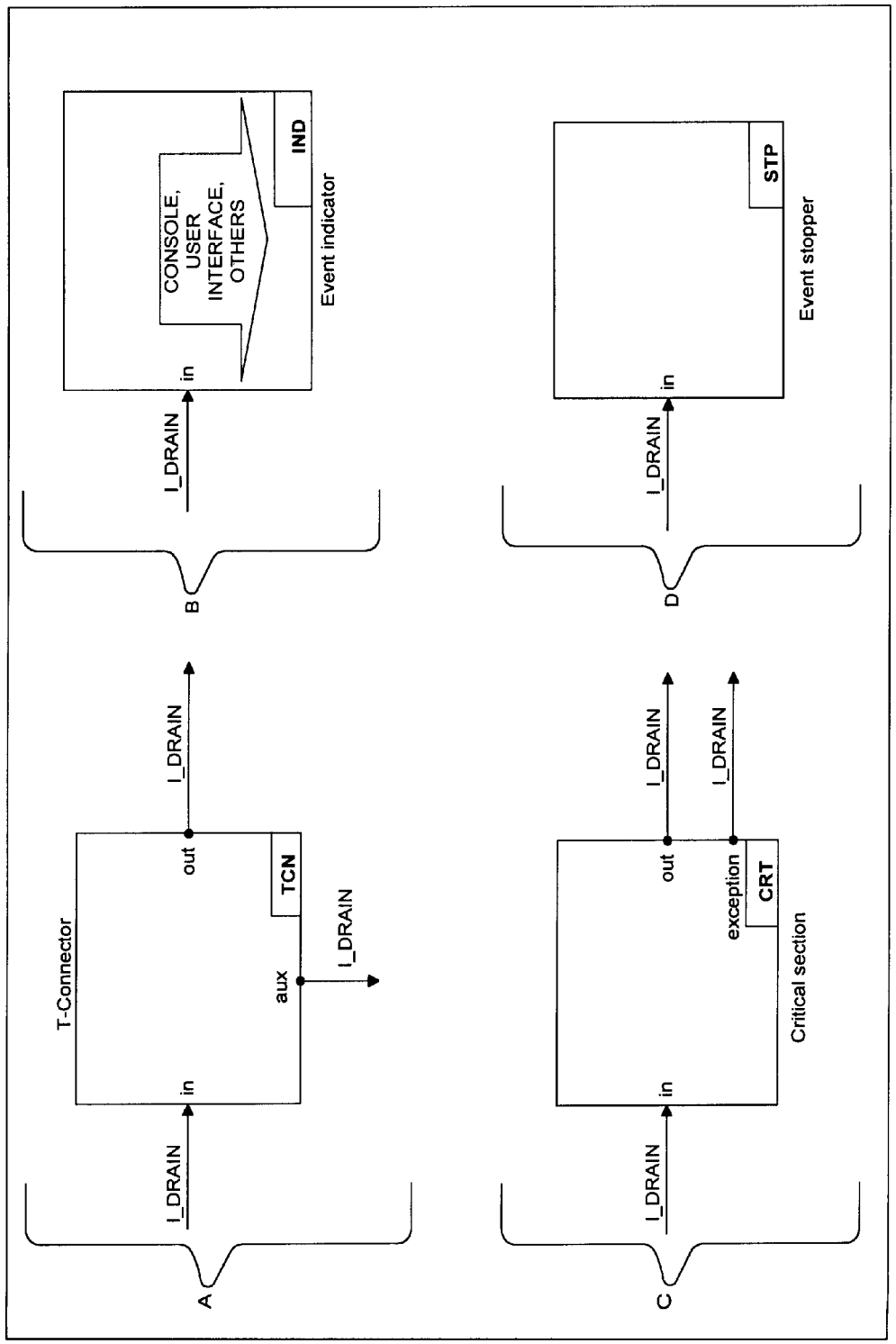

FIG. 31 illustrates the development support parts.

Figure 32:
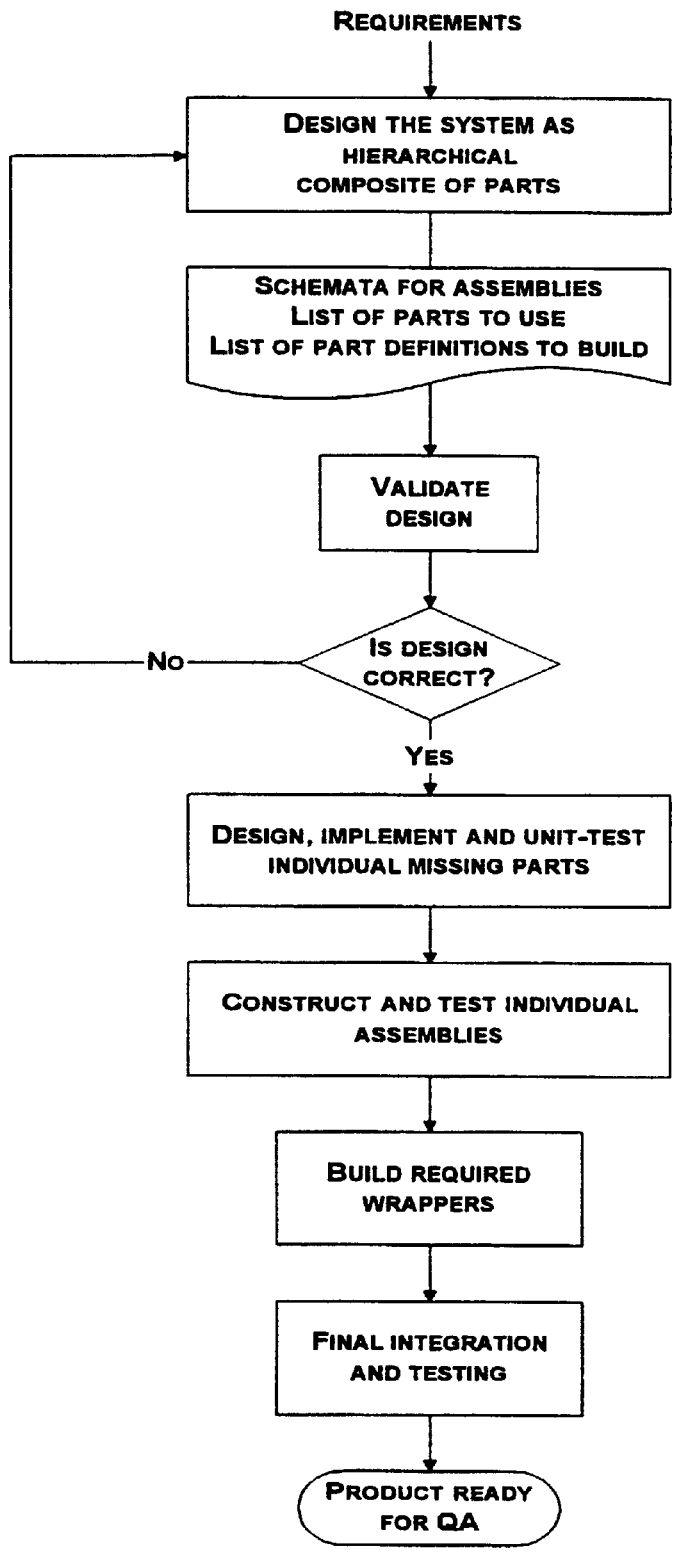
Figure 33:
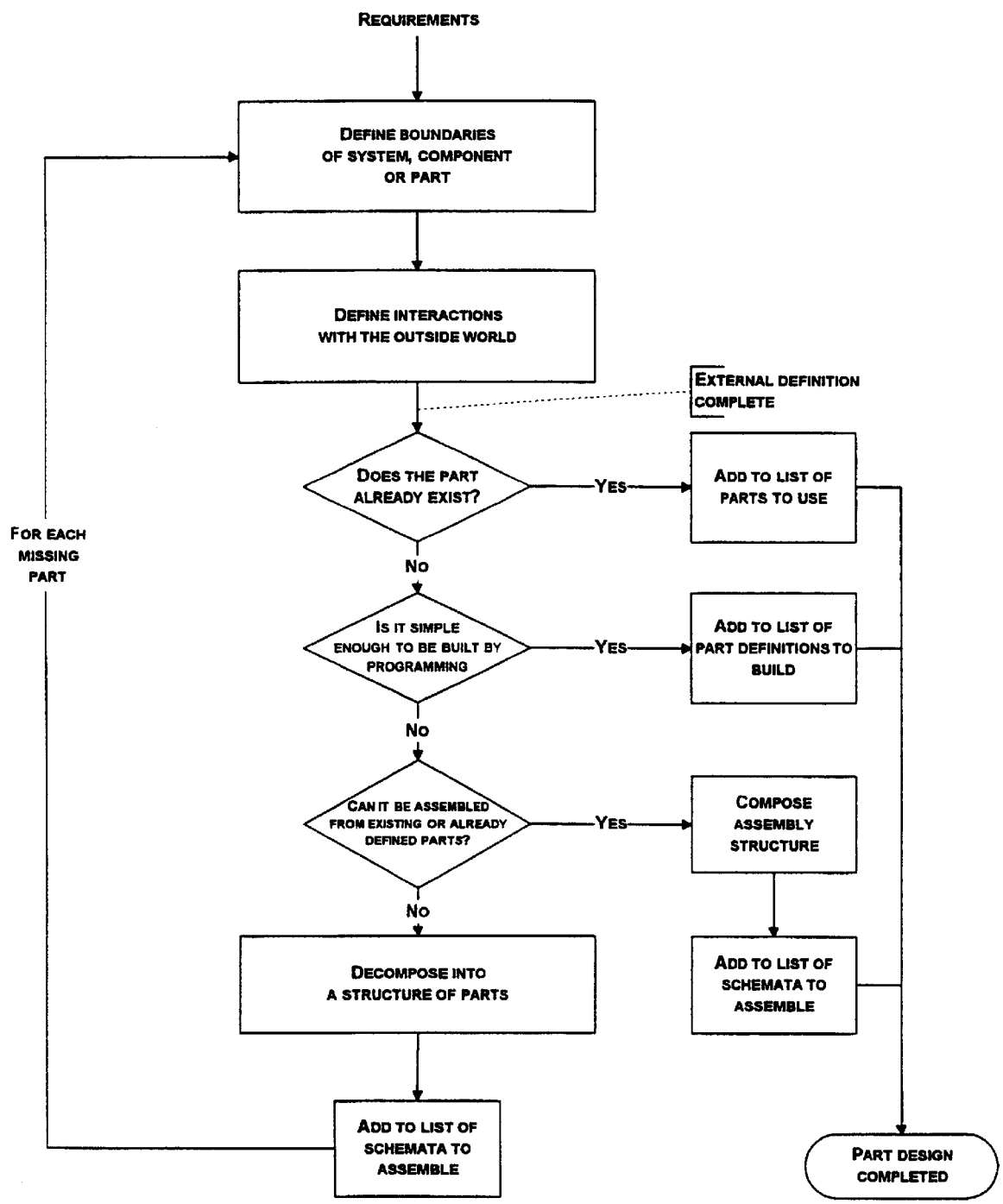

FIG. 32 is a flowchart illustrating the preferred method for designing and constructing software systems using the present invention FIG. 33 is a flowchart illustrating the design phase of the method illustrated in FIG. 32.

Figure 34:
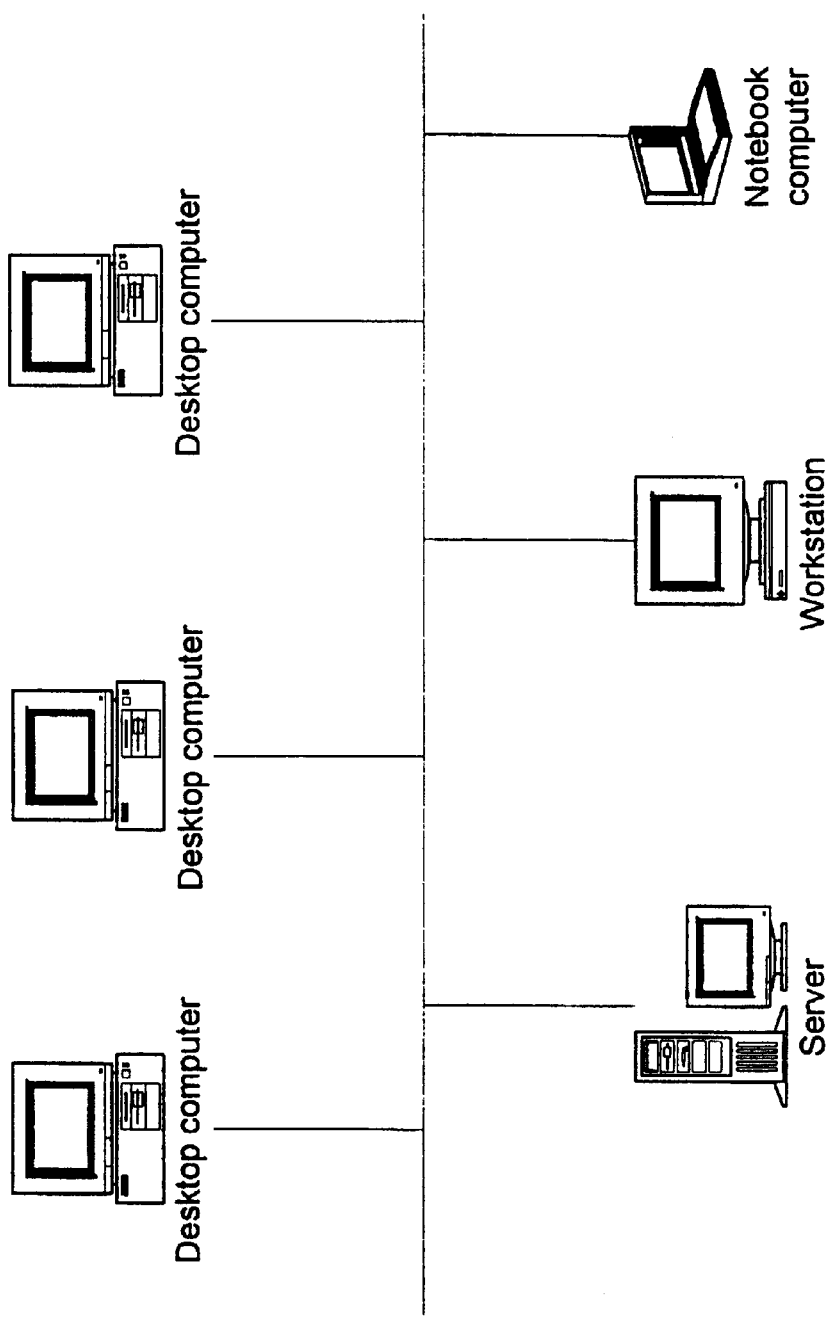

FIG. 34 illustrates a distributed computer system on which the invention may be used

6. DESCRIPTION OF THE INVENTION

Glossary

The following definitions will assist the reader in comprehending the enclosed description of a preferred embodiment of the present invention. All of the following definitions are presented as they apply in the context of the present invention.

Adapter
a part which converts one interface, logical connection contract and/or physical connection mechanism to another. Adapters are used to establish connections between parts that cannot be connected directly because of incompatibilities.

Alias
an iternative name or path representing a part, terminal or property. Aliases are used primarily to provide alternative identification of an entity, usually encapsulating the exact structure of the original name or path.

Assembly
a composite object most of the functionality of which is provided by a contained structure of interconnected parts. In many cases assemblies can be instantiated by descriptor and do not require specific program code.

Bind
an operation of resolving a name of an entity to a pointer, handle or other identifier that can be used to access this entity. For example, a component factory provides a bind operation that gives access to the factory interface of an individual component class by a name associated with it.

Bus, Part
a part which provides a many-to-many type of interaction between other parts. The name "bus" comes from the analogy with network architectures such as Ethernet that are based on a common bus through which every computer can access all other computers on the network.

Code, Automatically Generated
program code, such as functions or parts of functions, the source code for which is generated by a computer program.

Code, General Purpose
purpose program code, such as functions and libraries, shared by more than one class of objects.

COM
an abbreviation of Component Object Model, a component model defined and supported by Microsoft Corp. COM is the basis of OLE2 technologies and is supported on all members of the Windows family of operating systems.

Component Model(s)
a class of object model based on language-independent definition of objects, their attributes and mechanisms of invocation. Unlike object-oriented languages, component models promote modularity by allowing systems to be built from objects that reside in different executable modules, processes and computers.

Connecting
process of establishing a connection between terminals of two parts in which sufficient information is exchanged between the parts to establish that both parts can interact and to allow at least one of the parts to invoke services of the other part.

Connection
an association between two terminals for the purposes of transferring data, invoking operations or passing events.

Connection Broker
an entity that drives and enforces the procedure for establishing connections between terminals. Connection brokers are used in the present invention to create connections exchanging the minimum necessary information between the objects being connected.

Connection, Direction of
a characteristic of a connection defined by the flow of control on it. Connections can be uni-directional, such as when only one of the participants invokes operations on the other, or bidirectional, when each of the participants can invoke operations on the other one.

Connection, Direction of Data Flow
a characteristic of a connection defined by the data flow on it. For example, a function call on which arguments are passed into the function but no data is returned has unidirectional data flow as opposed to a function in which some arguments are passed in and some are returned to the caller.

Connection, Logical Contract
a defined protocol of interaction on a connection recognized by more than one object. The same logical contract may be implemented using different physical mechanisms.

Connection, Physical Mechanism
a generic mechanism of invoking operations and passing data through connections. Examples of physical mechanisms include function calls, messages, v-table interfaces, RPC mechanisms, inter-process communication mechanisms, network sessions, etc.

Connection, Synchronosity
a characteristic of a connection which defines whether the entity that invokes an operation is required to wait until the execution of the operation is completed. If at least one of the operations defined by the logical contract of the connection must be synchronous, the connection is assumed to be synchronous.

Container
an object which contains other objects. A container usually provides interfaces through which the collection of multiple objects that it contains can be manipulated from outside.

Control Block
see Data bus.

CORBA
Common Object Request Broker Architecture, a component model architecture maintained by Object Management Group, Inc., a consortium of many software vendors.

Critical Section
a mechanism, object or part the function of which is to prevent concurrent invocations of the same entity. Used to protect data integrity within entities and avoid complications inherent to multiple threads of control in preemptive systems.

Data Bus
a data structure containing all fields necessary to invoke all operations of a given interface and receive back results from them Data buses improve understandability of interfaces and promote polymorphism. In particular interfaces based on data buses are easier to de-synchronize, convert, etc.

Data Flow
direction in which data is being transferred through a function call, message, interface or connection. The directions are usually denoted as "in", "out" or "in-out", the latter defining a bidirectional data flow.

Descriptor Table
an initialized data structure that can be used to describe or to direct a process. Descriptors are especially useful in conjunction with general purpose program code. Using properly designed descriptor tables, such code can be directed to perform different functions in a flexible way.

De-serialization
: part of a persistency mechanism in object systems. A process of restoring the state of one or more objects from a persistent storage such as file, database, etc. See also serialization.

De-synchronizer
: a category of parts used to convert synchronous operations to asynchronous. Generally, any interface with unidirectional data flow coinciding with the flow of control can be de-synchronized using such a part.

Event
: in the context of a specific part or object, any invocation of any operation implemented by it. Event-driven designs model objects as state machines which change state or perform actions in response to external events. In the context of a system of objects, a notification or request typically not directed to a single object but rather multicast to a group of objects.

Factor, Abstract
: a pattern and mechanism for creating instances of objects in which the entity that requested the creation is not directly bound to the entity that creates the instance. The mechanism used by OLE COM to create object instances is an abstract factory; the operator "new" in C++ is not an abstract factory.

Factory, Component or Part
: portion of the program code of a component or part which handles creation and destruction of instances. Usually invoked by an external abstract factory in response to request(s) to create or destroy instances of the given class.

Flow of Control
: a sequence of nested function calls, operation invocations, synchronous messages, etc. Despite all abstractions of object-oriented and event-driven methods, on single-processor computer systems the actual execution happens strictly in the sequence of the flow of control.

Group Property
: a property used to represent a set of other properties for the purposes of their simultaneous manipulation. For example, an assembly containing several parts may define a group property through which similar properties of those parts can be set from outside via a single operation.

Indicator
: a category of parts that provides human-readable representation of the data and operations that it receives. Used during the development process to monitor the behavior of a system in a given point of its structure.

Input
: a terminal with incoming flow of control. As related to terminals, directional attributes such as incoming and outgoing are always defined from the viewpoint of the object on which the terminal is defined.

Interface
: a specification for a set of related operations that are implemented together. An object given access to an implementation of an interface is guaranteed that all operations of the interface can be invoked and will behave according to the specification of that interface.

Interface, Message-based
: an interface the operations of which are invoked through messages in message-passing systems. "Message-based" pertains to a physical mechanism of access in which the actual binding of the requested operation to code that executes this operation on a given object is performed at call time.

Interface, OLE COM
: a standard of defining interfaces specified and enforced by COM. Based on the virtual table dispatch mechanism supported by C++ compilers.

Interface, Remoting
: a term defined by Microsoft OLE COM to denote the process of transferring operations invoked on a local implementation of an interface to some implementation running on a different computer or in a different address space, usually through an RPC mechanism.

Interface, v-table
: a physical mechanism of implementing interfaces, similar to the one specified by OLE COM.

Marshaler
: a category of parts used to convert an interface which is defined in the scope of a single address space to a logically equivalent interface on which the operations and related data can be transferred between address spaces.

Multiplexor
: a category of parts used to direct a flow of operations invoked on its input through one of several outgoing connections. Multiplexor are used for conditional control of the event flows in structures of interconnected parts.

Name
: a persistent identifier of an entity that is unique within a given scope. Most often names are human-readable character strings; however, other values can be used instead as long as they are persistent.

Name Space
: the set of all defined names in a given scope.

Name Space, Joined
: a name space produced by combining the name spaces of several parts. Preferably used in the present invention to provide unique identification of properties and terminals of parts in a structure that contains those parts.

Object, Composite
: an object that includes other objects, typically interacting with each other. Composites usually encapsulate the subordinate objects.

Output
: a terminal with outgoing flow of control. See also input.

Parameterization
: a mechanism and process of modifying the behavior of an object by supplying particular data values for attributes defined by the object.

Part
: an object or a component preferably created through an abstract factory and implementing a terminal interface, a property interface and an interface for activation and deactivation. Parts can be assembled into structures at run-time.

Property
: an attribute of an object exposed for manipulation from outside through a mechanism that is not specific for this attribute or object class.

Property Interface
: an interface which defines the set of operations to manipulate properties of objects that implement it. Typical operations of a property interface include: get value, set value, and enumerate properties.

Property Mechanism
: a mechanism defining particular ways of addressing and accessing properties. A single property interface may be implemented using different property mechanisms, as it happens with parts and assemblies. Alternatively, the same property mechanism can be exposed through a number of different property interfaces.

Proxy program code, object or component designed to present an entity or a system in a way suitable for accessing it from a different system. Compare to a wrapper.

Repeater a category of parts used to facilitate connections in cases where the number of required connections is greater than the maximum number supported by one or more of the participants.

Return Status a standardized type and set of values returned by operations of an interface to indicate the completion status of the requested action, such as OK, FAILED, ACCESS VIOLATION, etc.

Serialization part of a persistency mechanism in object systems. A process of storing the state of one or more objects to persistent storage such as file, database, etc. See also de-serialization.

Structure of Parts a set of parts interconnected in a meaningful way to provide specific functionality.

Structured Storage a mechanism for providing persistent storage in an object system where objects can access the storage separately and independently during run-time.

Terminal a named entity defined on an object for the purposes of establishing connections with other objects.

Terminal, Cardinality the maximum number of connections in which a given terminal can participate at the same time. The cardinality depends on the nature of the connection and the way the particular terminal is implemented.

Terminal, Exterior a terminal, preferably used to establish connections between the part to which it belongs and one or more objects outside of this part.

Terminal, Interior a terminal, of an assembly, preferably used to establish connections between the assembly to which it belongs and one or more subordinate objects of this assembly.

Terminal Interface an interface which defines the set of operations to manipulate terminals of objects that implement it.

Terminal Mechanism a mechanism defining particular ways of addressing and connecting terminals. A single terminal interface may be implemented using different terminal mechanisms, as happens with parts and assemblies.

Wrapper program code, object or component designed to present an entity or a system in a way suitable for inclusion in a different system. Compare to a proxy.

7. DETAILED DESCRIPTION OF A PREFERRED EMBODIMENT

7.1 Overview

The present invention is a system and method for building software components and complete systems in a modular way. A high degree of modularity in a built software system is achieved when the system is broken down into separate modules which are as independent from each other as possible and wherein interaction between the modules is explicit and limited to the minimum necessary in order for the system to perform its functions. Such modular structure brings many benefits, including ease of understanding, the ability to reuse existing modules and subsystems, the ability to easily extend the functionality of the system and simplified maintenance.

The invention described herein achieves modularity by extending traditional object-oriented models in a way that allows modules, or objects, to be designed and implemented independent of each other and allows the user to design and construct components and systems from such objects. The invention is preferably used in conjunction with general purpose desktop computers, workstation environments and distributed computer systems as illustrated in FIG. 34, as well as with real-time, embedded and other specialized computer systems.

The present invention does not define a new object model. Instead the present invention extends existing object models in a way that provides the necessary mechanisms for considerable improvements over available OOP tools, thereby maintaining compatibility with existing systems to ensure desirability for the establishment software development market. The present invention may be used with the most popular object models now available, including models defined by object-oriented languages, such as C++ and Smalltalk, as well as models defined by component objects systems, such as Microsoft's Component Object Model (COM), IBM's System Object Model (SOM), the Common Object Request Broker Architecture (CORBA) and many others known in the art to which the present invention pertains.

In general, the present invention is compatible for use with any object model which supports abstract interfaces, multiple interfaces per object and on which an abstract factory exists or can be implemented.

This detailed description of the present invention provides the following: a set of mechanisms and methods to extend the utility of currently available underlying object models, a system for constructing software components and systems as assemblies of independent parts, a method for designing and implementing such systems and an automated system and visual interface for computer-assisted design and development utilizing other features of the invention.

7.1.1 Terminal Mechanism

A first notable aspect of the present invention is the terminal, a mechanism for connecting software objects. It allows each object class to define a set of connection points, referred to as terminals, on objects of this class. Terminals can then be manipulated from outside the object through an interface which is common to all objects in a given system and is independent of the functionality of any particular object.

The connecting mechanism is used to manage connections between terminals rather than objects. It handles the process of establishing and dissolving connections and is completely independent of the actual mechanism or protocol used by the objects to interact through the connection. In addition, the connecting mechanism can be used to establish both bidirectional and unidirectional connections, as well as for establishing multiple connections on each terminal of a part.

7.1.2 Property Mechanism

Another aspect of the present invention is a mechanism and method for parameterization and serialization of software objects via manipulation of object properties. Object properties can be manipulated from the outside of the object through an interface that is common among all objects in a given system and independent of the functionality of any particular object.

The property mechanism defines an extended property model suitable for describing and manipulating complex data structures, including hierarchical structures and arrays, provides for complete encapsulation of the property set of any given object and allows such property set to be enumerated completely or partially from outside and without any assumptions about its structure.

The property mechanism is used for three distinct purposes: parameterization, serialization and structured storage, and eliminates the need for the three separate mechanisms normally used in object systems to accomplish these functions.

7.1.3 Parts

A further aspect of the present invention is a specialized and inventive software objects type referred to herein as parts. Parts are objects that preferably implement both the property interface and the terminal interface described above. Preferably, parts also implement an interface for activation and deactivation. Although parts are free to expose or use any other interfaces, including interfaces to operating system services and resource allocation, all interactions between parts in the preferred embodiment of the present invention happen through connections established by using the terminal mechanism.

The use of parts in this manner establishes a clear boundary between an implementation of a part and the rest of the system and allows the definition of all services provided by and required by the part as a set of terminals on the boundary of the part. Parts contain no references to other parts or assumptions about their behavior and can be implemented separately and independent of each other. The fact that parts do not interact with each other except through their terminals ensures that systems constructed from parts have an explicit structure in which all interactions between parts are defined as connections between their terminals.

7.1.4 Structures of Interconnected Parts

Another aspect of the present invention is a mechanism and method for creating and assembling structures of interconnected software objects. The mechanism preferably works in conjunction with an abstract factory implementation, as defined above. It defines a method of describing such structures and of constructing instances of such structures at run-time using descriptors.

Yet another inventive aspect of the present invention is a mechanism and method for parameterization and serialization of structures of interconnected objects. It provides an efficient way to define a common name space for the properties of all objects contained in the structure by using structural information. The common name space is used to provide access to the full property set belonging to each object contained in the structure.

In addition, the structure support mechanism provides for parameterization of the object instances in structures in a manner which is independent of any particular structure and which keeps the parameters and their values completely encapsulated. Another feature provided by this interconnection mechanism is the ability to define names for properties of the connected objects so that access to these properties from outside will be independent of the structure.

Finally, the mechanism provides for presenting a group of similar properties defined by separate connected objects as a single property accessible from outside the structure.

7.1.5 Assemblies

Yet another aspect of the present invention is a mechanism and method for creating new objects (assemblies) from structures of interconnected objects. Assemblies are composite objects that are indistinguishable, when viewed from the outside.. from objects created by programming. Assemblies encapsulate completely the objects of which they are comprised and their connections, establishing a boundary between the objects that are inside of the assembly and the outside world.

The primary functionality of an assembly is preferably provided by an assembled structure of other parts contained in it. While assemblies can be created by programming and contain any desired amount of specific program code and functionality, the invention allows construction of assemblies entirely by descriptor without a need for any specific program code.

The formalization of assembly structure provided by the invention creates conditions in which most of the needed functionality can be allocated either to specialized parts or to universal mechanisms, both of which can easily be reused in other parts of a system or in entirely separate components and systems.

7.1.6 The System

Another inventive aspect of the present invention is a system for constructing software components and systems as assemblies of independent parts. The system preferably comprises a set of runtime support modules and libraries that implement the above described mechanisms over the object model defined by C++ and includes a set of data and interface definitions. It is designed and implemented so that it can be easily ported among most modern operating systems and utilize different object models.

7.2 Overview of the Graphical Notation

The inventive system and method includes the definition of a simple graphical notation to help build diagrams that capture designs and document the structural aspects of the systems using the methods described herein. FIG. 15 presents the elements of this notation which follow closely the elements defined by the model.

The basic elements that define the structure of a software system developed by use of the mechanism and method of the present invention are parts, terminals, connections and assemblies.

7.2.1 Parts

Individual parts are represented by icons such as 1 shown. The icon for each part includes a label 3 with the name of the class of which this part is an instance. When showing parts in a structure, the icon also includes an instance name 5 that uniquely identifies it within that structure.

Groups of parts of the same class are represented by icons similar to 7. For all design purposes, such group is treated as an array of parts where the name indicated on the group represents the array as a whole; individual members of the array are identified uniquely by combining the array/group name with the index of the part within the array.

Special conditions such as property values which are specific to the function of the part in the given structure are indicated on the surface of the part as in 27. In addition, if a part has or uses non-terminal interfaces affecting its behavior, these interfaces can be identified in a hollow arrow such as 29.

7.2.2 Terminals

Terminals are represented using symbol 19. Terminal names 9 identify individual terminals within the part that defines them; the names are usually presented in lowercase letters and placed on the inner side of the part. When describing a stand-alone part, additional information associated with each of the terminals and the type of connections it can engage in may be provided in proximity to the terminal symbol. Such information preferably comprises the logical contract name 13 and cardinality of the terminal 31, with the contract name placed on the outer side of the terminal symbol and the cardinality value indicated immediately after the terminal name followed by a colon sign (:), for example "out:2" or "ctl:any". The word "any" is used to identify infinite cardinality.

To simplify the diagrams, physical connection types are usually not shown separately—in most cases they can be deducted without ambiguity from other parameters, such as the name of the logical contract. For example, a contract named "CONTROL" will be identified as IControl when implemented as an OLE interface, I_CONTROL when the v-table interface defined by the present invention is used and M_CONTROL if a message interface is used. In cases when the contract name does not identify the physical type clearly, the type can be shown explicitly by including it in parenthesis at the right side of the contract name.

7.2.3 Connections

Connections are depicted as lines such as 11. They connect the respective terminal symbols. The exact routing of the connections is not specified—a designer usually draws connections in a way that emphasizes their roles in the system, the symmetries in the architecture, etc. Although a single line that connects two terminals is sufficient to represent a connection, adding more information helps communicate better the operation of the depicted system. Such optional information may indicate the name of the logical contract 13, direction of the flow of control 15, directions of data flows 23 or 25, synchronosity 17 and any exceptional conditions that may be relevant.

The flow of control is indicated by an arrow at the input end of the connection such as 15 (for bi-directional connections at both ends); the lack of an arrow in the immediate proximity of a terminal indicates that the terminal is an output (see 19). The directions of data flows are indicated by one or two closely drawn arrows anywhere on the connection. These arrows can be placed as many times along a connection as may be needed to make the diagram clear. Asynchronous connections are indicated by a special symbol 17 placed anywhere on the connection line.

7.2.4 Assemblies

Assemblies are drawn in two different ways. When the internal structure of an assembly is irrelevant, such as when used as part of a larger structure, assemblies are drawn simply as parts, indicating their respective class names and instance names. When the internal structure of an assembly is being described, assemblies are drawn as parts with the respective structure of other parts and connections placed inside. The terminals of an assembly are drawn as usual, on the rectangle that represents the boundary, however, they are connected from the inside to the respective terminals of subordinate parts.

In some cases, assemblies implement functionality of their own and have terminals that connect this functionality with the outside world (such as pkt2 on the figure), as well as interior terminals, such as 19, used to connect the assembly code with subordinate parts.

7.2.5 General Considerations

Terminals can be positioned anywhere on the boundary rectangle of their respective part. However, grouping together logically related terminals improves clarity and is recommended. Wherever feasible, it is preferred to draw terminals on the vertical boundaries of a part with inputs on the left side and outputs on the right. This positioning assists in envisioning the flow of control.

When drawing a diagram of a system, parts can be positioned anywhere on the diagram. Again, it is up to the designer to layout the structure so that the flow of control and functionality will be easy to understand and visualize, as understood by one skilled in the art to which the present invention pertains. It is preferred to lay out structure diagrams so that the predominant flows of control in the structure go from left to right and from top to bottom. This helps visualize the operation of the system and clearly identifies any feedback connections and exceptions that go opposite to the predominant directions.

7.3 Terminals and Terminal Mechanism

The terminal mechanism allows an object to define a set of connection points (named terminals) and expose a standardized way to manipulate this set and establish and dissolve connections through it. An important feature of the terminal mechanism is the ability to manage connections with minimal assumptions about the actual physical mechanism, logical contract or other characteristics of the connection Since available object models define particular ways to invoke operations on objects and usually do not support any invocation mechanisms not defined by them, abstracting the terminal mechanism from the object interaction mechanism allows the terminal mechanism to be used over more than one object model.

As an additional benefit, the terminal mechanism can extend in a systematic way the underlying object model by allowing objects to be built that simultaneously use different interaction mechanisms, such as messages, v-table interfaces, direct function calls and even, as an example, named pipes.

7.3.1 Elements of the Terminal Interface

Each object implements the terminal mechanism and exposes a terminal interface. In order for the terminal mechanism to be used properly, the definitions of the terminal interface on all objects that are part of the same system must be identical.

FIG. 2 illustrates the logical elements that comprise a terminal interface. It defines a set of operations; for simplicity, we assume that all operations accept as argument a pointer to the same control block structure and that all operations return a unified status code.

The terminal interface provides operations for managing connections on terminals (acquire, release, connect and disconnect), obtaining extended information about a terminal (get info), attaching arbitrary data to every terminal (get context and set context) and performing queries on the set of terminals defined by the given object (open query, get first, get next, get prev, get last and close query).

7.3.2 Connection Management

The terminal mechanism is preferably used when a connection is established between terminals of two separate objects. The process of connecting terminals is preferably coordinated by some entity outside of both objects that are being connected in order to avoid connecting objects unnecessarily exchanging information.

Figure 3:
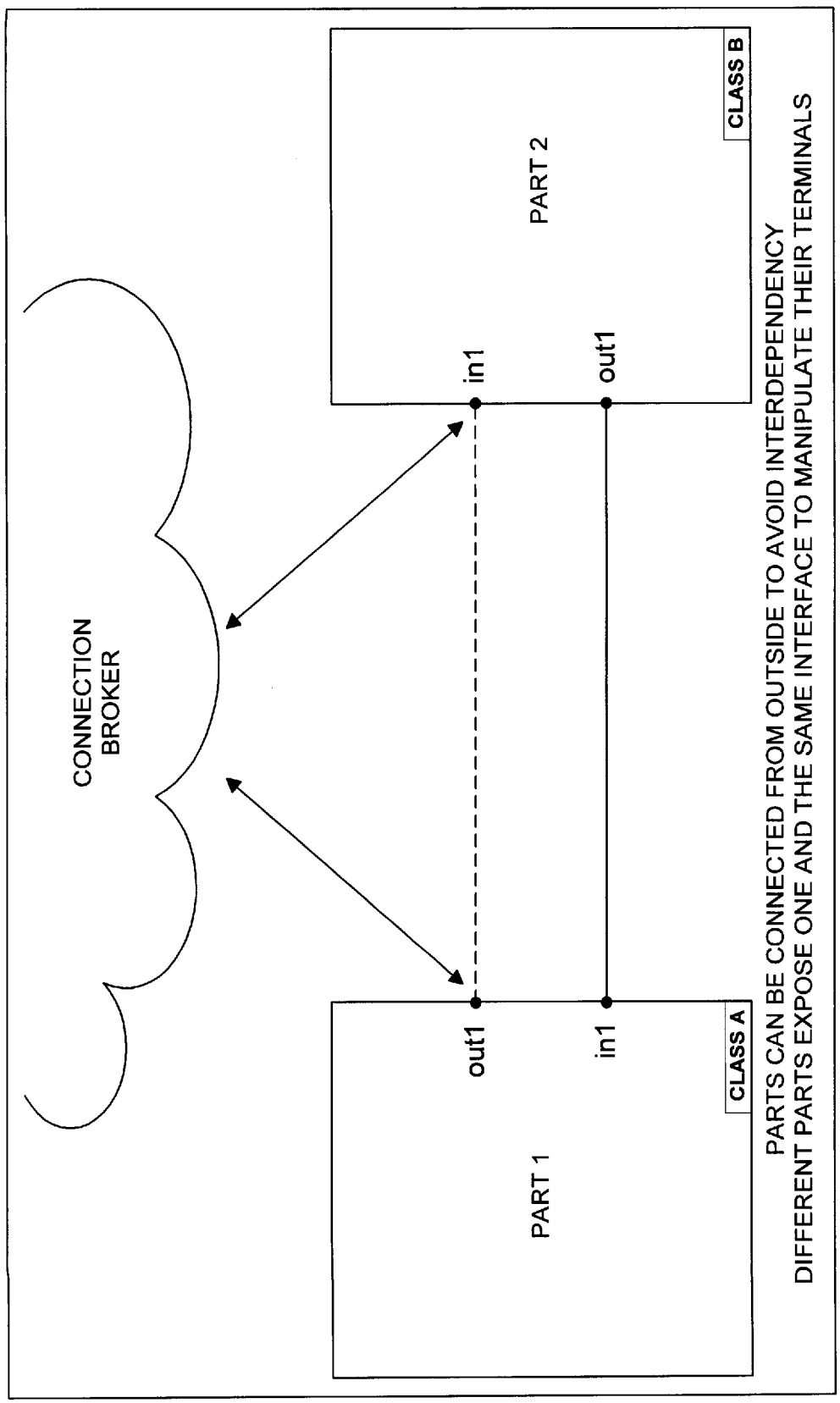
FIG. 3 illustrates the mechanism for connecting terminals of parts.

FIG. 3 illustrates the process of establishing a connection between two terminals. The outside entity is represented by a "connection broker"; it usually is the object in which both PART1 and PART2 are contained.

For example, the connection may be established using the following sequence:

1. Connection broker uses the acquire operation on both terminals, OUT1 and IN1 in the example. This operation ensures that the respective terminal can indeed participate in a new connection and returns in the control block all information that another terminal may need to establish the connection. This includes an identifier of the physical type of the connection, e.g., v-table interface, message, etc., an identifier of the logical "contract" for this terminal, such as OLE IID in the data field and the actual pointer, handle or identifier necessary to effect the connection (e.g., interface pointer).

2. Connection broker issues connect operations on both terminals, providing each of them with the information returned by the acquire operation of the opposite side in the type and data fields of the control block.

3. On the connect operation, each object ensures that the terminal is capable of accepting the offered physical type and logical contract of the connection and, if yes, stores the pointer, handle or identifier supplied with the operation.

4. If both sides return a success status from the connect operation, the connection broker assumes that the connection is established and ready for use.

FIG. 5 provides some examples of possible physical connection types along with the typical connection data that may be needed for each of the types.

The actual usage of the connection is outside of the scope of the terminal mechanism. It is assumed that if an object agrees to connect when given a particular set of physical and logical identifiers, then the object is responsible for using the connection by initiating or responding to calls, messages, etc.

A single terminal may participate in more than one connection. The terminal mechanism preferably provides support for multiple connections on any terminal. Terminals that are willing to establish more than one connection may return a number identifying the connection on this terminal in the CONNECTION ID field of the control block. The connection i.d. is returned by the acquire operation and must be supplied to the terminal on all consecutive operations related to this connection: connect, disconnect and release.

Whether a terminal will use this field is dependent upon the particular implementation of the terminal. Terminals that don't support multiple connection or do not need to distinguish between the different connections must return a 0 in this field on acquire and ignore its value on all other operations.

Even though connection i.d.s are generated by the objects and may not be unique within the system, connection brokers can identify each connection uniquely by using a combination of the following two triplets: <object id1, terminal name1, connection id1> and <object id2, terminal name2, connection id2>. It is up to the connection broker implementation to decide how it will make use of this unique identification.

Dissolving an existing connection is performed by a connection broker and involves the disconnect and release operations and apparent sequence of steps reverse to the procedure of connecting.

The terminal interface preferably and optionally provides a data storage associated with each terminal purely for convenience when implementing connection brokers. This storage, generally of variable size, is accessed by the get context and set context operations and using the data field of the control block. Brokers are guaranteed that whatever data they might store in the context will never be interpreted by the object and will be available at any time.

As one can see, the terminal mechanism can be used to establish connections of various types in a uniform way. The procedure does not depend on whether the connection is unidirectional or bidirectional, synchronous or asynchronous, through an OLE-defined interface, a custom v-table interface, a set of messages or even through a pipe provided by the operating system. It also makes no assumptions about the number of connections that a given terminal can engage in: the decision is left to the object that implements the terminal mechanism and accesses the connections.

The reader should note that the terminal mechanism does not limit connections to different objects. Two terminals of the same object can be connected in exactly the same manner as terminals of different objects. In fact, a terminal can even be connected to itself, provided that it will agree to participate on both sides of the connection.

7.3.3 Extended Terminal Information

Although connections can be established with the bare minimum of information provided by the acquire operation, during design or in automated CASE systems one may need more information about the terminals and the types of connections in which they might engage. This may be needed when the object is still being designed in order to describe the terminal, or if a system needs to verify or simulate connections in conditions where the actual connections cannot be attempted, for example, because one or both of the objects have not been implemented yet.

For such cases, the terminal interface provides the get info operation which returns extended parametrical information about the terminal and its possible connections. The information is preferably returned as a binary structure in the data field of the control block and comprises several fields. Table C in FIG. 2 shows a typical set of extended information fields that is useful for most systems.

The NEGOTIATION field indicates whether the terminal will attempt to establish connections, the conditions of which are not exactly matched to those defined in the rest of the fields. A terminal that returns FIXED value for NEGOTIATION and ASYNC value for SYNCHRONOSITY indicates that the operation of this object cannot tolerate any delay waiting for calls on this connection to be completed. Alternatively, a terminal that indicates NEGOTIABLE may be willing to accept a number of different logical "contracts", for example, by being able to call or expose different versions of a similar OLE interface.

The DIRECTION field indicates whether this terminal can be used as input, output or both in connections. The SYNCHRONOSITY field defines whether the terminal requires or is capable of synchronous or asynchronous operations. An AMBIENT value of this field indicates that the terminal can support both. The CARDINALITY defines the maximum number of connections in which the terminal can participate at any given time; an UNLIMITED value can be defined. For example, a terminal that represents a pure incoming interface has no inherent reason not to accept any number of connections.

The CONTRACT NAME field is used to define in a human-readable form the name of the particular logical "contract". Here, the term contract is used in a way similar to which it is defined by Bertrand Meyer in his book "Object-Oriented Software Construction" (referred to in the background section) and used in COM. The CONTRACT ID field is used to identify the same contract in a form that may be required by the particular connection type, such as globally unique interface identifiers (IID) in COM. This field can always be assumed optional: if the CONTRACT NAME is specified and its value matches, the contract is assumed to be identified.

The set of fields returned by the get info operation can be extended depending on the environment and the needs of a particular system. The only requirement is that all objects that engage in a particular connection type return the same set of fields for it.

7.3.4 Terminal Names

Since objects can define more than one terminal, in order for the terminal mechanism to operate, there must be a way to identify a particular terminal or group of terminals for which an operation is being requested. The identification schema must ensure that terminals defined by one object can be uniquely identified within the terminal set of this object. There is no need to provide unique identification outside of the scope of a particular object.

The terminal mechanism described herein uses a simple and flexible method for providing terminal identification that can be used equally well for simple objects that define one or two terminals and for large, complex systems with hundreds of terminals.

The chosen identification mechanism uses identifiers that can be hierarchically constructed from human-readable names. The logic of construction and the appearance of such identifiers is similar to full path names in DOS, Windows or Unix operating systems or to the universal resource locators (URL) used to identify resources on the Internet. FIG. 4 illustrates this mechanism, provides examples of valid and invalid names and shows how the mechanism could be used to express structures of terminals, arrays of terminals or any combination of them.

Since terminal names are defined by objects that expose the terminal interface, this mechanism does not define how exactly names will be used and/or parsed by the object in which they are defined as long as its terminals are uniquely identified. A typical implementation of the mechanism will have a flat table of terminals and resolve the name by searching through it. A complex implementation may use a tree of tables, b-tree indices, or any appropriate means.

In especially simple or limited systems, using human-readable names might be inappropriate or inefficient. For these cases the terminal mechanism provides the ability to identify terminals by a number in the ID field of the control block instead of the name.

7.3.5 Queries

The terminal interface provides a set of operations to enumerate terminals. This set can be used to enumerate all terminals of an object as well as a defined subset of them. Open query operation is used to define a subset and start the enumeration procedure. The four get operations (get first, get next, get prev, get last) are used in a manner which will be apparent to one skilled in the art to which the present invention pertains to enumerate the subset. The close query operation completes the enumeration procedure.

The mechanism is designed to allow any number of simultaneous queries on the same object. This is achieved by returning a context value in the control block upon return from the open query operation. This context identifies uniquely a given query within the terminal interface and must be supplied with all consecutive get and close query operations.

Enumeration subsets are easily defined by wildcard-type formalism similar to the one shown in FIG. 9, table C, for property names. The familiar "*" and "?" wildcards can be used as well as more sophisticated, regular, expression-based formalisms.

7.3.6 Operations on Groups of Terminals

The hierarchical way of forming terminal names allows a single name to identify a set or subtree of terminals. For example, in FIG. 4, table B, the name SENSOR[1] identifies a structure of terminals comprised at least of the CONTROL and OUTPUT terminals, while in table E, the ARM_CONTROL name would specifies an array of terminals.

The terminal mechanism provides for using such incomplete names to request operations on groups of terminals. If a name supplied with acquire, release, connect, disconnect and get info operations defines a group of terminals and the requested operation can be performed on every terminal from the group, the operation will be performed successfully.

Group operations are useful when atomicity is desirable. Connecting, acquiring or disconnecting a group of terminals by a single operation is an easy way to ensure atomicity provided that objects or the underlying object model guarantees atomicity of single operations.

7.3.7 Using the Terminal Mechanism

The previous sections provided a description of the terminal mechanism, terminal interface and their methods of operation. In the current section we will show in more detail how different connection types can be implemented using the terminal mechanism. For simplicity, in examples below, we will assume that all terminals support the same physical connection type—a v-table interface, similar to the interfaces defined by COM.

For readers who are not familiar with OLE COM, v-table interfaces are defined as pure abstract C++ classes. Despite the C++ derived definition, v-table interfaces can be implemented with equal ease using both C and C++.

The description found immediately below provides examples of the four most frequently encountered connection scenarios: a unidirectional, one-to-one connection which covers most cases when one object requests services provided by another; a bidirectional, one-to-one connection which covers the typical cases of two objects engaged in a protocol; a unidirectional, many-to-one connection that covers the "multiple clients, single server" scenario; and, finally, a unidirectional, one-to-many connection that can be found in broadcast, multi-cast and notification scenarios.

7.3.7.1 Simple Connections

The most basic case of a connection between two objects is when one of them is capable of providing services (a server) that the other one (a client) needs in order to function and no other clients use this particular server. FIG. 6, diagram A, illustrates this scenario, where the role of the client is played by PART1 and the role of the server by PART2. Both parties expect the same logical contract denoted here as I_CONTROL.

The T1 terminal of PART2, the server, is a pure input. The functionality provided through this terminal is implemented as v-table interface implementation (e.g., deriving from the interface definition class). In order to access the implementation clients need to receive a pointer to the v-table interface.

The T1 terminal of PART1, the client, is a pure output. It could be implemented by a variable into which a pointer to I_CONTROL interface implementation can be stored. The code inside PART1 invokes the operations of this interface through this pointer (e.g., t1→operation1 (argument1, argument2, . . . );)

The task for the terminal mechanism of establishing the connection is to provide to PART1 the pointer to the implementation of I_CONTROL in PART2. This is achieved in the following simple way:

1. The acquire operation on the T1 terminal of PART2 returns the pointer to the interface implementation along with a contract i.d. in the data field of the control block. The type field identifies the physical connection type as v-table interface.
2. The acquire operation on the T1 terminal of PART1 returns empty data and the type field identifies the physical connection type as v-table interface.
3. The connect operation on the T1 terminal of PART1 receives the type and data fields from step 1 above. After asserting that the physical connection type and the contract are acceptable PART1 stores the pointer in its t1 variable.
4. The connect operation on the T1 terminal of PART2 asserts that the physical connection type is acceptable.

As a result PART1 and PART2 have validated that both have the same expectations about this connection and exchanged a v-table interface pointer through which they can interact directly without any additional overhead. The whole process happened without PART1 and PART2 ever becoming aware of each others existence, class or other characteristics.

7.3.7.2 Bi-directional Connections

A more sophisticated case is one in which a "peer-to-peer" connection needs to be established between the two parts, as illustrated in diagram B of FIG. 6. In this case both parts participate in the connection as clients and servers simultaneously. The interaction between parts is in effect a protocol with each part initiating actions and expecting other actions in return.

In our example, PART1 uses the I_REQUEST contract to request operations from PART2 Instead of waiting until execution of each request is completed, I_REQUEST is defined to return immediately after submitting the request. Upon completion of a request PART2 notifies its client using the I_CONFIRM contract.

Existing object models normally prefer not to deal with this scenario representing it instead as a combination of two unidirectional references in opposing directions. With the present invention, however, the participants of the connection are completely de-coupled from each other. As a result, connections carried through separate terminals may or may not end at the same part. In contrast, a bidirectional connection asserts in a simple way that the protocol has exactly two participants.

The task of a terminal mechanism at establishing the connection is to provide to PART1 a pointer to the implementation of I_REQUEST in PART2 and to PART2 a pointer to the implementation of I_CONFIRM in PART1. This is achieved in the following way:

1. The acquire operation on the T1 terminal of PART2 returns the pointer to the I_REQUEST implementation along with a contract i.d. in the data field of the control block. The type field identifies the physical connection type as v-table interface.
2. The acquire operation on the T1 terminal of PART1 returns the pointer to the I_CONFIRM implementation along with a contract i.d. in the data field and the type field identifies the physical connection type as v-table interface.
3. The connect operation on the T1 terminal of PART1 receives the type and data fields from step 1 above. After asserting that the physical connection type and the contract are acceptable PART1 stores the pointer in its ti variable.
4. The connect operation on the T1 terminal of PART2 receives the type and data fields from step 2 above; it asserts that the physical connection type and the contract i.d. are acceptable and stores the pointer in its t1 variable.

As a result, both parts have validated their expectations about this connection and exchanged v-table interface pointers through which they can interact in both directions and without overhead. As in the previous example the parts remained unaware of each other throughout the process of connection.

7.3.7.3 Many-to-one Connections

Another scenario takes place when a single server object is being accessed by multiple client objects simultaneously. The interactions between each client and the server are similar to those described in the first scenario above; for the clients, the two scenarios are indistinguishable; the server, however, needs to support multiple connections through the same terminal and may need to identify each stream of requests.

FIG. 6, diagram C, illustrates this scenario. Objects C1, C2 and C3 use the SERVER object to perform queries via I_QUERY contract. The server may need to identify each of the callers in order to perform the queries in the context of the correct client.

The T1 terminals of C1, C2 and C3, the clients, are pure outputs. As above, they are implemented as pointers to I_QUERY interface. These terminals are not aware of the fact that their opposite side supports multiple connections and are not, in fact, concerned with this support structure.

The T2 terminal of the SERVER, is a multiple connection input. The functionality is provided as above by a v-table implementation, pointers to which are dispensed to clients. To identify connections the terminal implementation needs to provide two things: (a) a connection i.d. as required by the mechanism, and (b) an efficient way to identify the connection on each call.

A simple and straightforward way to achieve both goals using C++ is to construct separate instances of the I_QUERY interface on each invocation of the acquire operation. The instance pointers which are guaranteed to be unique by definition in C++ are dispensed in the data field of the control block as described above and are also type-cst appropriately and returned as connection i.d. On release, the SERVER can cast the connection i.d. back to a pointer and destroy the instance.

Since interface instances in C++ are regular C++ objects, nothing prevents the SERVER implementation to extend these objects by including any data members needed to contain the context per client (e.g., current position in the query).

Note that with this implementation the get info operation on the T2 terminal of SERVER should preferably return a cardinality value of UNLIMITED, indicating that any number of connections are supported, limited by available memory and other resources.

As a result we have established connections between multiple clients and a single terminal on the server. The clients are not aware of this; the server is the only object that needs to implement special handling of its terminal. All connections are preferably established in the same uniform way as in the previous examples The server implements simple and efficient identifications of the connections both for the purposes of terminal management and for its own functionality.

7.3.7.4 One-to-many Connections

Another typical scenario involves situations when an object has to notify multiple objects about changes of its state, data and other occurrences of interest. This scenario involves, in effect, a broadcast mechanism in which a single operation is invoked on a group of objects.

FIG. 6, diagram D, illustrates this scenario in the typical setting of a document-view architecture. The DOCUMENT object contains application data and performs operations on it. A multitude of VIEW objects are connected to it and perform user-interface presentation and interactive editing operations. The example contains a partial structure that does not cover a large part of the necessary interactions in a document-view architecture. Instead, it focuses on one mechanism: notifying all views that an update is needed because the data has changed.

The NFY terminals of VIEW1, VIEW2 and VIEW3 objects are pure inputs, not supporting multiple connections. The NFY output of the DOCUMENT object must support multiple connections and unlike the previous example does not need to identify them. Accordingly, the inputs of the view objects are implemented in the same way as described above with reference to FIG. 6, diagram A. The new aspect here is the implementation of the NFY output with multiple connection support A simple way for the document to implement such output is based on an array of pointers to I_UPDATE interface. Connection management involves the following steps:

1. On acquire, the document allocates an available entry in the array and returns its index as a connection i.d. In all other aspects it behaves as a simple output (as described above).
2. On connect, the document is supplied with the same connection i.d., a pointer to the input interface of a view and all usual data required by the terminal mechanism. After asserting that the connection is legal, the document stores the pointer in its array at the position indexed by the value of the connection i.d.

3. On disconnect, the respective entry in the array is cleared to avoid further calls to a pointer that may become invalid.

4. On release, the document modifies the entry to indicate that it is available.

As in the previous example the only object that is aware of the specifics of this scenario is the one that has to support multiple connections. The connection broker and the views do not have to do anything special to participate in such structure. The DOCUMENT object is free to implement support for multiple view notifications as simple or as elaborate as required. For example, the primitive array described above can be replaced with a linked list of entries to eliminate limitations on the maximum number of connections. Note that upon getting the information this terminal should return a cardinality value of N, where N is the dimension of the array or UNLIMITED in the case of a linked list that can grow.

7.3.7.5 Facilitating Connections

The most unusual scenario involves a case where a connection broker is required to connect terminals that refuse to establish a connection. There may be many reasons for this scenario: incompatible contracts, incompatible physical types, synchronosity or ability to support multiple connections (cardinality).

It should be noted here that the terminal mechanism, as defined for the present invention, allows the connection broker to insert parts to facilitate such connections. Because connection protocols are completely de-coupled, with both sides of the connection being unaware of each other during the connection process, transforming an illegal connection into a set of two legal connections is undetectable by the sides.

FIG. 7 illustrates this important scenario. A connection broker establishes a facilitated connection between the OUT1 terminal of a CLASS A object and the IN1 terminal of a CLASS B object by constructing an instance of the appropriate facilitator class and connecting its IN terminal to OUT1 and its OUT terminal to IN1.

As with computer hardware systems, the ability to facilitate connections greatly increases the utility of all parts by extending their use to new combinations and functions for which they may not have been originally designed. Possible facilitators include various adapters that convert one contract to another; marshalers, the function of which is to translate environment-dependent data so that it may be transferred through communication channels; de-synchronizers; physical type converters which are used to convert from message interfaces to logically equivalent v-table interfaces, etc.; and repeaters. The function of a repeater object is to provide multiple-connection capabilities to parts that have not been designed and implemented to support multiple connections.

Because of the importance of facilitator mechanisms and components, the above-described facilitator types are specifically designed and implemented as part of the present invention and described below in this document.

7.3.8 Additional benefits provided by the terminal mechanism 7.3.8.1 Terminals are independent An important feature of the terminal mechanism is the fact that terminals of the same object are independent of each other. This means that a terminal of any type, implementing any connection contract or physical mechanism, can be added to any existing object at any time without regard to pre-existing terminals. In particular, the fact that each terminal is identified by a name or other identifier that is unique among the set of terminals of the object also allows an object to have multiple terminals with the same contract type or other characteristics.

This feature does not exist in known component models such as COM which either assume that an object can have only one interface of a given class (contract type, IID) or allow existence of multiple interfaces of the same class but do not provide any standard mechanism to gain access to them.

7.3.8.2 Terminal mechanism and contract versioning

The versioning problem is a serious one in any object system. After several cycles of maintenance any reusable object or component may end up supporting compatibility with a multitude of clients designed while different versions of the component were assumed.

OLE COM attempts to solve the versioning problem by allowing the component to add new interfaces while still supporting older ones. The problem with this approach is that it fails to distinguish between interfaces that provide different functionality or services and interfaces which exist solely to support clients written assuming different versions of the same logical contract.

Moreover, the COM requirement to enforce strictly typed contracts means that any change in an interface, however small or downward compatible, can only be made by producing a new and different interface type (contract i.d., IID). As a result, after a couple of years of usage and maintenance, inevitable changes and improvements to reusable components will lead to uncontrolled explosion of the number of interfaces of this component type. It will become increasingly complex and difficult to understand and use.

The terminal mechanism of the present invention provides a simple and elegant solution to the versioning problem which does not affect the logical complexity of the objects or their usage. As new versions of the logical contract become available or needed, terminals which support these contracts are converted from FIXED to NEGOTIABLE (see the elements of the terminal mechanism described above). These terminals are able to participate in connections based on different versions of the same logical contract in a transparent and unobtrusive way.

Designers and engineers who use the object do not see any increase in the complexity as a result of versioning—the same terminals are responsible for the same logical functions. Other objects are unaware of the versioning since the terminals accept the required contracts. The implementation of the objects themselves can be maintained in a much more structured way since logically equivalent functionality is grouped according to the associated terminal.

7.3.8.3 Terminal mechanism and logical contracts

Traditional object models, whether based on an object-oriented language or a component paradigm, begin by defining and enforcing a single mechanism for communication between objects. This "one size fits all" approach works well within the limits of a single process, thread of control and memory space, but requires increasing virtualization to support in multi-process, networked and other complex environments.

The terminal mechanism provides for both multiple communication mechanisms and a clear separation between the physical mechanism and a logical contract. As a result, the same contract can be easily implemented over different physical mechanisms, such as message passing, v-table interfaces, RPC, pipes, streams and many others, all of which may be used if they are found convenient and appropriate. The separation allows the developer to concentrate on the logical requirements of the contract when designing and implementing objects, choosing the most beneficial physical mechanism as late as possible during implementation and providing converters to different physical mechanisms for objects that do not support those chosen.

An example of such a converter is an object that exposes an input terminal and an output terminal with the same contract type where the input terminal is implemented using a v-table interface mechanism and the output terminal uses, for example, a pipe. Such a converter can be inserted between terminals of parts that are incompatible in the physical mechanisms but need to be connected to support the same logical contract. As a result the terminal mechanism supports a choice of inter-object communication mechanisms without requiring any virtualization.

7.4 Properties and Property Mechanisms

The property mechanism allows an object to expose a set of data attributes to be manipulated from the outside through a property interface. The mechanism is safe since the set of properties remains completely encapsulated by the object at all times; to perform an action on a property an operation on the property interface must be invoked. The mechanism also defines a standard way to manipulate attributes of objects that might be implemented in different ways, using different languages, different binary representation of data types, etc. An important part of the property mechanism is the ability to perform operations on properties with minimal assumptions about the actual physical representation of the data inside the object.

7.4.1 Elements of the property interface

Each object implements the property mechanism and exposes a property interface. In order for the mechanism to be used properly, the exact definitions of the property interface on all objects that are part of the same system must be identical.

FIG. 8 illustrates the logical elements that comprise a property interface. The interface defines a set of operations. For simplicity, we assume that all operations accept as argument a pointer to the same control block structure and that all operations return a unified status code.

The property interface provides operations for accessing property values (get, set and check), obtaining information about a property (get info), and performing queries on the set of properties defined by the given object (open query, get first, get next, get prev, get last and close query).

7.4.2 Operations on properties

The get operation is used to obtain a property value. The control block supplied with the operation defines the name or identifier of a property (see below) and an expected type for the value. In addition the caller must provide a buffer of sufficient size to accommodate the value by initializing the data field of the control block. If the name or identifier supplied with the operation can identify an existing property, the value of this property will be converted, if needed and possible, to the requested type and returned in the provided buffer. The operation will fail with appropriate return status if the type conversion is not possible or not supported or if the provided buffer size is not sufficient. If the get operation is issued without providing buffer information in the data field, the operation will return the required size for such buffer.

The set operation is used to modify a property value. The control block supplied with the operation defines the name or identifier of a property, a buffer containing the new value to be assigned to the property and an identifier identifying the type of data provided in the buffer. If the name or identifier can identify an existing property and the provided data can be converted, if needed, to the appropriate internal representation type, the property value will be set to the supplied value. The operation will fail with an appropriate return status if the type conversion is not possible or not supported or if the size of provided data is larger that the implementation can handle.

The check operation is invoked in the same way as the set operation. The purpose of this operation is to either validate in a non-destructive way that a subsequent set operation with the same attributes can succeed or to find out in what way it might fail. The operation is useful when variable size or large binary data is handled (the operation may fail for lack of storage) or when the values need to be validated, for example, by range or in any other way. The operation can be used to perform data checking in user interfaces without the need to expose the actual set of limitations imposed on a given property.

The get info operation is used to obtain the "natural" type of a property, usually prior to invoking get, set or check operations.

7.4.3 Property types

The property mechanism identifies data types by a type identifier, normally an enumerated or integer value. The actual values assigned to represent different types are irrelevant, as long as a value represents the type uniquely within the system being built. FIG. 8 provides some examples of property types.

When implementing a property mechanism, one must define a base set of property types that the particular implementation of the property mechanism will support. One rule for defining such a set is to represent the basic data types defined by the language in which objects will be implemented. This way the implementation can easily and conveniently map any required attribute of an object to a property. Another rule is to include in the set data types or property types defined by an external system with which the objects will need to interact. This is especially important when building a system that needs to exchange data with objects defined under OLE conventions. Language-based object models generally lack any notion of properties, while component object models assume that their definition of properties and property types is the only one that is valid.

The property mechanism described above can be easily adapted to match all or most of the assumptions of the underlying object model if needed.

Note that all operations on properties are defined in a way that is completely separate and independent from data types and the binary representation of data values. For this reason, any object that needs to define or support a given property type can easily provide support for this type. The mechanism for type conversions is useful in two primary ways. First, it supplies a transparent conversion when the caller cannot handle or doesn't recognize the actual type with which a property is defined—in essence the caller announces its desired type prior to the actual execution of the operation. Another use for this mechanism is the provision of one or more of the so called common denominator types to which and from which the majority of property types in a system can be converted. For obvious reasons of convenience, one of these common denominator types is preferably a human-readable string. This way the value of any property in the system can be converted at any time to and from human-readable form. Other common denominator types can be defined as needed.

7.4.4 Property names

Since objects can define more than one property, in order for the property mechanism to operate there must be a way to identify a particular property or group of properties for which an operation is being requested. The identification schema must ensure that properties defined by one object can be uniquely identified within the property set of the defining object. There is no need to provide unique identification outside of the scope of a particular object.

The property mechanism of the present invention provides a simple and flexible way to provide property identification that can be used equally well for simple objects that define one or two properties and for large, complex systems with hundreds of properties.

The chosen identification mechanism uses identifiers that can be hierarchically constructed from human-readable names. The logic of construction and the appearance of such identifiers is similar to full path names in DOS, Windows or Unix operating systems or to the universal resource locators (URL) used to identify resources on the Internet. FIG. 9 illustrates this mechanism, provides examples of valid and invalid names and shows how the mechanism could be used to express structures of properties, arrays of properties or any combination thereof.

Since property names are defined by objects that expose the property interface, this mechanism does not define exactly how names will be used and/or parsed by the object in which they are defined as long as its properties are uniquely identified. A typical implementation of the mechanism will have a flat table of properties and resolve the name by searching through it. A complex implementation may use a tree of tables, b-tree indices, or any other appropriate means.

In especially simple or limited systems, using human-readable names might be inappropriate or inefficient. For these cases the property mechanism preferably provides the ability to identify properties by a number in the ID field of the control block instead of the name.

7.4.5 Queries

The property interface provides a set of operations to enumerate properties. This set can be used to enumerate all properties of an object as well as a defined subset of them. Open query operation is used to define a subset and start the enumeration procedure. The four get operations (get first, get next, get prev, get last) are used in a manner apparent to one skilled in the art to which the present invention pertains to enumerate the subset. The close query operation completes the enumeration procedure.

This mechanism advantageously allows any number of simultaneous queries on the same object. This is achieved by returning a context value in the control block upon return from the open query operation. This context identifies uniquely a given query within the property interface and must be supplied with all consecutive get and close query operations.

Enumeration subsets are easily defined by wildcard-type formalism, as shown in FIG. 9, table C. The familiar "*" and "?" wildcards can be used, as well as more sophisticated, regular, expression-based formalisms. Example A enumerates the conductor names for all trains known to the object. Example B, discussed below, enumerates all attributes of a conductor for train number 3. Example C enumerates the names of all crew members of train number 3.

7.4.6 Operations on groups of properties

The hierarchical way of forming property names allows a single name to identify a set or subtree of properties. For example, in FIG. 9, table E, the name SENSOR identifies a structure of properties comprised at least of the PRESSURE, TEMPERATURE and STATE properties, while the READ-OUT name specifies an array of properties.

The property mechanism provides for using such incomplete names to request operations on groups of properties. If a name supplied with get, set, check or get info operations defines a group of properties and the requested operation can be performed on every property from the group, the operation will be performed successfully.

Group operations are useful when atomicity is desirable. For example, setting a group of properties by a single operation is an easy way to ensure atomicity provided that objects or the underlying object model guarantees atomicity of single operations.

7.4.7 Using the property mechanism
7.4.7.1 Parameterization

The described property mechanism provides two important benefits when used for parameterization. First, the flexibility of the hierarchical naming allows complex structures, arrays, etc., to be easily described as static data schemes. Such schemes can be stored as a whole in data descriptors, files and other storage and consequently used to parameterize objects. Unlike the standard flat property sets, the property mechanism described for the present invention can be used in to parameterize complex structures of properties without a need for custom solutions.

The second benefit comes from the easy availability of common denominator types and automatic type conversions. A set of parameters for an object can be described in the most general form of "property name=string value". Such descriptors can be edited manually, transmitted through all communication systems, stored on any type of storage, etc. There is no need to store the type of the property with the descriptor. The conversion will be performed as needed by the accepting object.

7.4.7.2 Serialization and de-serialization

The fact that the property mechanism provides a standard way to enumerate the complete property set of any component without making any assumptions about it, and receives in this process both the full names of properties and their values converted to a requested format allows the mechanism to be used for serialization and de-serialization of objects and eliminates the need for a special persistency mechanism to be implemented by each object. Note that this does not require the objects to expose as properties each and every data attribute that they may need to make persistent. The flexibility of the property typing mechanism allows each object to implement a custom data type, if needed, or to represent any set of attributes as a single binary property.

Another benefit of using the described property mechanism comes from the fact that serialization and de-serialization operations can be driven externally. Unlike the traditional approach in which the object is supplied with a specific interface, instance of another class, file handle or other means to identify and access the persistent medium, the property set of any object can be enumerated from outside. As a result, any persistent media mechanism becomes hidden from the majority of objects and can easily be changed when needed.

Another consequence of incorporation of the inventive property mechanism, which will be illustrated further below, is the fact that in using this mechanism, serializers can be implemented as specialized objects. A serializer is an object which has knowledge of the persistent medium but makes no assumptions about the objects that are being serialized beyond the existence of the property interface on them. It can be used to serialize any object or set of objects. The serialization mechanism and its implementation thus becomes decoupled from the particular system at issue and can be reused, modified to adapt to different storage media, or otherwise modified as needed.

7.4.7.3 Structured storage

The combination of hierarchically defined names, open systems of types and support of variable data sizes makes the described property mechanism an advantageous choice for providing a structured storage in an object system. Since the property interface is already assumed to be known to all objects in the system, an object which provides a custom implementation of the property interface over memory, file system, OLE structured storage or any other media, can be used by any object that needs structured storage without the need for a separate interface.

7.4.7.4 Other uses

The property interface as defined by the present invention and its hierarchical name space can be used as a primary interface to a variety of hierarchical data store implementations, such as registries and data repositories. In essence, the mechanism provides a general purpose flexible model for describing data structures of arbitrary complexity utilizing a simple minimalistic interface.

The name space as defined by this mechanism is fully equivalent to the name space used to specify Universal Resource Locators (URLs) on the Internet, where resources residing on different computers and networks can be represented in an unified way. One way to use this isomorphism is the ability to use established Internet protocols to access properties, parameterize, serialize, or similarly manipulate remote systems. The effective property name in such case is produced by concatenating the URL of the software system or object on which the property is defined with the property path as defined by that system or object. As an example, a query opened with the following qualifier //www.company.com/
    division.printer.firmware.diagnostic.* will enumerate the diagnostic structure of properties of the firmware system of the specified printer from anywhere in the world and will allow remote support personnel to reconfigure the device.

The same mechanism can be used for any purposes that can be expressed as parameterization, serialization or data storage over the Internet or other networks. Examples include remote access to a licensing object or subsystem to update available number of licenses after payment is received.

7.5 Parts

One of the major advantages of the present invention is the ability to decouple objects from each other and from the rest of the system in a way that will make them reusable in different and multiple structures. The combination of terminal, property and activation mechanisms provides this utility. The result is referred to herein as parts.

Parts are objects that preferably implement the property mechanism, the terminal mechanism and a mechanism for activation and deactivation, and also implement the majority of their interactions with the outside world through terminals. Although parts may appear to be only slightly specialized objects, the availability of these mechanisms provides for a new, radically different way to design and implement objects when compared to the available art. This difference justifies using the name parts to distinguish them from traditional objects.

7.5.1 Elements of part

This section summarizes the important elements that work together to make objects which are parts FIG. 10 provides a simplified representation of a part.

7.5.1.1 Construction

Parts are created through the use of an abstract factory. From the standpoint of a part designer or implementor, the siginificant difference from traditional object construction is in the lack of attributes or parameters traditionally supplied on construction of an instance. This is not to say that parts may not accept such attributes—the only requirement is for the parts to be designed in a way that will permit normal construction of instances in the absence of such parameterization. An advantage of the absence of this requirement is, as shown below, that many important applications of parts benefit from the ability to create collections of parts of different classes in a uniform way.

7.5.1.2 Property interface

Every part exposes a property interface. The interface is accessible from the outside in the standard way provided by the underlying object system, it being a language or a component model. The main function of the property interface is to provide for parameterization of part instances after construction. The way the property mechanism is defined, the parameterization has to be driven from outside—parts have no knowledge of who parameterizes them or where the values come from. Another function of this property interface is serialization and de-serialization of parts. Again, the process is driven from outside as described in detail above.

It is important to note that this property interface is not intended to be used for interaction between parts, nor to be invoked from the part itself. In cases when it is desirable to provide access to properties to other parts, this or another property interface implementation should preferably be exposed through a terminal.

7.5.1.3 Terminal interface

Every part exposes a terminal interface in a manner similar to the property interface. The terminal interface is used from the outside to create and destroy connections between a part and the rest of the system. The existence of the terminal interface and its semantics is probably the single most important element distinguishing parts from other objects.

By defining terminals, parts expose services that they provide and their requirements for services provided elsewhere. Depending on the particular part, some services are required for the part to operate. Other services, such as outgoing notifications, are optional—the behavior of the part does not change depending on whether such terminals are connected.

Parts have no responsibility to provide connections for any of their terminals; the component or other code that creates an instance of a part bears full responsibility for providing connections that are required for the part to operate. Typically, if a connection is absent or dysfunctional, parts should refuse to activate or raise exceptions.

7.5.1.4 Other interfaces

While most interactions of a part with the outside world happen through terminals, parts are free to define, implement and use other interfaces. There are three general reasons to do this:

1. Implementing interfaces to provide services to external software or hardware. This is the case when a part is to be used in a component rather than in a complete system with the component providing services for third-party code. The openness of the part model guarantees that outside code does not have to be aware of the fact that it interacts with a part. An example is a part implementing an interrupt handler, OS-defined callback or similar interface.

2. Using basic operating system services, such as memory allocation, file access and others. While such services can be easily abstracted and accessed through a terminal, in most cases this is not necessary since a good portable abstraction may be provided by a runtime library. Eliminating these services from the set of terminals of most parts simplifies the structure of the system without sacrificing modularization. An exception will be a part for which the ability to use several different memory allocations or other mechanisms on a plug-in basis is part of the requirements.

3. Using any third-party libraries, preferably whenever such usage does not create undesirable parametric interaction between parts, such as when actions of one part may affect the behavior of another part not associated with the first in any other way.

Additional criteria and considerations for implementing or using external interfaces in parts is provided later in this section.

7.5.2 Life cycle

The operation of individual parts—as well as the task of creating structures of them—is greatly simplified by separating the activities which are carried to build structures (e.g., parameterizing and connecting) from those related to the primary functionality of the parts. This is achieved by diving the life cycle of any part into two distinct states: inactive and active. FIG. 11 illustrates this life cycle.

The inactive state is provided for the benefit of building and modifying structures of parts. In this state individual parts do not rely on having established connections to other parts and are not required to carry their normal operations. The only activities expected from a part in the inactive state are those related to serving requests on its property and terminal interfaces; these requests may come in any combination, order or sequence. This behavior allows the portion of the system which is concerned with creating, connecting and parameterizing structures to treat all parts in a uniform way, regardless of their specific functionality.

The active state provides most parts with a stable environment which simplifies their design and operation. In this state parts can rely on having all connections and properties required to carry their function. Parts which detect that a required property or connection is missing when in active state can refuse further operations; preferably, such detection is performed during the part's transition from inactive to active state.

Parts are created in the inactive state. The transitions from inactive to active state and back are preferably performed using a distinct activation interface exposed to the outside. A part can be destroyed in either state. The described life cycle does not impose any limitations on the behavior of individual parts when in the active state.

7.5.3 Parts as independent objects

The set of specifics described above has a profound effect on both the way parts are used and their contents. Unlike traditional objects, parts have clearly defined boundaries and lifetimes. For the majority of the parts in any system the boundary comprises a part's set of terminals and properties.

7.5.3.1 Using parts

Parts can be used without knowing any specifics of their implementation. To a large degree parts are incarnations of the classic black box model—their behavior can be completely defined in terms of input-output characteristics. Similar to hardware components, external specifications and data sheets of parts contain a complete and precise description of all interactions and services expected or required by the part, including their physical carriers, logical contracts and degrees of flexibility provided. By parameterizing the part one can change its behavior in predictable ways. Parts are implemented without any references to other parts. A designer is, therefore, free to reuse a part in any way he sees fit, provided that such use does not violate the boundary specification of the part.

7.5.3.2 Implementing parts

The impact of the boundary on the design and implementation of a part is even more significant. The simple fact that no assumptions need to be made about a system in which the part exists, nor of any specific usage of the parts, allows part designers to concentrate on the functionality and the "interior" of the part. The resulting product tends to be considerably more cohesive, complete and generic than objects designed and implemented under the usual, vaguely specified conditions.

When implemented, parts can be unit tested and completely certified for conformance to specifications using a test-bed system.

7.5.3.3 Using parts with external interfaces

The ability to implement or use any interface within parts plays an important role in the way systems of parts can be designed and utilized. While the majority of the parts do not need such interfaces, except for regular OS services, parts which implement external interfaces or use them have a special place in the system. In effect, these parts provide the channels through which events enter and leave a system. Consider the following examples:

1. Interrupt handler. A part that implements an interrupt handler effectively "owns" the source of this interrupt from the standpoint of the rest of the system. When interrupts occur such a part performs the required initial processing, determines whether any output will be generated through one or more terminals and provides the usual conditioning for reentrance, proper execution context, etc., before generating outgoing calls through its terminals. In effect, this part translates a physical event—interrupt—into a logical event—an outgoing call. If the part decides that it can serve completely any given interrupt, the rest of the system has no way of knowing that this interrupt has occurred. The remaining system sees the part as an "active agent": its state can change spontaneously and it can generate an outgoing event at any time.

2. Encapsulating an external OLE interface. A part that implements exclusive access to an OLE interface provided by an external component effectively insulates the rest of the system from the specifics of this interface and the component's behavior. This insulation can be as thin as simply providing a terminal access to the interface, or as significant as building a new abstraction using that interface. The designer of the system is free to judge what level of insulation is appropriate. For the rest of the system such a part has two roles: it represents the external services and serves as a sink for outgoing events.

The many benefits of designing a system of parts so that the handling of both entry and exit points for events is encapsulated in individual parts include:

1. Most assumptions about the environment in which the system operates can be concentrated in these "borderline" parts and do not spread to the rest of the system.

2. The system becomes easy to move from one environment to another by replacing a limited number of borderline parts. As an example, an embedded system that uses hardware ports, interrupts, a timer chip, etc., can easily be moved to a protected environment under, for example, Microsoft Windows NT where the borderline parts interact with the appropriate device drivers, receive callbacks, messages, etc., instead of accessing the hardware directly.

3. Such systems are easy to build and test in emulated environments since emulation is inexpensive to create by modifying a few borderline parts. In addition to improving the testability of the system ease of use in emulated environmens allows complex software systems to be built simultaneously with the respective target environment, saving many months in the development cycle.

7.6 Structures of Interconnected Parts

7.6.1 Connecting parts into structures

Objects that implement the terminal mechanism in effect declare a set of ports through which they intend to communicate with the outside world. Incoming terminals represent points through which objects provide services, to be used by any other object that can be connected to them. Outgoing terminals represent points through which an object typically expects services to be provided in order for it to function, generate outgoing notifications for other objects, and raise events and exceptions. Bi-directional terminals represent points through which two or more objects engage in a protocol that they need.

Figure 1:
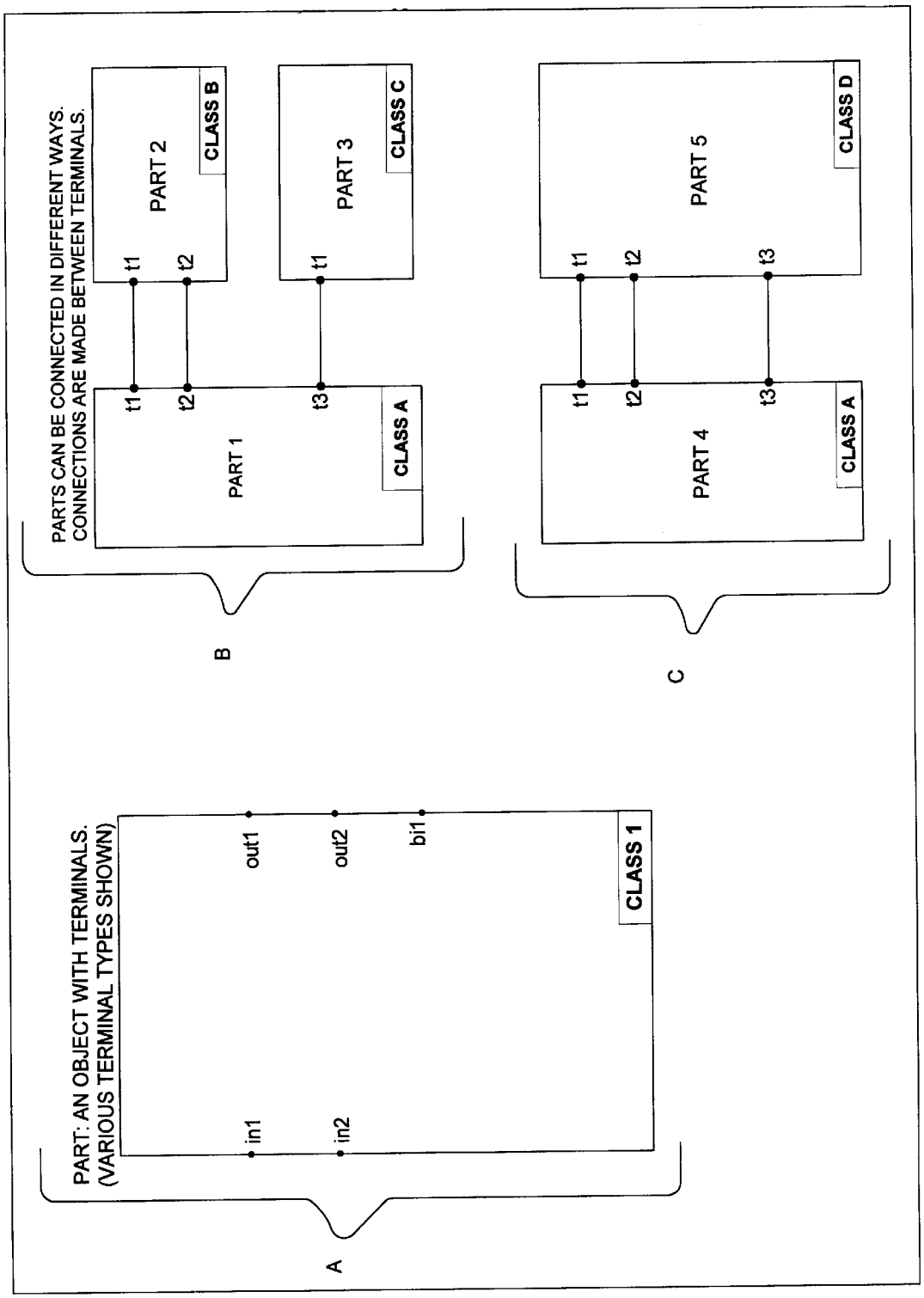
FIG. 1 illustrates a part, a key feature of the present invention, along with different terminals and the mechanism for defining connections between parts via terminals.

FIG. 1, diagram A, illustrates a part with a set of terminals defined by it. Provided that the part does not expose or use any interfaces outside of its defined set of terminals, one may think of the terminal set as a boundary around this part: any interaction with the outside world must cross this boundary. Therefore, the boundary can be used to define the complete set of interactions between this part and the rest of the world. Discussed below are the conditions under which the existence of other interactions with the outside world does not affect the validity of this model.

By connecting the terminals of different parts, one can define a structure of parts which interact. Functionally, such structure is fully equivalent to a set of objects that create, invoke and use each other directly, as happens in traditional object systems. The main difference and benefit of using the terminal model of connections is in the ability to create different structures which may function differently from the same objects without any need to change the implementation of those objects.

FIG. 1, diagrams B and C, show identical parts, named PART1 and PART4, both instances of CLASS A being connected in two completely different configurations. In FIG. 1, diagram B, PART1 is connected to two different parts: PART2 and PART3. In FIG. 1, diagram C, all three terminals of PART4 are connected to terminals of the same part, PART5. Unless the logical contract used for any connections of PART1 explicitly provides a way to identify the opposite side, there is no way by which instances of CLASS A can determine if, for example, their T2 and T3 terminals are connected to terminals of the same part. The same applies to the terminals of any other part described in the diagrams; PART2 has no way of finding out if its T1 and T2 terminals are connected to the same part.

Another important feature of structures built by creating instances of objects and connecting their terminals is that a wide variety of such structures can be easily described in data structures (descriptors). Given such a data descriptor, a general purpose function, library or object can create and interconnect any described structure any number of times. Thus, such structures can be instantiated, and therefore are similar to object classes.

7.6.2 Defining the structure

FIG. 12 illustrates a simple hypothetical system comprising a motor, M1, two sensors, HIGH and LOW, which track the rpm of the motor and a control module, CONTROL, which receives signals from the sensors and generates proper control requests to the motor.

To make the example more realistic, one may think of it as a representation of a simple embedded system similar to a cruise control. In this case, M1 represents an object which controls the hardware circuitry that interfaces with an actual physical motor. The RPM SEN instances, HIGH and LOW, are identical objects which control hardware circuitry connecting them to the actual sensors. The CONTROL object has no direct relationship with the physical system it controls. It is a pure software object the function of which is to produce the proper regulating sequence on its output OUT based on the signals that arrive on its inputs HIGH and LOW.

FIG. 12, diagram A represents the structure of this system. Each object participating in the system is identified uniquely by name (part name). For each object, a name of a class is specified. Class names are defined and used in the context of an abstract factory. Given a class name the factory can "manufacture", or construct, any number of instances of this class. The terminals of each object are identified by their terminal names, such as IN, OUT, CONTROL, RPM, etc.

FIG. 12, table B represents the part table for the same system. A part table lists all objects in a system defining names (instance names) and listing the respective class name for each. In order for the described mechanism to work, instance names defiined in the part table must be unique within the system being described. The information contained in the part table is sufficient to construct all objects from appropriate classes. However, it is not enough to connect them.

FIG. 12, table C, represents the connection table for our hypothetical system. Each connection is described by specifying the instance names and terminal names of both sides. While terminal names are not unique within the system (note that the objects HIGH, LOW and CONTROL all define terminals named OUT), the pair <instance name, terminal name> uniquely identifies a terminal within the system.

7.6.3 Creating structures by descriptor

Using the part table defined above and an abstract factory that accepts these class names, a general purpose software mechanism can construct the full set of objects that participate in the given structure.

After all objects are constructed the combination of part table and connection table together with the identifiers of the created instances is sufficient for a connection broker to reproduce all connections described in the connection table. The part names from the connection table can be matched to object instances and terminal interfaces on these instances can be used in conjunction with terminal names from the connection table to initiate a connection protocol as described above.

As a result, the set of objects represented in FIG. 12, diagram A, can be constructed and connected into an instance of the "cruise control system" by a general purpose software mechanism operating on a set of a part table and a connection table. This operation can be repeated as many times as desired to produce new instances of the system.

The combination of part descriptor and connection descriptor logically equivalent to those in FIG. 12 is called an assembly descriptor. An instance produced by interpreting the assembly descriptor as above is called an assembly. Therefore, each assembly descriptor may be sufficient to define a new object class.

7.6.4 Parameterizing and serializing structures

As one can conclude from the preceding sections, one major advantage of the present invention is the provision of mechanisms that allow arbitrary structures of parts to be created, manipulated and utilized as a whole. When this advantage is fully utiized, many standard operations and functions can be implemented in a reusable way and disappear from the task list of a system designer who is left free to concentrate on the required functionality that he or she is building. The following section illustrates how these objectives are facilitated by the property mechanism.

7.6.4.1 Using the structural information

A part table allows each instance of a part in a structure to be uniquely identified. If the identifier chosen for the part table can syntactically be used as a "name" under the chosen implementation of the property mechanism, it can be used to extend in a regular way the property name space at the structural level. Note that the "name" does not have to be a human-readable name; using proper tools, name dictionaries, etc., can provide more efficient implementation. Human-readable names greatly simplify development when the tool support is non-existent or inadequate.

This approach to extending the name space is identical to the standard approach used in networks of computers where a file named, for example, "\dir1\dir2\file" becomes "\\computer-name\dir1\dir2\file" which uniquely identifies it over the network. FIG. 13, diagram A, illustrates this approach using the familiar structure of components from FIG. 12. The result is a combined name space containing all properties of all instances that are part of the structure and is valid for use with the property mechanism. We call this operation a "join" on the name space and the resulting name space a "joined" name space.

7.6.4.2 Accessing the joined name space

A joined name space is useless if we cannot perform on it all the operations defined by the property mechanism in an efficient way. The following illustrates how this can be done.

7.6.4.2.1 Get, set and get info operations

The property implementation for the structure analyzes the leftmost element of each property name supplied with these operations. The element is assumed to be a name of a part instance and matched against the part table. If a match is found, the operation is re-issued with the remainder of the property name on the property interface of the found instance.

7.6.4.2.2 Enumeration

The property implementation for the structure drives the enumeration on queries by stepping through each element of the part table. The enumeration operations are passed to the property interface of the current element until an end is reached; at this time the query continues on the next element on the part table.

The solutions described above can be directly applied in a generic way to an arbitrary structure of parts. This allows them to be implemented as a reusable mechanism.

7.6.4.3 Parameterizing structures

The structure descriptor can be extended in a useful way by adding a parameterization table similar to the one shown in FIG. 13, table B. The table contains paths from the joined name space of the structure and the appropriate values. During construction of the structure, parts are parameterized using this table prior to connecting them. This process, which we call "hard" parameterization, ensures that instances of parts will indeed perform the function for which they exist in the structure.

In our example system, the two sensors, HIGH and LOW, are identical instances of the same class, RPM_SEN. In order for them to serve the distinct functions they have in the structure of our example, the two instances need to be parameterized with the respective I/O address and IRQ number. This binds each instance to the respective hardware device. Without such parameterization, the structure cannot function as designed.

7.6.4.4 Encapsulating the joined name space

The positive effect of maintaining a joined name space for a structure is the ability to access all properties of all parts from the structure directly and through the same access point. On the negative side, however, this approach exposes the structure and can leave it vulnerable to the outside world. In addition, whenever the structure changes, other code that uses these property names may have to be modified.

The following mechanisms complement the joined name space approach in order to provide solutions to these problems.

7.6.4.4.1 Aliases, disabled operations and hidden subtrees

The problem being solved by this mechanism is to conceal the structure or parts of the structure so that changes at a later time do not proliferate outside, as well as to protect the integrity of the structure. The mechanism uses an alias table, such as shown in FIG. 13, table C. The table contains a base path, two separate flags—one for get operations and the other for check and set operations—and a target path.

Upon a request for a property operation over the joined space, the supplied property path is matched against the base path column of the alias table. If a match is not found, the operation is performed as described above. When a match is found several options exist, depending on the values in the rest of the columns:

1. if the particular requested operation is disabled (flag is set to N) the operation is refused. This option serves to write-protect individual properties and subtrees. In selected cases, a write-only property may be implemented and useful.
2. if the operation is not disabled, the matching portion of the property path is replaced with the target path and the operation is re-issued over the joined name space. This option serves to conceal the exact structure and represent properties of particular components as properties of the whole system (e.g., MIN_RPM on the system which evaluates to the THRESHOLD value of the LOW sensor).

7.6.4.4.2 Group properties

Another challenge exists where two or more parts in the structure need to be parameterized with essentially the same value. In our example system a sensitivity value has to be set to both sensors. Lacking a special mechanism, both properties would have to be exposed separately to the outside world, for no logical reason, thereby forcing an outside object that uses the described structure to maintain the same value in both properties.

The group property mechanism represents a set of properties in the joined name space as a single property to the outside world. This representation is, of course, ambiguous. While the set operation can be simply repeated on all properties from the group, there is no trivial way to define the behavior of the get operation. To resolve the ambiguity, the behavior needs to be explicitly defined. Several possibilities exist, including returning the first successfully obtained value, the last successfully obtained value or the computed average of the values or return an error if all values are not equal.

A different definition that requires storage for the last set value in the property implementation of the structure is preferred. Under this definition the get operation returns this value and the set operation sets this value. Before returning from a successful set, the property mechanism implementation synchronizes the values of the properties that are part of the group with the last set value.

7.7 Assemblies

Assemblies are composite parts. An assembly contains a structure of interconnected parts which provides most of its functionality and behavior. From the designer's point of view, the primary function of assemblies is to provide (and enforce when needed) an enclosing boundary between the interior structure and the outside world. On the outside, an assembly presents itself in exactly the same way as a part that was built by programming—by supporting construction without parameters, by preferably exposing a property interface, a terminal interface and an activation interface. On the inside, the assembly is the world—any interaction between the contained structure and the rest of the world has to cross the boundary and therefore is controlled or facilitated by the assembly.

7.7.1 Elements of an assembly

Being parts, assemblies contain the elements required for any part, preferably including void construction, a property interface, a terminal interface and an activation interface. However, in order to serve as complete enclosures for their contained structures of parts, assemblies have a number of additional elements.

FIG. 14 illustrates an assembly. It shows a cruise control part that contains the already familiar example structure of a motor, controller and two sensors. FIG. 14, diagram A, shows the graphic diagram of the assembly; tables B and C represent the logical structure of its part table and connection table, respectively. For brevity, we assume that the parts are hard parameterized by using a table similar to FIG. 13, table B, and that the assembly represents the joined name space as shown in FIG. 13, diagram A and tables C and D.

The structure is slightly modified from the previous figures to contain a repeater part R that is inserted between the RPM output of the motor (M1) and the sensors. We assumed that M1 implements the RPM terminal with a cardinality of 2; therefore we need a repeater in order to expose the RPM contract to the outside of the assembly. FIG. 14, table D illustrates how terminals of the cruise control assembly are mapped to terminals of subordinate parts.

The resulting assembly class, named CRUISE CONTROL, is a part that implements the complete cruise control functionality. It exposes three terminals—CMD, SHUTOFF and RPM. CMD and SHUTOFF are inputs through which the part is controlled from the outside. RPM is an output that can be used for diagnostics, to drive an indicator that will show the current rpm value to the driver, or to provide data for more sophisticated schemes that can be implemented using the cruise control part. The RPM output does need to be connected in order for the sample cruise control assembly to function.

7.7.1.1 Part management

Assemblies contain facilities for managing the set of parts which they contain. Part management comprises functionality, typical of an abstract factory, as well as container functionality to hold and manage the set of instances. Part management uses descriptor structures, logically equivalent to the part tables in FIG. 12, table B, and FIG. 14, table B, and to the hard parameterization table of FIG. 13, table B. The descriptors are defined once per assembly class but are used independently in every instance of the assembly.

The assembly factory creates and destroys parts in the scope of the assembly. In a manner similar to the provision of class names to component factories, the assembly factory is passed a part name. The part name identifies the function of the part in the assembly. Using the example from FIG. 12 part names are HIGH, LOW, M1 and CONTROL, each of them having only one instance within an assembly. In a more advanced example some or all parts may have multiple instances within the assembly.

It is up to the assembly factory to define the exact way in which part instances are created. Usually the assembly factory resolves the specified part name into a class name (e.g., HIGH to RPM_SEN) and forwards the operation to some external factory which actually creates the instance. The main reason for this is to be able to use part classes to make parts that participate in different assemblies or are used as standalone components. The factory provides useful encapsulation of the exact mechanism by which a part is created, allowing the assembly to utilize parts implemented under different object and component models, even in the same assembly.

Another function of the factory is to provide specialization of general purpose classes as needed in the scope of the particular assembly. This is achieved by using the mechanism of hard parameterization. In our example, the assembly factory effectively produces two different classes of sensors—HIGH and LOW by using the same externally defined class, RPM_SEN, and specializing it by setting IOADDR and IRQ properties of each instance.

Assemblies are responsible for the construction and destruction of all instances of parts they contain. The life scopes of these instances are fully contained within the life scope of the assembly instance.

Another important aspect of the part management functionality is to provide a container for all instances created and managed in a given assembly. The typical functionality of the container includes registration and enumeration of instances, providing an efficient mechanism for non-persistent identification of instances uniquely within the given instance of the assembly.

In addition, the container preferably provides sufficient persistent identification (names) to facilitate effective use of descriptors defined per assembly class, such as part tables, connection tables, etc. If part identification by name is provided, several operations preferably take advantage of it, including binding, which returns a non-persistent identifier of an instance by its name, and instance enumeration operations, which can provide filtering by name in a manner similar to the queries in the property mechanism.

A typical schema for generating useful persistent names for the above purposes is to use the part name as defined in the part table to identify parts which participate in the structure as single instances and generate names by appending a sequential number to the part names for those which will be created and destroyed dynamically during the lifetime of the assembly.

7.7.1.2 Connection management

Assemblies facilitate and manage all connections between parts that they contain as well as between the contained parts and the assembly itself. In addition, assemblies participate in the management of all connections that cross the assembly boundary.

The connection management facilities function as a connection broker driving the procedure of establishing and dissolving connections as described in the terminal mechanism. In addition, they act as a container for all connections in the assembly instance, providing efficient identification of connections within its scope as well as enumeration of connections by various criteria (by object, by terminal, by connection i.d. or by combinations thereof). The connection management uses descriptor structures similar to FIG. 12, table C, and FIG. 14, table C. The descriptors are defined once per assembly class and are used independently in every instance of the assembly.

The common connection management facilities are also used for connections between any of the subordinate parts and the assembly itself. Such connections are needed in cases where the assembly implements certain functionality (not contained in any included part) which needs to interact with the parts. The combination of an interior terminal interface as described below and the standard connection management used for connections between parts is sufficient to manage all connections that originate and end inside the assembly.

Connections between parts of an assembly and terminals located outside of the assembly are managed separately as part of the terminal mechanism of the assembly described below.

7.7.1.3 Enclosure

Assemblies are responsible for maintaining the boundary between the contained structure and the rest of the world. They facilitate connections to and from the outside by exposing selected terminals of subordinate parts through the terminal interface of the assembly. To allow for further parameterization, serialization and de-serialization of the parts they contain, an assembly also exposes the joined name space of the structure through its property interface. It is responsible for maintaining the integrity of that structure by enforcing aliases, disabling operations and subtrees and implementing group properties as described elsewhere herein.

7.7.1.4 Construction and Destruction

Since assemblies are parts, they have to support instance creation driven by abstract factories—parameterization on construction is possible, but must not be required.

During construction, assemblies use the part management and connection management mechanisms to create the static portion of the contained structure. This process includes constructing all parts by interpreting the part table (FIG. 14, table B, in our example), parameterizing them using the hard parameterization table (FIG. 13, table B) and creating the connections as specified by the connection table (FIG. 14, table C).

Upon destruction, assemblies dissolve all contained connections and destroy all subordinate parts. Note that the structure of an assembly may change during its lifetime—parts may be created dynamically and connected to the assembly and other parts. To ensure proper cleanup upon destruction, the assembly may preferably use the enumeration of actual instances on both connection management and part management facilities.

7.7.1.5 Property interface

As with all parts, assemblies can be parameterized and/or serialized and de-serialized from the outside. Typical assemblies do not have properties of their own—instead, their property interface exposes the properties of the contained structure. In our example, the implementation of the assembly property interface works on a joined name space as shown on the right side of FIG. 13, diagram A. However, using the alias table (FIG. 13, table C) and a group property descriptor (FIG. 13, table D) the assembly property interface can present to the outside world a much simpler and more consistent structure of properties.

The resulting property space that is exposed by the CRUISE CONTROL assembly includes only 5 properties: ENABLED, MIN_RPM, MAX_RPM, SENSITIVITY and STATE. This set of properties is expressive in the context of the cruise control as a single part as opposed to a collection of unrelated objects: MIN_RPM and MAX_RPM are used to set the rpm range, SENSITIVITY is used to control the sensitivity of both sensors. The read-only property STATE reflects the state of the motor and can be used to monitor the behavior of the cruise control during testing and certification. Finally, the ENABLED property enables the operation of the whole cruise control.

7.7.1.6 Terminal interface

As with all parts, assemblies expose a terminal interface. It is used to connect the assembly to outside parts that can use its services or provide services required by the assembly. Like other parts, assemblies can expose terminals that are needed by code that is implemented in the assembly itself. In addition to this, assemblies may expose terminals of the subordinate parts.

It is up to the designer of an assembly to define which terminals will be permitted for access from the outside; the goals here are to present a simple and cohesive model to developers that are to use the assembly as a part and to hide the implementation structure so that it can be changed later without affecting the external characteristics of the part.

Presenting terminals that belong to several parts as a single set creates problems that are similar to those which arise in presenting the joined property space. Solutions to problems specific to terminals are discussed in detail later in this section. For simplicity, our example shows the most common case, in which every terminal of the assembly corresponds to a single terminal of a subordinate part.

The terminal interface implementation of the assembly has to be able to handle two different scenarios: (1) when a terminal of the assembly corresponds to a single terminal on a part within it and (2) when an assembly terminal actually represents a group of terminals which may be defined on different parts.

In the first case, the terminal interface of assemblies uses an aliasing mechanism practically identical to that described for properties: the incoming terminal name is used as a key in an alias table, identifying a target part and terminal name on it; then, the assembly reissues the operation on the terminal interface of that part supplying the target terminal name.

The second case occurs when, for example, a set of parts in the assembly requires the same external service, but the external service is not provided within the same assembly. Each of these parts has a terminal which is a pure output through which it expects connections to a provider of such service. Although each of these terminals could be exposed using the alias mechanism above, this would lead to a non-cohesive assembly that exposes multiple terminals for the same purpose; use of the alias mechanism in this manner also violates the encapsulation of the structure, since changes may lead to modifications in the set of terminals. Another example of the second scenario is an assembly which receives notifications from the outside and has to distribute them among several parts inside.

The problem with presenting a set of multiple terminals through a single terminal lays in the nature of terminals. In essence, such presentation requires a structure capable of creating multiple connections on the inside of the single terminal synchronously with the terminal participating in the establishment of a single connection from the outside.

The problem is solved with the help of separate parts, called repeaters. A repeater generally has two terminals. Both terminals require the same logical contract, usually support the same physical mechanism and at least one of them supports a number of connections greater or equal to the number of elements in the group. A group terminal is represented by a descriptor that specifies the name of the repeater, the name of its terminal that is to be exposed on the outside, the name of its terminal which will be connected on the inside and a list of parts and their terminals that constitute the group. An example of a group terminal is terminal 31 in FIG. 15.

Group terminals operate in the following manner:

1. The instance of the repeater responsible for the group is created either on construction of the assembly or on the first acquire operation for the group terminal.
2. On acquire for the group terminal (coming from outside the assembly), the assembly delegates the operation to the repeater and returns the results to the caller.
3. On connect for the group terminal the operation is passed to the repeater first; upon successful return from the repeater, the connection broker is invoked to create all connections between the other terminal of the repeater and all terminals listed in the group table. If any of these fail, a disconnect is issued on the repeater's outer terminal and a negative result is returned.
4. On disconnect for the group terminal all connections between the repeater and the parts from the group are dissolved completely, after which the operation is passed to the repeater.
5. On release for the group terminal the operation is passed to the repeater.

Repeaters may be created for every logical contract for which group terminals may be needed. It is much more efficient, however, to have universal repeaters capable of supporting as wide a group of logical contracts as possible. In the ideal case, a single repeater class is needed to support a physical connection mechanism. For message based interfaces as well as for v-table interfaces which are designed to use a single control block structure on all operations and return a unified result status code, such repeaters can easily be created. For strongly typed interfaces, especially the ones where each operation defines its own set of arguments and return type, a universal repeater is more difficult to create and may require information about the contract similar to the one needed by interface remoting and marshaling.

Repeaters for pure inputs are essentially broadcast facilities. Every time an operation is invoked on its input the repeater issues the corresponding outgoing operation on each existing connection on its output.

Repeaters for pure outputs can be significantly optimized. Such repeater does not have to participate in the actual operation of the connections: it is enough to distribute the data context of the connection as it is provided to the repeater's input on connect to the acquire operation on the output of the repeater. The result will be that the multiple terminals being connected to this output will receive the same connection context supplied on the original connect operation on the repeater. In the case of v-table interfaces this means that the interface pointer supplied from outside of the assembly as connection context will end up directly in all terminals that will need to invoke it. It is interesting to note that the repeater described here is independent of both the logical contract and the physical mechanism through which the connection is implemented.

7.7.1.7 Interior terminal interface

Assemblies can be created without any functionality of their own. Alternatively, a designer may decide to implement some piece of functionality directly in the assembly rather than packaging it in a separate part. Typical cases when this happens include non-standard ways of manipulating the set of parts or connections of the structure and functionality that is not likely to be reused in other contexts.

Assemblies that implement functionality can expose actual terminals to the outside world through the normal terminal mechanism. In addition to this they usually need a way to establish connections between themselves and parts they contain. The latter is provided by a second, interior, terminal interface on the assembly. This interface is not exposed to the outside world; instead, it is used to represent the internal functionality of the assembly through terminals so that the standard connection management facilities can be used to connect terminals of subordinate parts to the assembly itself.

7.7.2 Life cycle

The life cycle of an assembly is identical to the life cycle of a programmed part. The states and requirements to which assemblies have to comply are also identical. The section below amends their description as defined for parts in general elsewhere in this document by summarizing the typical activities of assemblies in the inactive state.

7.7.2.1 Construction

Assemblies normally create the static portion of the structure they contain. This involves constructing all parts that participate as single instances in the structure and connecting them to each other and to the assembly as defined in the part descriptor and the connection descriptor tables. In addition, any "hard" parameterization, as described in section 7.6.4.3 above, is preferably carried at this time. For many assemblies this completes the structure creation—they do not have dynamically maintained parts and contained connections.

7.7.2.2 Parameterization

Assemblies normally propagate operation requests received on their property interface to the subordinate parts as described for structures of parts elsewhere in this document. An exception to this rule occurs when an assembly implements functionality of its own, in which case a number of properties may be defined by the assembly itself. These properties are handled in a manner identical to those used by all parts described above.

7.7.2.3 Connection

The terminal mechanism of the assembly cooperates with the terminal mechanisms of the subordinate parts, and repeaters in the case of group terminals, to perform the terminal operations required from outside. Again, if the assembly implements its own functionality, some of its terminals may be implemented directly on the assembly and maintained in the same way as with all parts.

Assemblies are responsible for supplying activation and deactivation events to their subordinate parts, preferably when they receive the respective event from outside.

7.7.3 Assemblies as independent parts

As with programmed parts, the existence of a well-defined boundary is an important concept that simplifies the design and implementation of assemblies and at the same time increases the value of the outcome of the development process. An assembly encloses a structure of interconnected parts that is built to implement particular functionality. The set of terminals exposed by an assembly identifies most assumptions about the outside world that are needed in order to design and construct it. The designer of an assembly may therefore separate the structure being built from the particularities of any system that will use the assembly and design it as an independent module that can be used in many different ways and systems.

An important feature of the assemblies is that they can be constructed with little or no programming. A designer of an assembly can build the structure from ready-made parts, or use a combination of pre-existing parts with some that are designed and built specifically for this assembly. Similarly, parts built for specific purposes can be reused in different structures later, increasing the arsenal of parts available to the designers of future systems.

7.8 Constructing Systems Using Parts and Assemblies

A key feature of the present invention is the ability to use assemblies together with programmed parts as building blocks for other, more complex assemblies. Indeed, a complete assembly viewed from the outside is fully equivalent to a programmed part—the invention provides all mechanisms needed to encapsulate completely the internal structure of an assembly and expose to the world a cohesive set of terminals and properties that are representative of the function of the assembly as a whole and are unlikely to change considerably in the future. The result is a part, built directly from a design without a need for programming, that can be added directly to the set of parts available for further work.

Using the present invention, software components and complete systems can be built incrementally, by composing them from ready-made parts. The composition process is recursive—instead of building complex structures to represent entire target systems, a software engineer simplifies the task by breaking it down into a sequence of steps. FIG. 33 contains a flowchart illustrating the major steps of the preferred iterative design process by which a target system is decomposed into a list of ready-made parts that can be reused, a list of part definitions from which new parts are to be built and a list of assembly designs which integrate the parts to produce the target system.

At each step, a small part of the required functionality is designed and built as a structure of interconnected parts. When the step is completed, the resulting structure is packaged into an assembly, which is used together with other parts as a resource for the following steps. The final result is an assembly that completely implements the required functionality.

To make such assembly interact with other software that is not built to take advantage of the technologies described in the present invention, the designer can follow two approaches:

1. Include boundary parts that facilitate interactions with the outside software by exposing or using any type of interface that is required.
2. Wrap the assembly into a conventional object, application or any other desired packaging. The wrapper implements direct interactions with the outside world and an interior terminal interface to which it connects the terminals of the assembly and which it uses to feed input into the system and collect any results from it's work.

Naturally, nothing in the present invention prevents designers from using any appropriate combination of the above listed approaches—whenever a boundary part is already available or is beneficial to have it can be used, with the remaining interfaces to the world provided by a simple, low-cost wrapper.

FIG. 32 contains a breakdown of the inventive development process preferably used to design and construct software components or complete software systems using the mechanisms and methods of the present invention.

7.9 The System

The system of the present invention supports the construction of software components of moderate complexity for operating systems and applications. The system is used for development of a wide range of components including device drivers and system services, data repositories, interactive visual drag and drop editors, as well as VBX, OCX and other user interface controls. Some components produced using this system have been wrapped as command-line utilities.

The system supports development of programmed parts and assemblies using C++ language. The major components of the system are illustrated in FIG. 16. The system provides essential run-time support services and abstractions, including an abstract factory, part support and assembly support. The implementation provided in the appendix to U.S. Provisional Patent Application Serial No. 60/008,699, filed Dec. 15, 1995, on which this application depends for priority and which is incorportated herein in its entirety by reference, works on Win32 systems, including Windows NT, Windows 95 and Win32s; the system, however, is highly OS-independent and can be ported easily to any environment that supports C++.

The system provides an efficient mechanism by which parts can be packaged into separate dynamic-link libraries (DLL) and loaded on demand. This mechanism allows libraries of parts to be distributed in binary form, bypassing the well-known incompatibility of C++ compilers from different vendors.

Using this system, parts are implemented as C++ classes that derive from a common base class named PART. The base class, essentially a wrapper, provides access to the run-time support for parts including factory registration, construction of instances, a property interface and a terminal interface.

Assemblies are implemented as C++ classes that derive from a common base class named ASSEMBLY which provides access to the run-time support for assemblies. This support includes factory registration, construction of assembly instances (including construction of subordinat parts, establishing connections, and hard parameterization), a property interface, a terminal interface and an interior terminal interface for the assemblies. In addition, the system provides a set of include files and macro-definitions that simplify greatly the development of parts and assemblies.

Using this system, assembly classes are implemented by defining a part table, a connection table and a hard parameterization table. The property mechanism of the assemblies supports the joined name space of subordinate parts, as well as aliases and group properties. The terminal mechanism of the assemblies supports group terminals on both inputs and outputs. For assemblies that do not contain code, the complete definition of the assembly comprises a set of tables, implemented as static arrays of structures. After compilation, an assembly class becomes indistinguishable from other part classes and can be used in any place where parts can be used.

In addition, the system provides a set of connectivity parts that includes event buses, repeaters, adapters, multiplexors and several others. The connectivity parts eliminate the need for custom implementation of terminals in most cases where many-to-many, one-to-many and many-to-one interactions are required.

7.9.1.1 Limits of the implementation

Since most of the mechanisms defined in the present invention are universal and can be used with many different object models, operating systems and programming languages, every practical implementation of this technology has to define limits to which it needs to support one or another mechanism. In the case of the inventive system described herein, one of the high development priorities was to be able to produce self-contained components that include all necessary run-time support for their structures. This required keeping the size of the entire run-time support within the 64K range in order to accommodate most average-sized components.

The following list outlines the limitations of an embodiment of the inventive system, none of which is necessary for practicing the present invention as claimed herein and none of which is necessarily preferred for the best mode of practicing the invention. Moreover, none of the following should be viewed as a limitation on means envisioned in the claims for practicing the invention as outlined herein above and below.

1. Although portable, the system contains dependencies on Win32 API
2. The only language currently supported by the system is C++
3. The system currently supports only one physical type of connections—custom v-table interfaces. These interfaces, the definition of which is provided in FIG. 19, are programmatically compatible with OLE interfaces, but use integer constants for contract identification instead of the globally unique IID used by OLE which require system-wide registry services 4. The system provides placeholders instead of complete implementation of queries in both terminal and property interfaces; the full implementation is rarely needed in small components and will be in envisioned alternative embodiments. The only significant effect of this limitation is that the standard serialization and deserialization mechanisms described above are not currently supported, however, support for such mechanisms is surely apparent to one skilled in the art to which the present invention pertains.
5. Bi-directional connections are supported only between programmed parts—bidirectional terminals on assembly boundaries are not supported.

6. Assembly support does not expose joined name space on terminals.
7. Assembly support provides a built-in repeater for group terminals. Programmer-configurable repeaters are not supported.
8. Both property and terminal mechanism implementations do not support group operations. Each operation requires a fully-qualified name for the property or terminal to which it applies.
9. Assemblies do not include support for dynamic modifications of the structure at run-time. Preferably, this does not prevent such modifications from happening, but requires specific code to handle them.
10. The connection broker provides limited support for multiple connections on a single terminal. While it is possible to establish such connections, in the current version both sides are responsible to store the respective connection i.d.s with their terminals.

These limitations need not be present in order to utilize parts and assemblies developed with the currently preferred embodiment.

7.9.2 Elements of the system

The system comprises a run-time support, abstract factory implementation, property and terminal interface definitions, part support and assembly support. The following sections outline each of these elements in more detail.

7.9.3 Run-time support

The run-time support module contains the basic run-time functionality required by the other elements of the system. This includes memory allocation services, name registration and binding services, access to input/output console for error logging and processing, and a general purpose index class. The run-time support module can be packaged as a static library that can be linked with the rest of the system, or as a stand-alone Dynamic-Link Library executable file (DLL) that can be loaded and shared by many components using the system.

The run-time support module is callable from both C and C++ languages. The interface comprises a collection of function calls defined within the common denominator between C and C++ languages. The functions are divided logically into groups, each group corresponding to one of the distinct services provided by the module. The arguments and return results of most of these functions follow the common conventions for such services.

Finally, the run-time support defines a set of include files which are used by the rest of the system and by the parts. These include files define portable data types as illustrated in FIG. 17, common return statuses shown in FIG. 18, error definitions and useful macros and other utility functionality.

7.9.4 Factory

The system implements a lightweight abstract factory with class registration and name binding. During load time, components that contain implementation for different classes register with the factory using the name management services provided by the run-time support. Each class registers at least one name; some classes may choose to register aliases in addition with their primary name. With each name the class implementations register a pointer through which their factory interface can be accessed. The class factory interface supports creation and destruction of instances of the particular class.

The factory defines a common interface for creation and destruction of part instances. This interface is comprised of three operations: create, destroy, and bind. The create operation accepts a pointer to a name, creation context (not used by this system) and pointer to storage for the instance pointer. It attempts to bind to the given name using the name manager services from the run-time support; if successful, it invokes the create defaults and create operations of the factory interface of the class in sequence. On completion, the create operation returns to the caller storing the instance pointer in the provided memory location.

The bind operation provides the ability to bind (obtain a pointer to) any instance of a part in the system that has registered a name with the name management services. Parts register their names with a pointer to the part. Alternatively, a part may register a particular interface that it implements.

The destroy operation takes a pointer to an instance, locates the factory interface of the appropriate class and passes the operation to it.

7.9.5 Interfaces

The system defines a custom v-table interface type as illustrated in FIG. 19. These interfaces are similar to v-table interfaces defined by OLE COM and are built on the C++ definition of virtual function dispatch tables. The interfaces are programmatically compatible with the OLE definition; both types can be substituted for each other without any changes in the logic and operation of the code that uses or defines a particular interface. Unlike OLE interfaces, the v-table interfaces defined by this system do not require a system-wide interface registry and use integer constants to identify the contracts instead of the globally unique i.d.s used in OLE.

Another difference is the fact that each instance of the inventive v-table interfaces defines data members accessible via the interface pointer that contain a signature and the interface identifier value. Using these data, every pointer can be validated to actually point to a valid instance of an interface of the expected type before invoking a call through it. This simple scheme decreases significantly system failures as a result of simple programming errors such as attempts to call interfaces of objects that have been destroyed.

The last noted difference between OLE interfaces and the interfaces defined in this system is in the standardization of the signatures of the member functions. All interface member functions are expected to return a status result. The common statuses are defined in the file STATUS.H which is part of the run-time support. In addition, all member functions of the same interface take as an argument a pointer to a bus—a common control block defined as part of the interface.

This approach (return statuses+control blocks) is widely used in operating system and networking software designs and provides simple means for ensuring polymorphism and makes it possible to desynchronize operations. It also emphasizes the commonalties between interface members and makes it easier to understand and use. While not enforced or relied upon in the implementation of the system, the control block, or bus-based interfaces, are encouraged because they are easy to dispatch and connect using simple, general-purpose connectivity components.

The system defines three interfaces that every part implements—a factory interface, a terminal interface and a property interface. To simplify the work of a part designer, the system also provides definitions for a polymorphic v-table interface and many other reusable interfaces. Unlike the factory, terminal and property interfaces, the usage of any of the other interfaces is completely optional. The polymorphic v-table interface, I_POLY, is illustrated in FIG. 25; it can be used in place of any v-table interface which defines up to 64 operations.

The definition of the factory interface is illustrated in FIG. 22. Its operation is similar to the operation of the system factory which ultimately passes the creation and destruction of instances to their respective class factory interfaces.

The definition of the terminal interface is shown in FIG. 20, and of the property interface in FIG. 21. Both interfaces adhere to the definitions of their respective mechanisms as described in detail above, but with the limitations of this implementation as also defined above.

7.9.6 Part Support

The system supports development of programmed parts by providing implementations for the factory, terminal and property mechanisms. These implementations constitute a separate runtime module which is provided packaged as a static library or as a DLL. Part developers access this module by deriving their parts from a base class named PART, using the C++ inheritance to simplify their work.

7.9.6.1 Structure

The factory support for a part handles registration, de-registration and most of the factory interface specifics of the part. A developer who implements a specific part provides only the code that deals with the construction details of his specific part, such as initialization of instance data. The factory mechanism exposes two static functions per class which are used to link the class code statically and provide for initialization and cleanup at load and unload time respectively for this class. The names of these functions are derived from the name of the class; for example, a class "t_connector" will include automatically functions named init_t_connector and cleanup_t_connector.

The PART class contains an implementation of a terminal mechanism. Each derived part defines two terminal tables—an input table and an output table. Entries in these tables contain information about the terminals of the part which is common for all instances of the part class, such as terminal names, the interface i.d. each terminal requires and others. Each entry is bound to a member variable in the instance data in which the pointer to the particular input or output interface will reside.

In most cases, all that a given part needs to do in order to support terminals is to initialize these tables at implementation time and initialize the input interface pointers in the instance data at instance construction time.

The support for the property mechanism provided by the PART class is designed in a similar fashion—the developers initialize a property table, defining names, types, default values and ranges for the properties they would like to support on a given part class. This table is bound to variables in the instance data of the parts. At run-time, the default property implementation handles the operations of the property interface by interpreting the descriptor table.

All above mentioned tables are completely encapsulated within the part classes—the only access to them from the outside is through invoking operations of the respective interfaces.

The file PART.H provides macro-definitions which simplify the implementation of parts. Part designers and implementers have complete discretion over when to take over the default implementations in order to implement custom behavior of a specific property or terminal.

7.9.6.2 Example—a Bag on Byte Array

FIG. 23 illustrates the way programmed parts are implemented using the system. It contains source code for a simple but real-world part. The part, named BBA contains an implementation of a bag (a specialized version of a set) on a byte array. The part uses two standard interfaces—I_BAG and I_BYTEAR to provide bag services and request services of a byte array respectively. It defines three input terminals—factory, prop and bag, and a single output terminal named arr. The property table of the part define several properties, such as DATA_SIZE, KEY_SIZE, KEY_OFFSET and NAME, each of them corresponding to a single member variable of the instance data structure SELF.

The part implements a create method, a destroy method and the ten operations defined by the bag interface. In addition, the part implements a reset signal handler which provides a fast way to empty and re-initialize the bag without having to destroy the instance of the part. As one can judge by this example, the existence of the three standard mechanisms does not affect the complexity of the part.

7.9.7 Assembly Support

The assembly support allows most assemblies to be implemented without programming, by describing their structure in a set of table descriptors. The system provides a factory, terminal and property mechanisms for assemblies. These implementations constitute a separate run-time module which is provided packaged as a static library or as a DLL. Assembly developers access this module by deriving assemblies from a base class named ASSEMBLY.

Unlike parts, the factory support for assemblies handles the complete implementation of their creation and destruction. The only case in which any custom code for creation and destruction of instances is needed is if the assembly developer decides to implement specific functionality directly in the assembly rather then packaging it as a separate part.

7.9.7.1 Structure

The name of the assembly class is defined by the developer; the two factory functions—init and cleanup are generated automatically and named the same way as described for the programmed parts above.

Assemblies are implemented by describing their structure in a part table and a connection table. Both tables are implemented as arrays of structures initialized statically by the developer of the assembly class, and are logically equivalent to the part and connection tables described above.

The link table uses the "*" symbol to represent the interior terminal interface of the assembly itself; for example, a link defined as "*, in, p2d, in" is interpreted as a connection between the (interior) terminal named "in" on the assembly and the terminal named "in" on the part "p2d".

The part table, the link table and the hard parameterization table define completely the structure of an assembly. These tables are used by the run-time support to create and connect all parts during the creation of the assembly.

Additional tables are used to define the specifics of the property mechanism on an assembly. These include a property table which specifies aliases and group properties and a table for each group property defined. Because of the way we resolve ambiguity in group properties, a member variable has to be defined in the instance data of the assembly for each group property defined on it.

7.9.7.2 Example—a Polymorphic T-connector

FIG. 24 shows an example of a simple real-world assembly part from the connectivity part library provided with the system. The assembly is a polymorphic T-connector, implemented from an existing T-connector and two adapters. The resulting part can be inserted on any connection in order to monitor the flow of operations and data without affecting the other parts that participate in the connection.

Its input table, INPUT_TABLE, defines two input terminals—prop and in, and the OUTPUT_TABLE defines two output terminals—out and aux. For each terminal, the tables define the name of the contract (interface type) for which the particular terminal establishes connections.

The part table, named ASM_PARTS is used to list the parts from which the assembly is constructed, in this case—p2d of class EV_P2D, tcn of class EV_TCN and d2p of class EV_D2P. All three parts in this example are ready-made parts from the connectivity part library: EV_P2D is an adapter from I_POLY to I_DRAIN interfaces, EV_TCN is a T-connector for I_DRAIN and EV_D2P is a I_DRAIN to I_POLY adapter.

The link table of the assembly is named ASM_LINKS and contain all the connections between the parts described in the part table, as well as between the assembly and these parts.

The ASM_PARAMETRIZATION table defines the hard parameterization entries for the assembly (none in our example); the usage for the rest of the tables—ASM_PROPERTY_GROUP, ASM_PROPERTIES and ASM_GROUP_PROPERTY_DESC is quite obvious from the descriptions and examples provided above. The assembly has no specific code and is completely implemented by these tables.

7.9.8 Connectivity parts

Another inventive aspect of the present invention is the ability to use separate parts to facilitate connections. The existence of such parts greatly simplifies the work of a part designer, eliminating the overhead of supporting many different interaction scenarios and protocols. The goal of this section is to provide a classification of the connectivity parts within the system.

7.9.8.1 Buses

A bus is a part that supports many-to-many type connections. The name bus comes from an analogy with common-bus network architectures such as Ethernet. The purpose of a bus is to support loosely coupled interactions in "communities" of parts, where each of the parts can "raise" a request or notification on the bus whenever necessary. Any request or notification that is raised on the bus will be received by all other parts that are connected to the bus.

Buses take several forms, as illustrated in FIG. 26. The simplest bus is a part with an array of input terminals and a corresponding array of output terminals. Alternatively, a bus is implemented as a part with two terminals—input and output, each of them supporting a large number of connections. Yet another form of a bus is a part with a single bidirectional terminal to which all participants are connected for both input and output.

Buses are used to arrange group synchronization mechanisms, such as activation, reset, shutdown, as well as to distribute notifications, updates and in general implement groupcast scenarios. A particular area of application for buses is implementation of various weak connection scenarios, where it is undesirable to connect directly the requester of services with the provider or providers.

In such scenarios, all requesters and providers for a given set of requests are connected with a common bus. Requests are placed on the bus by any of the parts that needs service, and are picked up by any of the available service providers. The response, if any, is handled usually by a different operation or event type on the same bus.

7.9.8.2 Repeaters

Repeaters are parts that implement one-to-many or many-to-one scenarios as described above. A repeater multiplies any operation raised on its input connection to each of the connections that exist on the output side. Aside from being used to implement group terminals in assemblies, repeaters are generally used to couple parts that do not support multiple connections on a given terminal with many different clients and/or service providers. FIG. 27 illustrates the preferred types of repeaters.

Based on the discipline of repeating the input operations, repeaters can be classified into three categories. The first category broadcasts the input signals by invoking the same operation with the same data on each of it's output connections. These repeaters do not preserve or interpret the result status or data returned by the parts they call.

The second group implement a pattern which we call survey—they repeat the input signal on it's output connections until the first connection that accepts the operation request. These repeaters usually interpret only the return status of the operation and can be parameterized through property with a value of the status to be accepted as indication that the request is accepted by the connection recipient.

The third category of repeaters behave in a manner opposite to a survey—they repeat the input until the first connection on which the operation fails. Similar to the previous group, repeaters from this category expose a property through which they can be parameterized with a value of the return status that indicates success (or, failure). When a failure is encountered, the repeater returns the status and the data from the failed call to the caller of its input.

Repeaters provide a flexible mechanism to arrange one-to-many interactions between parts that do not provide special support for them. The advantageous effect of their existence is that most parts do not have to provide such support.

7.9.8.3 De-synchronizers

De-synchronizers are parts that de-couple the flow of control from the data flow. A simple de-synchronizer has an input and output terminals which work on the same logical contract and a queue. Several examples of de-synchronizers are illustrated in FIG. 28.

Whenever it receives an input operation, the de-synchronizer collects the data arguments into a descriptor, or control block, enqueues the descriptor and returns immediately to the caller. On a separate driving event, such as a timer, or system idle, the de-synchronizer reads a descriptor from the head of the queue and invokes the respective operation on its output.

We define two categories of simple de-synchronizers, with and without external drive, based on how (and when) they receive the driving events. De-synchronizers with external drive define a separate terminal through which another part may feed the events. The others arrange to receive the events internally, using operating-system services such as timer callbacks or messages, or even hardware interrupts.

Simple de-synchronizers can be inserted in most connection where the data flow is uni-directional. The other parties in the connection do not have to support explicitly asynchronous connections—they remain unaware of the fact that the connections have been made asynchronous.

A more sophisticated form of de-synchronizer supports splitting a contract with bi-directional data flow into two—request and reply. Such parts can be used to keep their clients blocked on an operation while allowing the ultimate server connected to their output to perform operations in an event-driven manner for many clients. The desynchronizer is responsible for blocking the incoming calls, for example using operating system provided facilities in multi-threaded environments, until a reply for each respective call arrives.

Typical uses for de-synchronizers of this type are cases when the client part is a wrapper for a legacy component that implements lengthy operations which involve issuing many outgoing calls. Using the de-synchronizer, one can prevent such part from blocking the system or the server without having to make changes in either of them.

7.9.8.4 Multiplexors

Multiplexors are parts that implement one-to-many connections. A multiplexor has one input and a number of outputs or outgoing connections on an output terminal, called channels. It repeats the incoming operations or events on one of the outgoing channels. The connection that receives the operations is considered selected. At any moment in time, only one of the channels is selected. A controlling event or operation switches the selected channel by disabling the previously selected one and defining another one as selected.

Multiplexors generally come in two flavors, shown in FIG. 29, depending on the way they are controlled. One type is controlled by the event flow—they use a particular operation, data value or other condition on the incoming terminal as an event on which the selected channel is changed. The second group define a separate control terminal through which the selection is driven.

In architectures based on data flow, multiplexors play the same role as conditional statements in programming languages—they allow the designer to branch the processing of an event based on the event itself or on pre-existing conditions.

7.9.8.5 Adapters

This category includes a wide variety of parts which convert one type of connection to another. In general, an adapter defines an incoming terminal and an outgoing terminal. If two terminals are incompatible because of different physical connection types, logical contract, or any other reason, the task of the adapter is to convert the incoming events or operations into forms that are acceptable in the context of the outgoing contract and pass them out. Some examples of adapter parts are shown in FIG. 30.

Adapters can be as generic or as specific as needed. On the generic end, a single adapter can convert any contract from one physical connection type, such as OLE interface, to another, such as pipebased message exchange. On the specialized side, an adapter may be built to convert one specific connection (contract+physical type) to another.

The ability to build generic adapters depends on the ability to parameterize them with the information needed in order to interpret the incoming operations and their associated data. If such information is available, for example, in the form of precompiled IDL (Interface Definition Language) definitions supported by OLE, CORBA and other component models, building a generic adapter is a simple task for one skilled in the art to which the present invention pertains.

Assuming that one of the contracts is translatable by descriptor into the second, instances of such adapter are parameterized with the names/registry keys that identify the IDL definitions of both the incoming and outgoing terminals and a translation table that defines how the operations and their data arguments are to be translated. The adapter exposes negotiable terminals; on each connect operation it compares the contract identification with the one it has been parameterized for and accepts if they match.

The translation process itself is beyond the scope of this description; however, in many practically important cases such as different versions of the same logical contract, the translation is simple and can be implemented without significant performance penalties.

It is important to note that in most cases building even a highly specialized adapter is less expensive and preferable to modifying one or two otherwise well-functioning parts and either complicating them by adding code to support multiple contracts or spinning out different versions of the part with practically identical functionality.

7.9.8.6 Development support parts

This important category of parts includes a number of vastly different devices that are generally not useful in the final working product—their role is to assist the developer in diagnosing problems during the construction of the system. Several development support parts are illustrated in FIG. 31.

One example includes the various T-connectors. The name of this category of parts is self-explanatory. Together with indicators, another class of development support parts, T-connectors are used to arrange the equivalent of a watchpoint in the structure of the system, allowing engineers to observe the flow of operations and data along a given connection. To serve their function well, T-connectors must be as unobtrusive as possible—their presence should not alter the conditions that are being tested or observed. A T-connector can be parameterized to intercept the observed signals before, after or both before and after the operation is passed to its outgoing terminal.

Indicators are used when a quick and generic way to present operations and data in a human-readable form is needed. The simplest indicator serves a function identical to the "dump memory" function found in most debugger tools; the indicator is parameterized by selecting the source for data, such as call stack, a bus pointer, registers or a combination of these and the number of bytes to "dump" on every incoming call. Depending on the operating environment, the "dump" varies from a simple printout on a console device to a separate window or edit control instance.

Another example is a critical section/semaphore part. This part prevents incoming calls from re-entering it by raising an exception whenever the reentrancy condition is detected. The part can be parameterized to allow re-entrance up to a given number of times, effectively functioning as a semaphore. In concurrent systems, this part can be used to prove that a reentrancy problem on a given connection exists or to temporary cure the problem during development.

In non-preemptive systems, the critical section is used to diagnose flow of control problems such as when a feedback connection causes a recursive chain of calls through the same sequence of parts. A semaphore will not only detect the condition, but prevent a possible stack overflow caused by it that may mask the recursive loop altogether.

Event filters, stoppers, and a number of other parts contained in the described system fall into the category of development support parts.

While the present invention has been described with reference to certain preferred embodiments, those skilled in the art to which the present invention pertains will now, as a result of the applicant's teachings herein, recognize that various modifications and other embodiments may be provided. By way of example, the precise structure of the terminal or other interfaces may be modified while still preserving the advantages of the invention. Similarly, the present invention can be easily adapted to a variety of object models, including object-oriented languages, such as C++, and component object models, such as Microsoft COM. Adapting the present invention for use with C++ may take the form of a class or template library, defining a base class PART and a base class ASSEMBLY, that implement the respective behavior as described above; user-defined parts and assemblies can be implemented by deriving from these base classes. Alternatively, the definition of the C++ language can be easily extended to support object composition by means of adding support, keywords or constructs for the few fundamental concepts defined by the present invention, such as terminals, properties, activation, connections. As another example, the present invention can easily be adapted for use with Microsoft COM by: defining the terminal, property and activation interfaces as COM v-table interfaces, assigning to each of them the required globally unique interface identifiers (GUID), providing a default implementation of IUnknown for parts that returns pointers to the above interfaces, adapting the respective data descriptors and mechanisms to use interface GUIDs as contract identifiers, and limiting the supported physical mechanisms only to v-table interfaces. By means of another example, most of the mechanisms described in the present invention can be utilized separately or in different combinations, while still preserving the advantages that each mechanism provides—it is possible, for example, to omit entirely the property and activation mechanisms and still utilize all functionality related to terminals, connections and construction of assemblies by composition. These and other variations upon and modifications to the embodiment described herein are deemed to be within the scope of the invention which is to be limited only by the appended claims.

What is claimed is:

1. A computer-implemented method in a computer system for interfacing a plurality of software objects, each one of said objects providing at least a first service for at least one other object, each one of said objects requiring at least one service provided by at least one other object, each one of said objects being able to directly invoke code in other objects, and each one of said objects belonging to an object class, said method comprising the steps of:

defining on a first object a plurality of terminals for establishing a connection with another object, said connection providing means for both requesting services of said first object and providing to said first object the service provided by a second object;

assigning to a first terminal on said first object a first persistent identifier that distinguishes said first terminal from all other terminals of said first object, said first persistent identifier identifying the same terminal on all objects of said plurality of objects belonging to a same class as said first object;

assigning a second identifier to a first, yet to be established, connection;

preparing said first object for establishing said first connection on said first terminal in response to provision of said first persistent identifier of said first terminal and said second identifier and preparing a first connection data set sufficient to determine whether said second object can participate in said first connection and sufficient for said second object to invoke code in said first object;

establishing said first connection on said first terminal, in response to provision of said first identifier, said second identifier, and a second connection data set, said second connection data set sufficient to determine whether said first object can participate in said first connection and sufficient for said first object to invoke code in said second object.

2. A computer-implemented method in a computer software system for establishing connections between objects, the system having a plurality of objects, each said object having a plurality of terminals, each said object being able to directly invoke code in other objects, each said terminal and each said connection having an identifier, said method comprising the steps of:

preparing a first object for establishing a first connection on a first terminal by providing the identifier of said first terminal and the identifier of said first connection, and preparing a first connection data set sufficient to determine whether a third object can participate in said first connection, and sufficient for said third object to invoke code in said first object;

preparing a second object for establishing said first connection on a second terminal by providing the identifier of said second terminal and the identifier of said first connection, and preparing a second connection data set sufficient to determine whether a fourth object can participate in said first connection and sufficient for said fourth object to invoke code in said second object;

initiating said first connection on said first terminal of said first object by providing the identifier of said first terminal, the identifier of said first connection and said second connection data set;

determining whether said first object will participate in said first connection based on said second connection data set;

storing in said first object a first portion of said second connection data, said first portion sufficient for said first object to invoke code in said second object;

initiating said first connection on said second terminal of said second object by providing the identifier of said second terminal, the identifier of said first connection and the first connection data set;

determining whether said second object will participate in said first connection based on said first connection data set;

storing in said second object a second portion of said first connection data set, said second portion sufficient for said second object to invoke code in said first object.

3. A computer-implemented method in a computer software system for presenting a terminal of a subordinate object as a terminal of an assembly object, each object belonging to a class, the system having an assembly object, said assembly object having a plurality of subordinate objects, each of said subordinate objects having a plurality of terminals, each of said subordinate objects having an assigned persistent identifier that distinguishes said subordinate object from all other subordinate objects of said assembly object, said method comprising the steps of:

defining on said assembly object a plurality of terminals to establish a plurality of connections with other objects, each connection providing both means for requesting services of said assembly object and providing to said assembly object services of other objects;

assigning to a first terminal on said assembly object a persistent identifier that distinguishes said first terminal from all other terminals of said assembly object, and where the same identifier identifies said first terminal on all objects of the same class as said assembly object;

preparing said assembly object for establishing a first connection on said first terminal by providing the identifier of said first terminal and an identifier for said first connection and preparing a first connection data set sufficient to determine whether a second object can participate in said first connection and sufficient for said second object to invoke code in a first subordinate object of said assembly object;

initiating the establishment of said first connection on said first terminal of said assembly object by providing the identifier of said first terminal, the identifier of said first connection and a second connection data set sufficient to determine whether said assembly object can participate in said first connection and sufficient for said assembly object to invoke code in said second object;

obtaining a reference to said first subordinate object and an identifier of a second terminal of said first subordinate object using the identifier of said first terminal and a first identifying data set that identifies said first terminal, said first subordinate object and said second terminal;

delegating an issued first request to said first subordinate object, said first request identifying said first terminal and addressed to said assembly object, by re-issuing said first request to said first subordinate object and substituting the identifier of said first terminal with the identifier of said second terminal.

4. A computer-implemented method in a computer software system for presenting a data property of a subordinate object as a data property of an assembly object in said system, said assembly object having a plurality of subordinate objects, each of said subordinate objects having a plurality of data properties, each of said data properties identified by a persistent identifier that distinguishes said property from all other properties of the object on which said property is defined, each of said subordinate objects being assigned a persistent identifier that distinguishes said subordinate object from all other subordinate objects of said assembly object, said method comprising the steps of:

providing means to obtain the current value of a first data property of said assembly object and providing the identifier of said first property, and obtaining the current value of said first property;

providing means to modify the current value of said first data property and providing the identifier of said first property and a data value;

obtaining a reference to a first subordinate object and an identifier of a second data property of said first subordinate object using said identifier of said first data property and data that identifies said first data property, said first subordinate object and said second property;

delegating to said first subordinate object an issued first request identifying said first data property and addressed to said assembly object, by re-issuing said first request to said first subordinate object, substituting the identifier of said first data property with the identifier of said second data property.

5. A computer-implemented method in a computer software system for guaranteeing availability of a connection during normal operation of an object, the system having a plurality of objects, each object having a plurality of terminals, a first object requiring that a first connection on a first terminal of said first object be available in order for said first object to conduct its normal operations, said method comprising the steps of:

providing in said first object an inactive state in which said first object does not carry its normal operations and does accept establishing of connections on said first terminal;

providing in said first object an active state in which said first object does conduct its normal operations and does not accept dissolving of connections on said first terminal;

establishing said first connection between said first terminal of said first object and a second terminal of a second object, at a time when said first object is in said inactive state;

requesting that said first object be placed in said active state, where said request will fail if said first connection does not exist at the time of said request, wherein whenever said first object carries its normal operations, said first connection is guaranteed to exist.

6. A computer-implemented method in a computer software system for establishing a connection between objects with incompatible terminals, the system having a plurality of objects, each said object having a plurality of terminals, where a direct connection between a first terminal of a first object and a second terminal of a second object cannot be established, said method comprising the steps of:

identifying a class of adapter objects, such that:

said adapter objects have a third terminal that can be successfully connected to said first terminal and have a fourth terminal that can be successfully connected to said second terminal, said adapter objects translate requests that said adapter objects receive through connections on said third terminal into requests that said adapter objects issue through connections on said fourth terminal, and said adapter objects translate requests that said adapter objects receive through connections on said fourth terminal into requests that said adapter objects issue through connections on said third terminal;

creating an adapter object of said identified class;

establishing a first connection between said first terminal of said first object and said third terminal of said adapter object;

establishing a second connection between said second terminal of said second object and said fourth terminal of said adapter object.

7. A computer-implemented method in a computer software system for presenting a plurality of outgoing terminals of subordinate objects as a single terminal of an assembly object containing said subordinate objects, the system having an assembly object and a third object, said assembly object having a first subordinate object and a second subordinate object, said first subordinate object having a first terminal through which said first subordinate object requests services, said second subordinate object having a second terminal through which said second subordinate object requests services, said third object having a third terminal through which said third object provides services, said assembly object having a fourth terminal, said first terminal of said first subordinate object accepting connections with said third terminal of said third object, said second terminal of said second subordinate object accepting connections with said third terminal of said third object, the method comprising the steps of:

preparing for the establishment of a first connection on said fourth terminal of said assembly object by providing the identifier of said fourth terminal and preparing a first connection data set sufficient to determine whether said third object can participate in said first connection;

obtaining a reference to said first subordinate object and the identifier of said first terminal using said identifier of said fourth terminal and a first data that identifies said fourth terminal, said first subordinate object and said first terminal;

obtaining a reference to said second subordinate object and the identifier of said second terminal, using said identifier of said fourth terminal and a second data that identifies said fourth terminal, said second subordinate object and said second terminal;

preparing said first subordinate object for a second connection and providing the identifier of said first terminal;

preparing said second subordinate object for a third connection and providing the identifier of said second terminal;

initiating the establishment of said first connection on said fourth terminal of said assembly object by providing the identifier of said fourth terminal and a second connection data set sufficient to determine whether said first subordinate object can participate in said first connection and sufficient for said first subordinate object to invoke code in said third object;

establishing said second connection on said first subordinate object by providing said identifier of said first terminal and said second connection data set;

establishing said third connection on said second subordinate object by providing said identifier of said second terminal and said second connection data set.

* * * * *